(12) United States Patent
Laroche et al.

(10) Patent No.: US 12,250,370 B2
(45) Date of Patent: Mar. 11, 2025

(54) VIDEO CODING AND DECODING

(71) Applicant: CANON KABUSHIKI KAISHA, Tokyo (JP)

(72) Inventors: Guillaume Laroche, Saint Aubin d'Aubigné (FR); Christophe Gisquet, Acigne (FR); Patrice Onno, Rennes (FR); Jonathan Taquet, Talensac (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/503,994

(22) Filed: Nov. 7, 2023

(65) Prior Publication Data

US 2024/0073410 A1    Feb. 29, 2024

Related U.S. Application Data

(63) Continuation of application No. 17/938,552, filed on Oct. 6, 2022, now Pat. No. 11,849,108, which is a (Continued)

(30) Foreign Application Priority Data

Oct. 18, 2018    (GB) ..................... 1817019

(51) Int. Cl.
*H04N 19/105* (2014.01)
*H04N 19/13* (2014.01)
(Continued)

(52) U.S. Cl.
CPC .......... *H04N 19/105* (2014.11); *H04N 19/13* (2014.11); *H04N 19/176* (2014.11); *H04N 19/70* (2014.11)

(58) Field of Classification Search
CPC ...... H04N 19/105; H04N 19/52; H04N 19/91; H04N 19/13; H04N 19/176; H04N 19/463; H04N 19/70
See application file for complete search history.

(56) References Cited

U.S. PATENT DOCUMENTS

| 2018/0048889 A1 | 2/2018 | Zhang |
| 2018/0070110 A1 | 3/2018 | Chuang |

(Continued)

FOREIGN PATENT DOCUMENTS

| CA | 2971880 A1 | 8/2016 |
| CN | 104205830 A | 12/2014 |

(Continued)

OTHER PUBLICATIONS

Li Haihua Zhang Baoju, Explore the new generation of video coding standard H.264, School of Physics and Electronic Information, Tianjin Normal University, 2008.
(Continued)

*Primary Examiner* — Neil R Mikeska
(74) *Attorney, Agent, or Firm* — CANON U.S.A., INC. IP DIVISION

(57) ABSTRACT

A method of encoding a motion information predictor index, comprising: generating a list of motion information predictor candidates; when an Affine Merge mode is used, selecting one of the motion information predictor candidates in the list as an Affine Merge mode predictor; when a non-Affine Merge mode is used, selecting one of the motion information predictor candidates in the list as a non-Affine Merge mode predictor; and generating a motion information predictor index for the selected motion information predictor candidate using CABAC coding, one or more bits of the motion information predictor index being bypass CABAC coded.

14 Claims, 25 Drawing Sheets

Related U.S. Application Data continuation of application No. 17/283,163, filed as application No. PCT/EP2019/078432 on Oct. 18, 2019, now Pat. No. 11,516,466.

(51) Int. Cl.
*H04N 19/176* (2014.01)
*H04N 19/70* (2014.01)

(56) References Cited

U.S. PATENT DOCUMENTS

| | | |
|---|---|---|
| 2018/0091816 A1 | 3/2018 | Chien |
| 2019/0028731 A1 | 1/2019 | Chuang |
| 2019/0149823 A1 | 5/2019 | Lim |
| 2019/0335191 A1 | 10/2019 | Kondo |
| 2020/0007889 A1 | 1/2020 | Chao |
| 2021/0195198 A1 | 6/2021 | Chen |

FOREIGN PATENT DOCUMENTS

| | | |
|---|---|---|
| CN | 106851304 A | 6/2017 |
| CN | 109792531 A | 5/2019 |
| CN | 110546952 A | 12/2019 |
| GB | 2563936 A | 1/2019 |
| TW | 201404161 A | 1/2014 |
| WO | 2013/018369 A1 | 2/2013 |
| WO | 2015101640 A1 | 7/2015 |
| WO | 2018/064524 A1 | 4/2018 |

OTHER PUBLICATIONS

Zhang Rui, et al., Advanced Technology and Optimisation for Video Coding H.264/AVC, Huazhong University of Science and Technology Wuhan, China Academic Journal Electronic Publishing House, 2005 (English Abstract on third page).

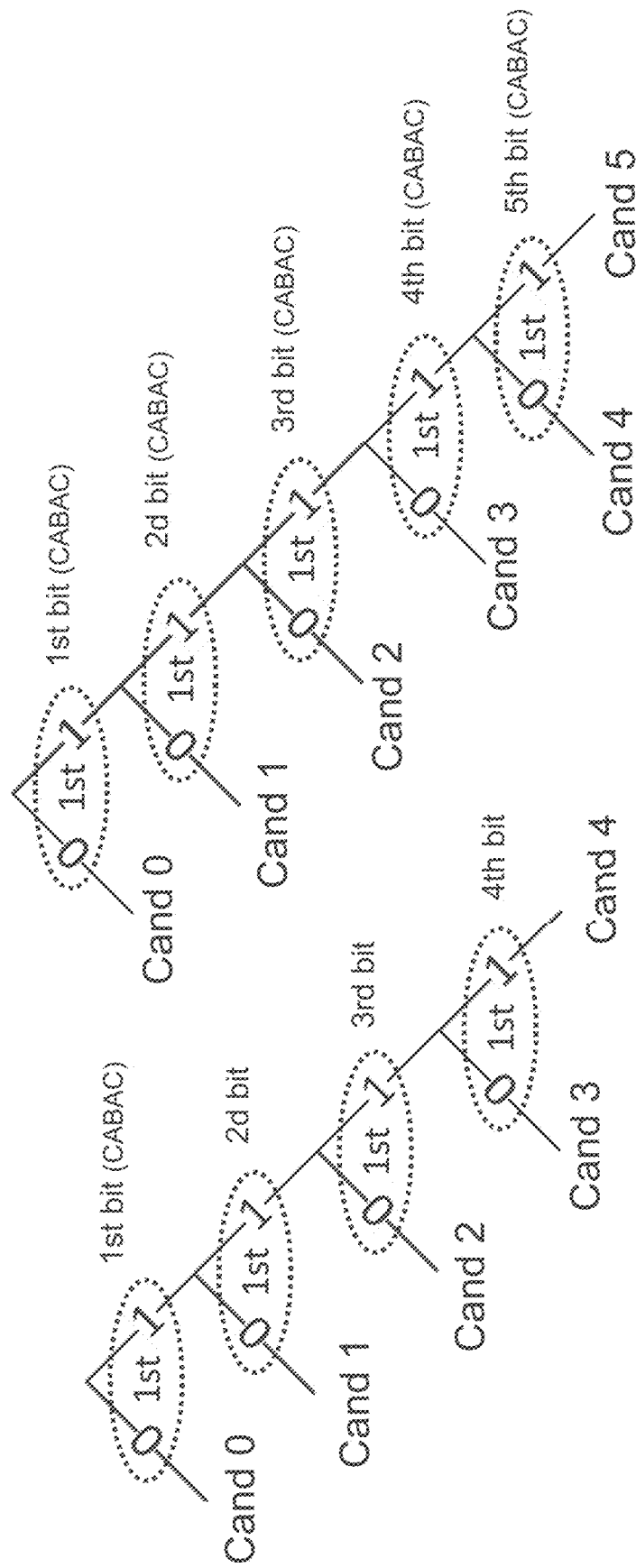

VIDEO CODING AND DECODING

CROSS-REFERENCE TO RELATED APPLICATIONS

This application is a continuation of U.S. patent application Ser. No. 17/938,552, filed on Oct. 6, 2022, which is a continuation of U.S. patent application Ser. No. 17/283,163, filed on Apr. 6, 2021 and issued as U.S. Pat. No. 11,516,466 on Nov. 29, 2022, which is a National Phase application of PCT Application No. PCT/EP2019/078432, filed on Oct. 18, 2019 and titled "VIDEO CODING AND DECODING". This application claims the benefit under 35 U.S.C. § 119(a)-(d) of United Kingdom Patent Application No. 1817019.1, filed on Oct. 18, 2018. The above cited patent applications are incorporated herein by reference in their entirety.

FIELD OF INVENTION

The present invention relates to video coding and decoding.

BACKGROUND

Recently, the Joint Video Experts Team (JVET), a collaborative team formed by MPEG and ITU-T Study Group 16's VCEG, commenced work on a new video coding standard referred to as Versatile Video Coding (VVC). The goal of VVC is to provide significant improvements in compression performance over the existing HEVC standard (i.e., typically twice as much as before) and to be completed in 2020. The main target applications and services include— but not limited to—360-degree and high-dynamic-range (HDR) videos. In total, JVET evaluated responses from 32 organizations using formal subjective tests conducted by independent test labs. Some proposals demonstrated compression efficiency gains of typically 40% or more when compared to using HEVC. Particular effectiveness was shown on ultra-high definition (UHD) video test material. Thus, we may expect compression efficiency gains well-beyond the targeted 50% for the final standard.

The JVET exploration model (JEM) uses all the HEVC tools. A further tool not present in HEVC is to use an 'affine motion mode' when applying motion compensation. Motion compensation in HEVC is limited to translations, but in reality there are many kinds of motion, e.g. zoom in/out, rotation, perspective motions and other irregular motions. When utilising affine motion mode, a more complex transform is applied to a block to attempt to more accurately predict such forms of motion. So it would be desirable if the affine motion mode can be used whilst achieving a good coding efficiency but with less complexity.

Another tool not present in HEVC is to use Alternative Temporal Motion Vector Prediction (ATMVP). The alternative temporal motion vector prediction (ATMVP) is a particular motion compensation. Instead of considering only one motion information for the current block from a temporal reference frame, each motion information of each collocated block is considered. So this temporal motion vector prediction gives a segmentation of the current block with the related motion information of each sub-block. In the current VTM (VVC Test Model) reference software, ATMVP is signalled as a merge candidate inserted in the list of Merge candidates. When ATMVP is enabled at SPS level, the maximum number of Merge candidates is increased by one. So 6 candidates are considered instead of 5 when this mode is disabled.

These, and other tools described later, are bringing up problems relating to the coding efficiency and complexity of the coding of an index (e.g. a Merge index) used to signal which candidate is selected from among the list of candidates (e.g. from a list of Merge candidates for use with a Merge mode coding).

Accordingly, a solution to at least one of the aforementioned problems is desirable.

According to a first aspect of the present invention there is provided a method of encoding a motion vector predictor index, comprising:
  generating a list of motion vector predictor candidates including an ATMVP candidate;
  selecting one of the motion vector predictor candidates in the list; and
  generating a motion vector predictor index (Merge index) for the selected motion vector predictor candidate using CABAC coding, one or more bits of the motion vector predictor index being bypass CABAC coded.

In one embodiment, all bits except for a first bit of the motion vector predictor index are bypass CABAC coded.

According to a second aspect of the present invention there is provided a method of decoding a motion vector predictor index, comprising:
  generating a list of motion vector predictor candidates including an ATMVP candidate;
  decoding the motion vector predictor index using CABAC decoding, one or more bits of the motion vector predictor index being bypass CABAC decoded; and
  using the decoded motion vector predictor index to identify one of the motion vector predictor candidates in the list.

In one embodiment, all bits except for a first bit of the motion vector predictor index are bypass CABAC decoded.

According to a third aspect of the present invention there is provided a device for encoding a motion vector predictor index, comprising:
  means for generating a list of motion vector predictor candidates including an ATMVP candidate;
  means for selecting one of the motion vector predictor candidates in the list; and
  means for generating a motion vector predictor index (Merge index) for the selected motion vector predictor candidate using CABAC coding, one or more bits of the motion vector predictor index being bypass CABAC coded.

According to a fourth aspect of the present invention there is provided a device for decoding a motion vector predictor index, comprising:
  means for generating a list of motion vector predictor candidates including an ATMVP candidate;
  means for decoding the motion vector predictor index using CABAC decoding, one or more bits of the motion vector predictor index being bypass CABAC decoded; and
  means for using the decoded motion vector predictor index to identify one of the motion vector predictor candidates in the list.

According to a fifth aspect of the present invention there is provided a method of encoding a motion vector predictor index, comprising:
  generating a list of motion vector predictor candidates;
  selecting one of the motion vector predictor candidates in the list; and
  generating a motion vector predictor index for the selected motion vector predictor candidate using CABAC coding, two or more bits of the motion vector predictor index sharing the same context.

In one embodiment, all bits of the motion vector predictor index share the same context.

According to a sixth aspect of the present invention there is provided a method of decoding a motion vector predictor index, comprising:
  generating a list of motion vector predictor candidates;
  decoding the motion vector predictor index using CABAC decoding, two or more bits of the motion vector predictor index sharing the same context; and
  using the decoded motion vector predictor index to identify one of the motion vector predictor candidates in the list.

In one embodiment, all bits of the motion vector predictor index share the same context.

According to a seventh aspect of the present invention there is provided a device for encoding a motion vector predictor index, comprising:
  means for generating a list of motion vector predictor candidates;
  means for selecting one of the motion vector predictor candidates in the list; and
  means for generating a motion vector predictor index for the selected motion vector predictor candidate using CABAC coding, two or more bits of the motion vector predictor index sharing the same context.

According to an eighth aspect of the present invention there is provided a device for decoding a motion vector predictor index, comprising:
  means for generating a list of motion vector predictor candidates;
  means for decoding the motion vector predictor index using CAB AC decoding, two or more bits of the motion vector predictor index sharing the same context; and
  means for using the decoded motion vector predictor index to identify one of the motion vector predictor candidates in the list.

According to a ninth aspect of the present invention there is provided a method of encoding a motion vector predictor index, comprising:
  generating a list of motion vector predictor candidates;
  selecting one of the motion vector predictor candidates in the list; and
  generating a motion vector predictor index for the selected motion vector predictor candidate using CABAC coding, wherein a context variable for at least one bit of the motion vector predictor index of a current block depends on a motion vector predictor index of at least one block neighbouring the current block.

In one embodiment the context variable for at least one bit of the motion vector predictor index depends on the respective motion vector predictor indexes of at least two neighbouring blocks.

In another embodiment the context variable for at least one bit of the motion vector predictor index depends on a motion vector predictor index of a left neighbouring block on the left of the current block and on a motion vector predictor index of an upper neighbouring block above the current block.

In another embodiment the left neighbouring block is A2 and the upper neighbouring block is B3.

In another embodiment the left neighbouring block is A1 and the upper neighbouring block is B1.

In another embodiment the context variable has 3 different possible values.

Another embodiment comprises comparing the motion vector predictor index of at least one neighbouring block with an index value of the motion vector predictor index of the current block and setting said context variable in dependence upon the comparison result.

Another embodiment comprises comparing the motion vector predictor index of at least one neighbouring block with a parameter representing a bit position of the or one said bit in the motion vector predictor index of the current block and setting said context variable in dependence upon the comparison result.

Yet another embodiment comprises making a first comparison, comparing the motion vector predictor index of a first neighbouring block with a parameter representing a bit position of the or one said bit in the motion vector predictor index of the current block; making a second comparison, comparing the motion vector predictor index of a second neighbouring block with said parameter; and setting said context variable in dependence upon the results of the first and second comparisons.

According to a tenth aspect of the present invention there is provided a method of decoding a motion vector predictor index, comprising:
  generating a list of motion vector predictor candidates;
  decoding the motion vector predictor index using CABAC decoding, wherein a context variable for at least one bit of the motion vector predictor index of a current block depends on a motion vector predictor index of at least one block neighbouring the current block; and
  using the decoded motion vector predictor index to identify one of the motion vector predictor candidates in the list.

In one embodiment the context variable for at least one bit of the motion vector predictor index depends on the respective motion vector predictor indexes of at least two neighbouring blocks.

In another embodiment the context variable for at least one bit of the motion vector predictor index depends on a motion vector predictor index of a left neighbouring block on the left of the current block and on a motion vector predictor index of an upper neighbouring block above the current block.

In another embodiment the left neighbouring block is A2 and the upper neighbouring block is B3.

In another embodiment the left neighbouring block is A1 and the upper neighbouring block is B1.

In another embodiment the context variable has 3 different possible values.

Another embodiment comprises comparing the motion vector predictor index of at least one neighbouring block with an index value of the motion vector predictor index of the current block and setting said context variable in dependence upon the comparison result.

Another embodiment comprises comparing the motion vector predictor index of at least one neighbouring block with a parameter representing a bit position of the or one said bit in the motion vector predictor index of the current block and setting said context variable in dependence upon the comparison result.

Yet another embodiment comprises making a first comparison, comparing the motion vector predictor index of a first neighbouring block with a parameter representing a bit position of the or one said bit in the motion vector predictor index of the current block; making a second comparison, comparing the motion vector predictor index of a second neighbouring block with said parameter; and setting said context variable in dependence upon the results of the first and second comparisons.

According to an eleventh aspect of the present invention there is provided a device for encoding a motion vector predictor index, comprising:
 means for generating a list of motion vector predictor candidates;
 means for selecting one of the motion vector predictor candidates in the list; and
 means for generating a motion vector predictor index for the selected motion vector predictor candidate using CABAC coding, wherein a context variable for at least one bit of the motion vector predictor index of a current block depends on a motion vector predictor index of at least one block neighbouring the current block.

According to a twelfth aspect of the present invention there is provided a device for decoding a motion vector predictor index, comprising:
 means for generating a list of motion vector predictor candidates;
 means for decoding the motion vector predictor index using CABAC decoding, wherein a context variable for at least one bit of the motion vector predictor index of a current block depends on a motion vector predictor index of at least one block neighbouring the current block; and
 means for using the decoded motion vector predictor index to identify one of the motion vector predictor candidates in the list.

According to a thirteenth aspect of the present invention there is provided a method of encoding a motion vector predictor index, comprising:
 generating a list of motion vector predictor candidates;
 selecting one of the motion vector predictor candidates in the list; and
 generating a motion vector predictor index for the selected motion vector predictor candidate using CABAC coding, wherein a context variable for at least one bit of the motion vector predictor index of a current block depends on a Skip flag of said current block.

According to a fourteenth aspect of the present invention there is provided a method of encoding a motion vector predictor index, comprising:
 generating a list of motion vector predictor candidates;
 selecting one of the motion vector predictor candidates in the list; and
 generating a motion vector predictor index for the selected motion vector predictor candidate using CABAC coding, wherein a context variable for at least one bit of the motion vector predictor index of a current block depends on another parameter or syntax element of said current block that is available prior to decoding of the motion vector predictor index.

According to a fifteenth aspect of the present invention there is provided a method of encoding a motion vector predictor index, comprising:
 generating a list of motion vector predictor candidates;
 selecting one of the motion vector predictor candidates in the list; and
 generating a motion vector predictor index for the selected motion vector predictor candidate using CABAC coding, wherein a context variable for at least one bit of the motion vector predictor index of a current block depends on another parameter or syntax element of said current block that is an indicator of a complexity of motion in the current block.

According to a sixteenth aspect of the present invention there is provided a method of decoding a motion vector predictor index, comprising:
 generating a list of motion vector predictor candidates;
 decoding the motion vector predictor index using CABAC decoding, wherein a context variable for at least one bit of the motion vector predictor index of a current block depends on a Skip flag of said current block; and
 using the decoded motion vector predictor index to identify one of the motion vector predictor candidates in the list.

According to a seventeenth aspect of the present invention there is provided a method of decoding a motion vector predictor index, comprising:
 generating a list of motion vector predictor candidates;
 decoding the motion vector predictor index using CABAC decoding, wherein a context variable for at least one bit of the motion vector predictor index of a current block depends on another parameter or syntax element of said current block that is available prior to decoding of the motion vector predictor index; and
 using the decoded motion vector predictor index to identify one of the motion vector predictor candidates in the list.

According to an eighteenth aspect of the present invention there is provided a method of decoding a motion vector predictor index, comprising:
 generating a list of motion vector predictor candidates;
 decoding the motion vector predictor index using CABAC decoding, wherein a context variable for at least one bit of the motion vector predictor index of a current block depends on another parameter or syntax element of said current block that is an indicator of a complexity of motion in the current block; and
 using the decoded motion vector predictor index to identify one of the motion vector predictor candidates in the list.

According to a nineteenth aspect of the present invention there is provided a device for encoding a motion vector predictor index, comprising:
 means for generating a list of motion vector predictor candidates;
 means for selecting one of the motion vector predictor candidates in the list; and
 means for generating a motion vector predictor index for the selected motion vector predictor candidate using CABAC coding, wherein a context variable for at least one bit of the motion vector predictor index of a current block depends on a Skip flag of said current block.

According to a twentieth aspect of the present invention there is provided a device for encoding a motion vector predictor index, comprising:
 means for generating a list of motion vector predictor candidates;
 means for selecting one of the motion vector predictor candidates in the list; and means for generating a motion vector predictor index for the selected motion vector predictor candidate using CABAC coding, wherein a context variable for at least one bit of the motion vector predictor index of a current block depends on another parameter or syntax element of said current block that is available prior to decoding of the motion vector predictor index.

According to a twenty-first aspect of the present invention there is provided a device for encoding a motion vector predictor index, comprising:
means for generating a list of motion vector predictor candidates;
means for selecting one of the motion vector predictor candidates in the list; and
means for generating a motion vector predictor index for the selected motion vector predictor candidate using CABAC coding, wherein a context variable for at least one bit of the motion vector predictor index of a current block depends on another parameter or syntax element of said current block that is an indicator of a complexity of motion in the current block.

According to a twenty-second aspect of the present invention there is provided a device for decoding a motion vector predictor index, comprising:
means for generating a list of motion vector predictor candidates;
means for decoding the motion vector predictor index using CABAC decoding, wherein a context variable for at least one bit of the motion vector predictor index of a current block depends on a Skip flag of said current block; and
means for using the decoded motion vector predictor index to identify one of the motion vector predictor candidates in the list.

According to a twenty-third aspect of the present invention there is provided a device for decoding a motion vector predictor index, comprising:
means for generating a list of motion vector predictor candidates;
means for decoding the motion vector predictor index using CABAC decoding, wherein a context variable for at least one bit of the motion vector predictor index of a current block depends on another parameter or syntax element of said current block that is available prior to decoding of the motion vector predictor index; and
means for using the decoded motion vector predictor index to identify one of the motion vector predictor candidates in the list.

According to a twenty-fourth aspect of the present invention there is provided a device for decoding a motion vector predictor index, comprising:
means for generating a list of motion vector predictor candidates;
means for decoding the motion vector predictor index using CABAC decoding, wherein a context variable for at least one bit of the motion vector predictor index of a current block depends on another parameter or syntax element of said current block that is an indicator of a complexity of motion in the current block; and
means for using the decoded motion vector predictor index to identify one of the motion vector predictor candidates in the list.

According to a twenty-fifth aspect of the present invention there is provided a method of encoding a motion vector predictor index, comprising:
generating a list of motion vector predictor candidates;
selecting one of the motion vector predictor candidates in the list; and
generating a motion vector predictor index for the selected motion vector predictor candidate using CABAC coding, wherein a context variable for at least one bit of the motion vector predictor index of a current block depends on Affine Motion vector predictor candidates, if any, in the list.

In one embodiment the context variable depends on position in said list of a first Affine Motion vector predictor candidate.

According to a twenty-sixth aspect of the present invention there is provided a method of decoding a motion vector predictor index, comprising:
generating a list of motion vector predictor candidates;
decoding the motion vector predictor index using CABAC decoding wherein a context variable for at least one bit of the motion vector predictor index of a current block depends on Affine Motion vector predictor candidates, if any, in the list; and
using the decoded motion vector predictor index to identify one of the motion vector predictor candidates in the list.

In one embodiment the context variable depends on position in said list of a first Affine Motion vector predictor candidate.

According to a twenty-seventh aspect of the present invention there is provided a device for encoding a motion vector predictor index, comprising:
means for generating a list of motion vector predictor candidates;
means for selecting one of the motion vector predictor candidates in the list; and
means for generating a motion vector predictor index for the selected motion vector predictor candidate using CABAC coding, wherein a context variable for at least one bit of the motion vector predictor index of a current block depends on Affine Motion vector predictor candidates, if any, in the list.

According to a twenty-eighth aspect of the present invention there is provided a device for decoding a motion vector predictor index, comprising:
means for generating a list of motion vector predictor candidates;
means for decoding the motion vector predictor index using CABAC decoding wherein a context variable for at least one bit of the motion vector predictor index of a current block depends on Affine Motion vector predictor candidates, if any, in the list; and
means for using the decoded motion vector predictor index to identify one of the motion vector predictor candidates in the list.

According to a twenty-ninth aspect of the present invention there is provided a method of encoding a motion vector predictor index, comprising:
generating a list of motion vector predictor candidates including an Affine Motion vector predictor candidate;
selecting one of the motion vector predictor candidates in the list; and
generating a motion vector predictor index for the selected motion vector predictor candidate using CABAC coding, wherein a context variable for at least one bit of the motion vector predictor index of a current block depends on an affine flag of the current block and/or of at least one block neighbouring the current block.

According to a thirtieth aspect of the present invention there is provided a method of decoding a motion vector predictor index, comprising:

generating a list of motion vector predictor candidates including an Affine Motion vector predictor candidate;

decoding the motion vector predictor index using CABAC decoding, wherein a context variable for at least one bit of the motion vector predictor index of a current block depends on an affine flag of the current block and/or of at least one block neighbouring the current block; and using the decoded motion vector predictor index to identify one of the motion vector predictor candidates in the list.

According to a thirty-first aspect of the present invention there is provided a device for encoding a motion vector predictor index, comprising:

means for generating a list of motion vector predictor candidates including an Affine Motion vector predictor candidate;

means for selecting one of the motion vector predictor candidates in the list; and means for generating a motion vector predictor index for the selected motion vector predictor candidate using CABAC coding, wherein a context variable for at least one bit of the motion vector predictor index of a current block depends on an affine flag of the current block and/or of at least one block neighbouring the current block.

According to a thirty-second aspect of the present invention there is provided a device for decoding a motion vector predictor index, comprising:

means for generating a list of motion vector predictor candidates including an Affine Motion vector predictor candidate;

means for decoding the motion vector predictor index using CABAC decoding, wherein a context variable for at least one bit of the motion vector predictor index of a current block depends on an affine flag of the current block and/or of at least one block neighbouring the current block; and means for using the decoded motion vector predictor index to identify one of the motion vector predictor candidates in the list.

According to a thirty-third aspect of the present invention there is provided a method of encoding a motion vector predictor index, comprising:

generating a list of motion vector predictor candidates;

selecting one of the motion vector predictor candidates in the list; and generating a motion vector predictor index for the selected motion vector predictor candidate using CABAC coding, wherein a context variable for at least one bit of the motion vector predictor index of a current block is derived from a context variable of at least one of a Skip flag and an affine flag of the current block.

According to a thirty-fourth aspect of the present invention there is provided a method of decoding a motion vector predictor index, comprising:

generating a list of motion vector predictor candidates;

decoding the motion vector predictor index using CABAC decoding, wherein a context variable for at least one bit of the motion vector predictor index of a current block is derived from a context variable of at least one of a Skip flag and an affine flag of the current block; and using the decoded motion vector predictor index to identify one of the motion vector predictor candidates in the list.

According to a thirty-fifth aspect of the present invention there is provided a device for encoding a motion vector predictor index, comprising:

means for generating a list of motion vector predictor candidates;

means for selecting one of the motion vector predictor candidates in the list; and means for generating a motion vector predictor index for the selected motion vector predictor candidate using CABAC coding, wherein a context variable for at least one bit of the motion vector predictor index of a current block is derived from a context variable of at least one of a Skip flag and an affine flag of the current block.

According to a thirty-sixth aspect of the present invention there is provided a device for decoding a motion vector predictor index, comprising:

means for generating a list of motion vector predictor candidates;

means for decoding the motion vector predictor index using CABAC decoding, wherein a context variable for at least one bit of the motion vector predictor index of a current block is derived from a context variable of at least one of a Skip flag and an affine flag of the current block; and means for using the decoded motion vector predictor index to identify one of the motion vector predictor candidates in the list.

According to a thirty-seventh aspect of the present invention there is provided a method of encoding a motion vector predictor index, comprising:

generating a list of motion vector predictor candidates;

selecting one of the motion vector predictor candidates in the list; and generating a motion vector predictor index for the selected motion vector predictor candidate using CABAC coding, wherein a context variable for at least one bit of the motion vector predictor index of a current block has only two different possible values.

According to a thirty-eighth aspect of the present invention there is provided a method of decoding a motion vector predictor index, comprising:

generating a list of motion vector predictor candidates;

decoding the motion vector predictor index using CABAC decoding, wherein a context variable for at least one bit of the motion vector predictor index of a current block has only two different possible values; and using the decoded motion vector predictor index to identify one of the motion vector predictor candidates in the list.

According to a thirty-ninth aspect of the present invention there is provided a device for encoding a motion vector predictor index, comprising:

means for generating a list of motion vector predictor candidates;

means for selecting one of the motion vector predictor candidates in the list; and means for generating a motion vector predictor index for the selected motion vector predictor candidate using CABAC coding, wherein a context variable for at least one bit of the motion vector predictor index of a current block has only two different possible values.

According to a fortieth aspect of the present invention there is provided a device for decoding a motion vector predictor index, comprising:

means for generating a list of motion vector predictor candidates;

means for decoding the motion vector predictor index using CABAC decoding, wherein a context variable for at least one bit of the motion vector predictor index of a current block has only two different possible values; and means for using the decoded motion vector predictor index to identify one of the motion vector predictor candidates in the list.

Yet further aspects of the present invention relate to programs which when executed by a computer or processor cause the computer or processor to carry out any of the methods of the aforementioned aspects. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Yet further aspects of the present in invention relate to a camera comprising a device according to any of the aforementioned device aspects. In one embodiment the camera further comprises zooming means.

According to a forty-first aspect of the present invention there is provided a method of encoding a motion information predictor index, comprising: generating a list of motion information predictor candidates; when an Affine Merge mode is used, selecting one of the motion information predictor candidates in the list as an Affine Merge mode predictor; when a non-Affine Merge mode is used, selecting one of the motion information predictor candidates in the list as a non-Affine Merge mode predictor; and generating a motion information predictor index for the selected motion information predictor candidate using CABAC coding, one or more bits of the motion information predictor index being bypass CABAC coded.

Suitably, the CABAC coding comprises using the same context variable for at least one bit of the motion information predictor index of a current block when the Affine Merge mode is used and when the non-Affine Merge mode is used. Alternatively, the CABAC coding comprises, for at least one bit of the motion information predictor index of a current block, using a first context variable when the Affine Merge mode is used or using a second context variable when the non-Affine Merge mode is used; and the method further comprises including data for indicating use of the Affine Merge mode in a bitstream when the Affine Merge mode is used.

Suitably, the method further comprises including data for determining a maximum number of motion information predictor candidates includable in the generated list of motion information predictor candidates in a bitstream. Suitably, all bits except for a first bit of the motion information predictor index are bypass CABAC coded. Suitably, the first bit is CABAC coded. Suitably, the motion information predictor index for the selected motion information predictor candidate is encoded using the same syntax element when the Affine Merge mode is used and when the non-Affine Merge mode is used.

According to a forty-second aspect of the present invention there is provided a method of decoding a motion information predictor index, comprising: generating a list of motion information predictor candidates; decoding the motion information predictor index using CABAC decoding, one or more bits of the motion information predictor index being bypass CABAC decoded; when an Affine Merge mode is used, using the decoded motion information predictor index to identify one of the motion information predictor candidates in the list as an Affine Merge mode predictor; and when a non-Affine Merge mode is used, using the decoded motion information predictor index to identify one of the motion information predictor candidates in the list as a non-Affine Merge mode predictor.

Suitably, the CABAC decoding comprises using the same context variable for at least one bit of the motion information predictor index of a current block when the Affine Merge mode is used and when the non-Affine Merge mode is used. Alternatively, the method further comprises obtaining, from a bitstream, data for indicating use of the Affine Merge mode, and the CABAC decoding comprises, for at least one bit of the motion information predictor index of a current block: when the obtained data indicates use of the Affine Merge mode, using a first context variable; and when the obtained data indicate use of the non-Affine Merge mode, using a second context variable.

Suitably, the method further comprises obtaining, from a bitstream, data for indicating use of the Affine Merge mode, wherein the generated list of motion information predictor candidates comprises: when the obtained data indicates use of the Affine Merge mode, Affine Merge mode predictor candidates; and when the obtained data indicate use of the non-Affine Merge mode, non-Affine Merge mode predictor candidates.

Suitably, the method further comprises obtaining, from a bitstream, data for determining a maximum number of motion information predictor candidates includable in the generated list of motion information predictor candidates. Suitably, all bits except for a first bit of the motion information predictor index are bypass CABAC decoded. Suitably, the first bit is CABAC decoded. Suitably, decoding the motion information predictor index comprises parsing, from a bitstream, the same syntax element when the Affine Merge mode is used and when the non-Affine Merge mode is used. Suitably, a motion information predictor candidate comprises information for obtaining a motion vector. Suitably, the generated list of motion information predictor candidates includes an ATMVP candidate. Suitably, the generated list of motion information predictor candidates has the same maximum number of motion information predictor candidates includable therein when the Affine Merge mode is used and when the non-Affine Merge mode is used.

According to a forty-third aspect of the present invention there is provided a device for encoding a motion information predictor index, comprising: means for generating a list of motion information predictor candidates; means for selecting, when an Affine Merge mode is used, one of the motion information predictor candidates in the list as an Affine Merge mode predictor; means for selecting, when a non-Affine Merge mode is used, one of the motion information predictor candidates in the list as a non-Affine Merge mode predictor; and means for generating a motion information predictor index for the selected motion information predictor candidate using CABAC coding, one or more bits of the motion information predictor index being bypass CABAC coded. Suitably, the device comprises means for performing a method of encoding a motion information predictor index according to the forty-first aspect.

According to a forty-fourth aspect of the present invention there is provided a device for decoding a motion information predictor index, comprising: means for generating a list of motion information predictor candidates; means for decoding the motion information predictor index using CABAC decoding, one or more bits of the motion information predictor index being bypass CABAC decoded; means for, when an Affine Merge mode is used, using the decoded motion information predictor index to identify one of the motion information predictor candidates in the list as an Affine Merge mode predictor; and means for, when a non-Affine Merge mode is used, using the decoded motion information predictor index to identify one of the motion information predictor candidates in the list as a non-Affine Merge mode predictor. Suitably, the device comprises means for performing a method of decoding a motion information predictor index according to the forty-second aspect.

According to a forty-fifth aspect of the present invention there is provided a method of encoding a motion information predictor index for an Affine Merge mode, comprising: generating a list of motion information predictor candidates; selecting one of the motion information predictor candidates in the list as an Affine Merge mode predictor; and generating a motion information predictor index for the selected motion information predictor candidate using CABAC coding, one or more bits of the motion information predictor index being bypass CABAC coded.

Suitably, when a non-Affine Merge mode is used, the method further comprises selecting one of the motion information predictor candidates in the list as a non-Affine Merge mode predictor. Suitably, the CABAC coding comprises, for at least one bit of the motion information predictor index of a current block, using a first context variable when the Affine Merge mode is used or using a second context variable when the non-Affine Merge mode is used; and the method further comprises including data for indicating use of the Affine Merge mode in a bitstream when the Affine Merge mode is used. Alternatively, the CABAC coding comprises using the same context variable for at least one bit of the motion information predictor index of a current block when the Affine Merge mode is used and when the non-Affine Merge mode is used.

Suitably, the method further comprises including data for determining a maximum number of motion information predictor candidates includable in the generated list of motion information predictor candidates in a bitstream.

Suitably, all bits except for a first bit of the motion information predictor index are bypass CABAC coded. Suitably, the first bit is CABAC coded. Suitably, the motion information predictor index for the selected motion information predictor candidate is encoded using the same syntax element when the Affine Merge mode is used and when the non-Affine Merge mode is used.

According to a forty-sixth aspect of the present invention there is provided a method of decoding a motion information predictor index for an Affine Merge mode, comprising: generating a list of motion information predictor candidates; decoding the motion information predictor index using CABAC decoding, one or more bits of the motion information predictor index being bypass CABAC decoded; and when the Affine Merge mode is used, using the decoded motion information predictor index to identify one of the motion information predictor candidates in the list as an Affine Merge mode predictor.

Suitably, when a non-Affine Merge mode is used, the method further comprises using the decoded motion information predictor index to identify one of the motion information predictor candidates in the list as a non-Affine Merge mode predictor. Suitably, the method further comprises: obtaining, from a bitstream, data for indicating use of the Affine Merge mode, and the CABAC decoding comprises, for at least one bit of the motion information predictor index of a current block: when the obtained data indicates use of the Affine Merge mode, using a first context variable; and when the obtained data indicates use of the non-Affine Merge mode, using a second context variable. Alternatively, the CABAC decoding comprises using the same context variable for at least one bit of the motion information predictor index of a current block when the Affine Merge mode is used and when the non-Affine Merge mode is used.

Suitably, the method further comprises obtaining, from a bitstream, data for indicating use of the Affine Merge mode, wherein the generated list of motion information predictor candidates comprises: when the obtained data indicates use of the Affine Merge mode, Affine Merge mode predictor candidates; and when the obtained data indicate use of the non-Affine Merge mode, non-Affine Merge mode predictor candidates.

Suitably, decoding the motion information predictor index comprises parsing, from a bitstream, the same syntax element when the Affine Merge mode is used and when the non-Affine Merge mode is used. Suitably, the method further comprises obtaining, from a bitstream, data for determining a maximum number of motion information predictor candidates includable in the generated list of motion information predictor candidates. Suitably, all bits except for a first bit of the motion information predictor index are bypass CABAC decoded. Suitably, the first bit is CABAC decoded. Suitably, a motion information predictor candidate comprises information for obtaining a motion vector. Suitably, the generated list of motion information predictor candidates includes an ATMVP candidate. Suitably, the generated list of motion information predictor candidates has the same maximum number of motion information predictor candidates includable therein when the Affine Merge mode is used and when a non-Affine Merge mode is used.

According to a forty-seventh aspect of the present invention there is provided a device for encoding a motion information predictor index for an Affine Merge mode, comprising: means for generating a list of motion information predictor candidates; means for selecting one of the motion information predictor candidates in the list as an Affine Merge mode predictor; and means for generating a motion information predictor index for the selected motion information predictor candidate using CABAC coding, one or more bits of the motion information predictor index being bypass CABAC coded. Suitably, the device comprises means for performing a method of encoding a motion information predictor index according to the forty-fifth aspect.

According to a forty-eighth aspect of the present invention there is provided a device for decoding a motion information predictor index for an Affine Merge mode, comprising: means for generating a list of motion information predictor candidates; means for decoding the motion information predictor index using CABAC decoding, one or more bits of the motion information predictor index being bypass CABAC decoded; and means for, when the Affine Merge mode is used, using the decoded motion information predictor index to identify one of the motion information predictor candidates in the list as an Affine Merge mode predictor. Suitably, the device comprises means for performing a method of decoding a motion information predictor index according to the forty-sixth aspect.

In one embodiment the camera is adapted to indicate when said zooming means is operational and signal affine mode in dependence on said indication that the zooming means is operational.

In another embodiment the camera further comprises panning means.

In another embodiment the camera is adapted to indicate when said panning means is operational and signal affine mode in dependence on said indication that the panning means is operational.

According to yet another aspect of the present invention there is provided a mobile device comprising a camera embodying any of the camera aspects above.

In one embodiment the mobile device further comprises at least one positional sensor adapted to sense a change in orientation of the mobile device.

In one embodiment the mobile device is adapted to signal affine mode in dependence on said sensing a change in orientation of the mobile device.

Further features of the invention are characterised by the other independent and dependent claims.

Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

Reference will now be made, by way of example, to the accompanying drawings, in which:

FIG. 10A illustrates the coding of the Merge index for HEVC, or when ATMVP is not enabled at SPS level;

FIG. 10B illustrates the coding of the Merge index when ATMVP is enabled at SPS level;

DETAILED DESCRIPTION

Embodiments of the present invention described below relate to improving encoding and decoding of indexes using CABAC. It is understood that according to alternative embodiments of the present invention, an implementation for improving other context based arithmetic coding scheme functionally similar to the CABAC is also possible. Before describing the embodiments, video encoding and decoding techniques and related encoders and decoders will be described.

Figure 1:
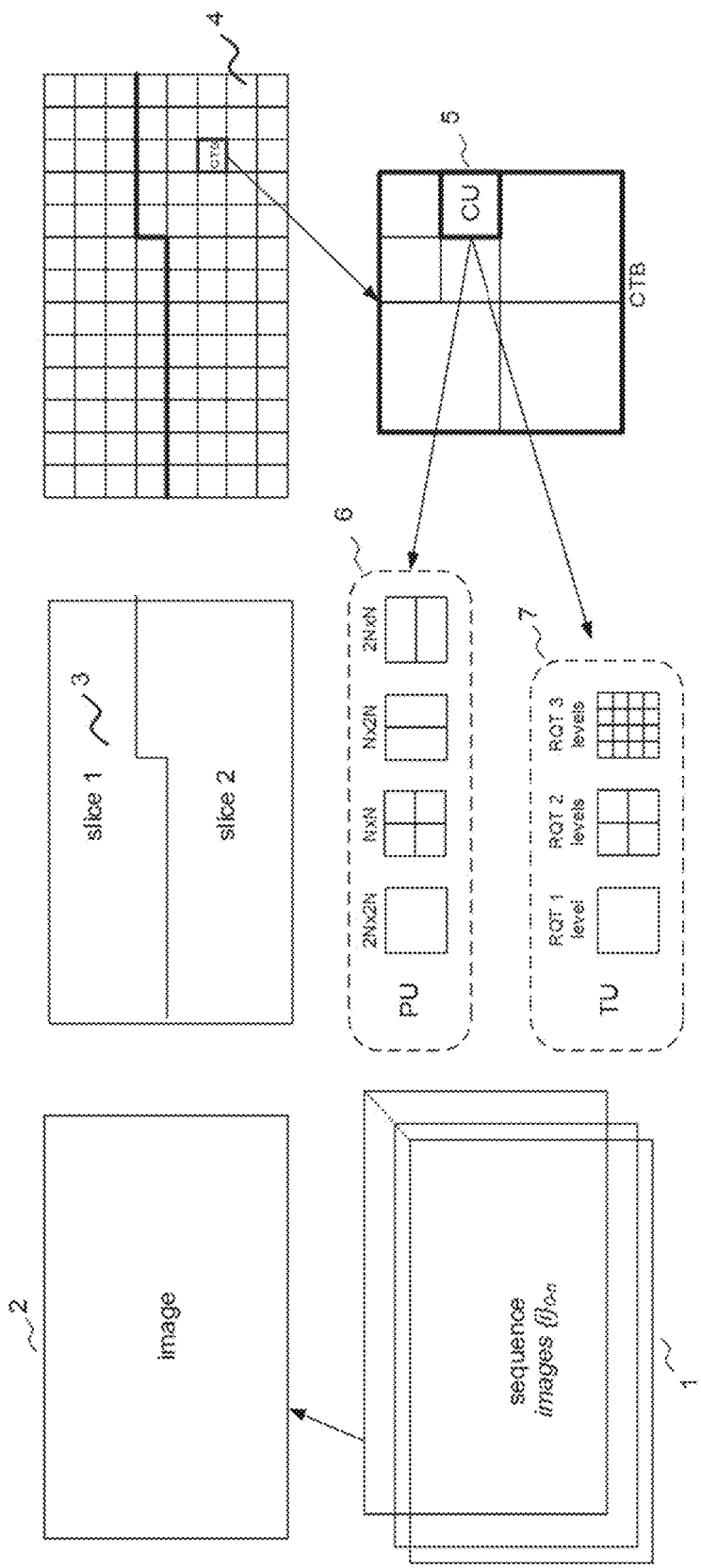
FIG. 1 is a diagram for use in explaining a coding structure used in HEVC.

FIG. 1 relates to a coding structure used in the High Efficiency Video Coding (HEVC) video standard. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels for HEVC, yet for VVC this size can be 128 pixels×128 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 6 including a partition into 4 square PUs and two different partitions into 2 rectangular PUs. A Transform Unit is an elementary unit that is subjected to spatial transformation using DCT. A CU can be partitioned into TUs based on a quadtree representation 7.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a new type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Figure 2:
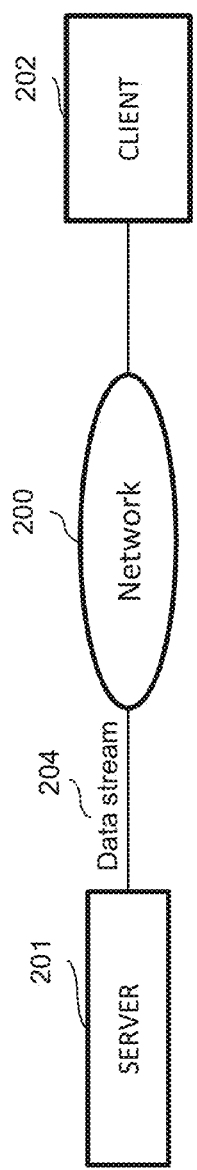
FIG. 2 is a block diagram schematically illustrating a data communication system in which one or more embodiments of the invention may be implemented.
Figure 18:
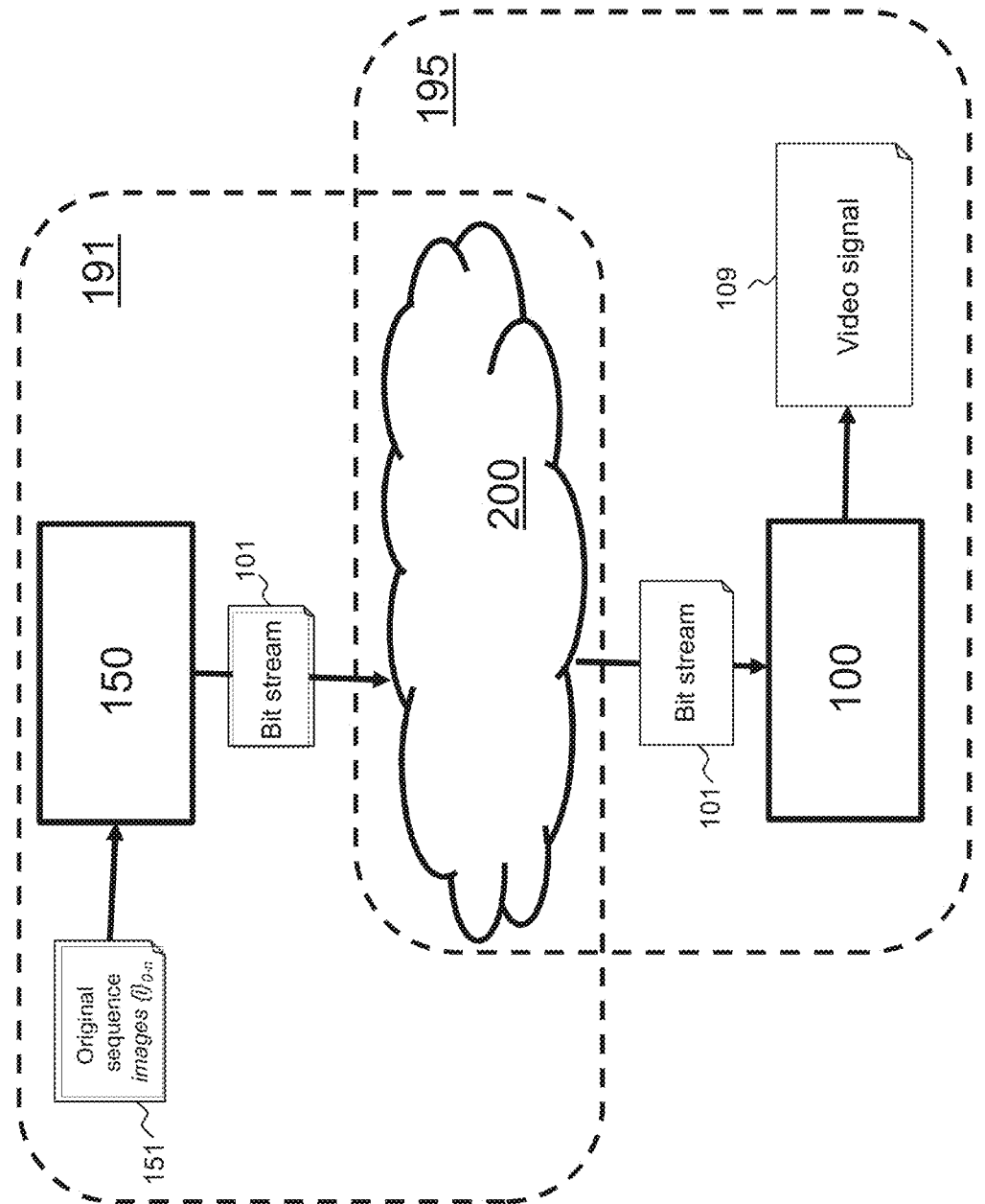
FIG. 18 is a schematic block diagram of a communication system for implementation of one or more embodiments of the invention.

FIG. 2 and FIG. 18 illustrate a (data) communication system in which one or more embodiments of the invention may be implemented. The data communication system comprises a transmission device 191, e.g. a server 201, which is operable to transmit data packets of a data stream (e.g. a bitstream 101) to a receiving device 195, e.g. a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 (or the bitstream 101) provided by the server 201 may be composed of multimedia data representing video (e.g. a sequence of images 151) and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder 150 for encoding video and audio streams in particular to provide a compressed bitstream 101 for transmission that is a more compact representation of the data presented as input to the encoder.

In order to obtain a better ratio of the quality of transmitted data to quantity of transmitted data, the compression of the video data may be for example in accordance with the HEVC format or H.264/AVC format or VVC format.

The client 202 receives the transmitted bitstream 101 and its decoder 100 decodes the reconstructed bitstream to reproduce video images (e.g. a video signal 109) on a display device and the audio data by a loud speaker.

Although a streaming scenario is considered in the example of FIG. 2 and FIG. 18, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
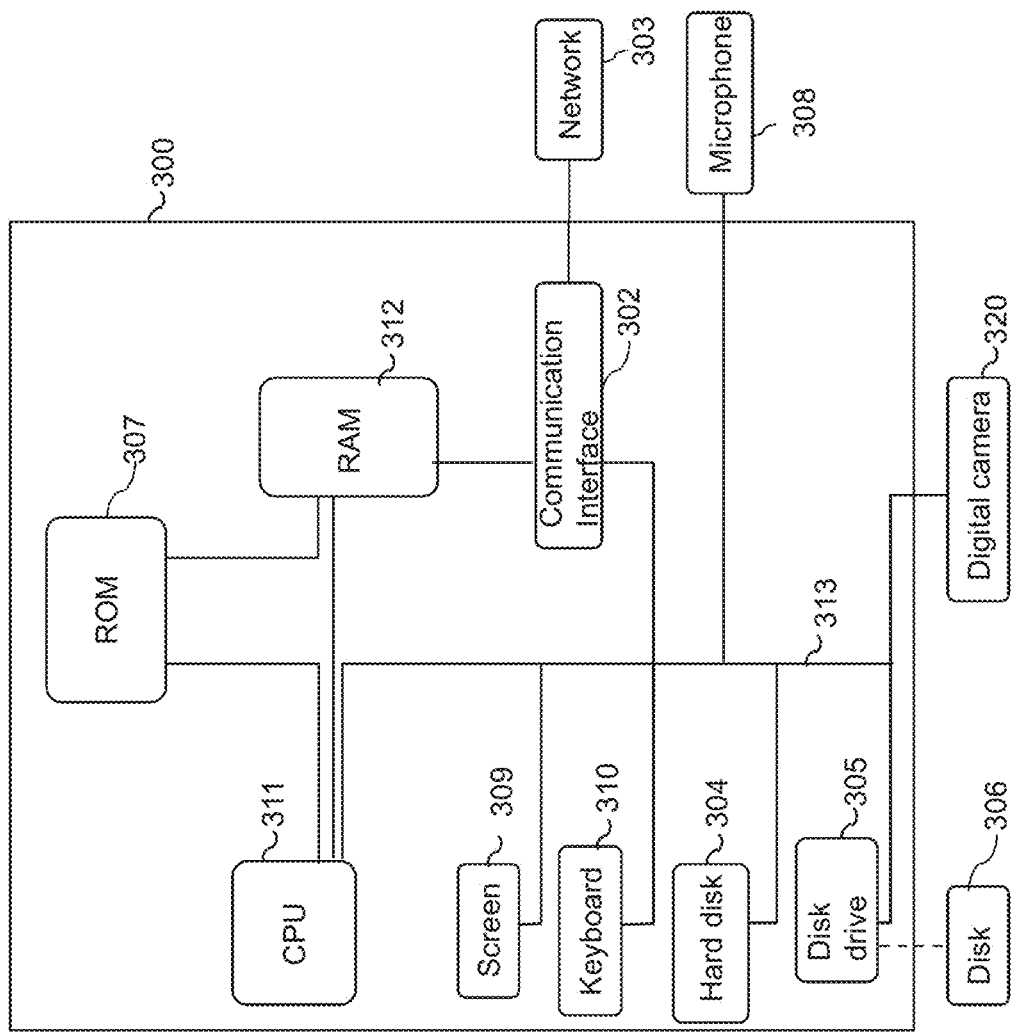
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:
- a central processing unit 311, such as a microprocessor, denoted CPU;
- a read only memory 307, denoted ROM, for storing computer programs for implementing the invention;
- a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 302 connected to a communication network 303 over which digital data to be processed are transmitted or received.

Optionally, the apparatus 300 may also include the following components:
- a data storage means 304 such as a hard disk, for storing computer programs for implementing methods of one or more embodiments of the invention and data used or produced during the implementation of one or more embodiments of the invention;
- a disk drive 305 for a disk 306, the disk drive being adapted to read data from the disk 306 or to write data onto said disk; and
- a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus 313 provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 307, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 307, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
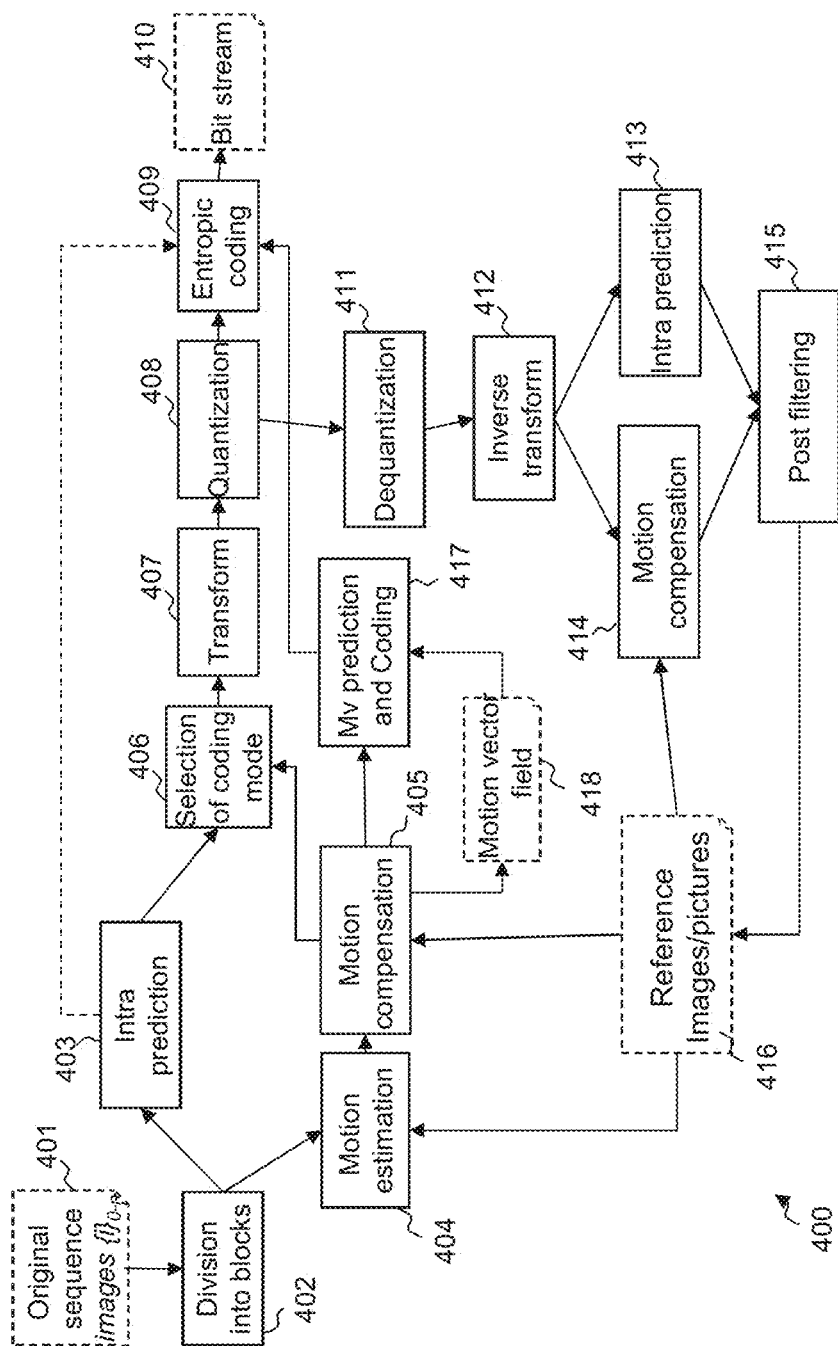
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, sometimes also referred to as pixels (hereinafter, they are referred to as pixels).

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighborhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly a reference image from among a set of reference images 416 is selected, and a portion of the reference image, also called reference area or image portion, which is the closest area (closest in terms of pixel value similarity) to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated using a motion vector.

Thus, in both cases (spatial and temporal prediction), a residual is computed by subtracting the predictor from the original block.

In the INTRA prediction implemented by module 403, a prediction direction is encoded. In the Inter prediction implemented by modules 404, 405, 416, 418, 417, at least one motion vector or data for identifying such motion vector is encoded for the temporal prediction.

Information relevant to the motion vector and the residual block is encoded if the Inter prediction is selected. To further reduce the bitrate, assuming that motion is homogeneous, the motion vector is encoded by difference with respect to a motion vector predictor. Motion vector predictors from a set of motion information predictor candidates is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image (e.g. those in Reference images/pictures 416) for the motion estimation of the subsequent images. This enables the encoder and the decoder receiving the bitstream to have the same reference frames (reconstructed images or image portions are used). The inverse quantization ("dequantization") module 411 performs inverse quantization ("dequantization") of the quantized data, followed by an inverse transform by inverse transform module 412. The intra prediction module 413 uses the prediction information to determine which predictor to use for a given block and the motion compensation module 414 actually adds the residual obtained by module 412 to the reference area obtained from the set of reference images 416.

Post filtering is then applied by module 415 to filter the reconstructed frame (image or image portions) of pixels. In the embodiments of the invention an SAO loop filter is used in which compensation offsets are added to the pixel values of the reconstructed pixels of the reconstructed image. It is understood that post filtering does not always have to be performed. Also, any other type of post filtering may also be performed in addition to, or instead of, the SAO loop filtering.

Figure 5:
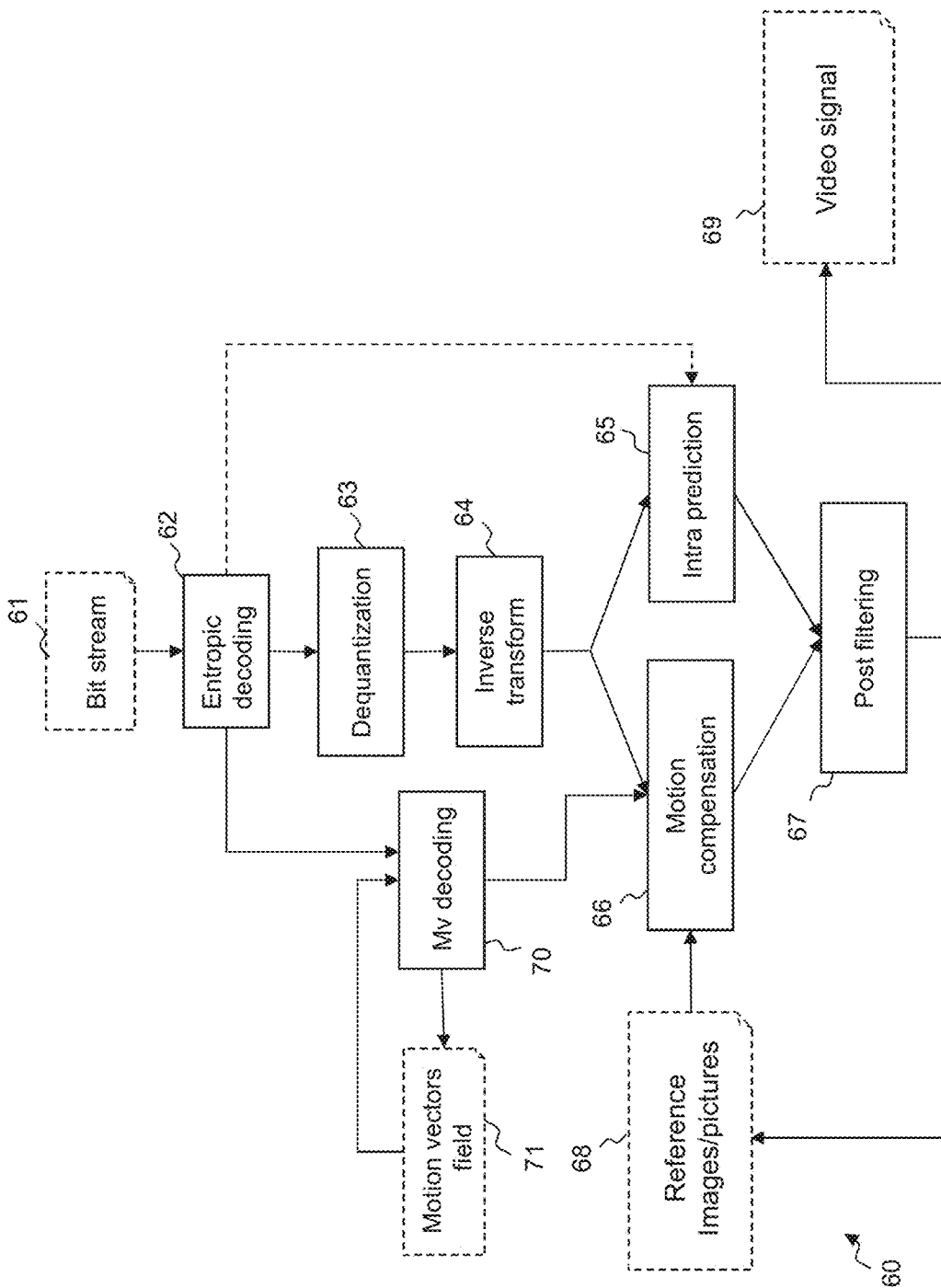
FIG. 5 is a flow chart illustrating steps of a decoding method according to embodiments of the invention.

FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoded units (e.g. data corresponding to a block or a coding unit), each one being composed of a header containing information on encoding parameters and a body containing the encoded video data. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then an inverse transform is applied by module 64 to obtain pixel values.

The mode data indicating the coding mode are also entropy decoded and based on the mode, an INTRA type decoding or an INTER type decoding is performed on the encoded blocks (units/sets/groups) of image data.

In the case of INTRA mode, an INTRA predictor is determined by intra prediction module 65 based on the intra prediction mode specified in the bitstream.

If the mode is INTER, the motion prediction information is extracted from the bitstream so as to find (identify) the reference area used by the encoder. The motion prediction information comprises the reference frame index and the motion vector residual. The motion vector predictor is added to the motion vector residual by motion vector decoding module 70 in order to obtain the motion vector.

Motion vector decoding module 70 applies motion vector decoding for each current block encoded by motion prediction. Once an index of the motion vector predictor for the current block has been obtained, the actual value of the motion vector associated with the current block can be decoded and used to apply motion compensation by module 66. The reference image portion indicated by the decoded motion vector is extracted from a reference image 68 to apply the motion compensation 66. The motion vector(s) field data 71 is updated with the decoded motion vector in order to be used for the prediction of subsequent decoded motion vectors.

Finally, a decoded block is obtained. Where appropriate, post filtering is applied by post filtering module 67. A decoded video signal 69 is finally obtained and provided by the decoder 60.

CABAC

HEVC uses several types of entropy coding like the Context based Adaptive Binary Arithmetic Coding (CABAC), Golomb-rice Code, or simple binary representation called Fixed Length Coding. Most of the time, a binary encoding process is performed to represent different syntax elements. This binary encoding process is also very specific and depends on the different syntax elements. An arithmetic coding represents the syntax element according to their current probabilities. CABAC is an extension of the arithmetic coding which separates the probabilities of a syntax element depending on a 'context' defined by a context variable. This corresponds to a conditional probability. The context variable may be derived from the value of the current syntax for the top left block (A2 in FIG. 6B as described in more detail below) and the above left block (B3 in FIG. 6B), which are already decoded.

CABAC has been adopted as a normative part of the H.264/AVC and H.265/HEVC standards. In H.264/AVC, it is one of two alternative methods of entropy coding. The other method specified in H.264/AVC is a low-complexity entropy-coding technique based on the usage of context-adaptively switched sets of variable-length codes, so-called Context-Adaptive Variable-Length Coding (CAVLC). Compared to CABAC, CAVLC offers reduced implementation costs at the price of lower compression efficiency. For TV signals in standard- or high-definition resolution, CABAC typically provides bit-rate savings of 10-20% relative to CAVLC at the same objective video quality. In HEVC, CABAC is one of the entropy coding method used. Many bits are also bypass CABAC coded. Moreover, some syntax elements are coded with unary codes or Golomb codes, which are other types of entropy codes.

Figure 17:
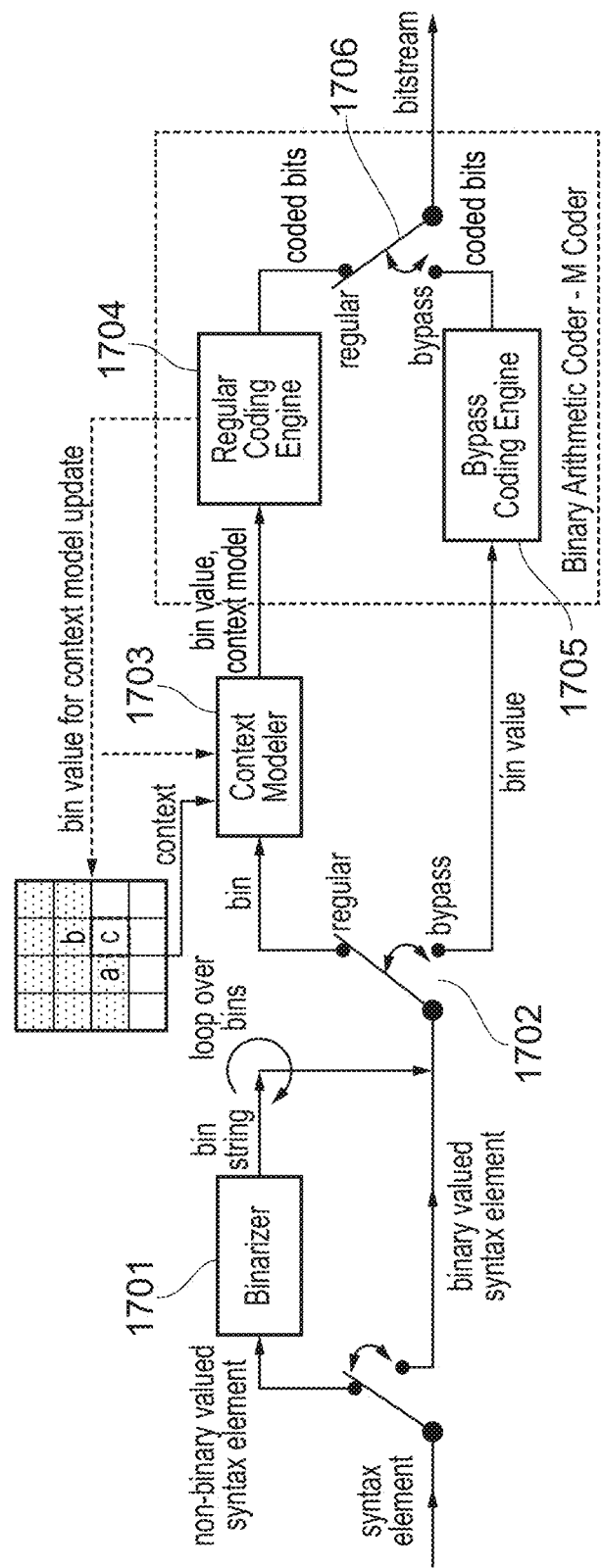
FIG. 17 is a block diagram for use in explaining a CABAC encoder suitable for use in embodiments of the invention.

FIG. 17 shows the main blocks of a CABAC encoder.

An input syntax element that is non-binary valued is binarized by a binarizer 1701. The coding strategy of CABAC is based on the finding that a very efficient coding of syntax-element values in a hybrid block-based video coder, like components of motion vector differences or transform-coefficient level values, can be achieved by employing a binarization scheme as a kind of preprocessing unit for the subsequent stages of context modeling and binary arithmetic coding. In general, a binarization scheme defines a unique mapping of syntax element values to sequences of binary decisions, so-called bins, which can also be interpreted in terms of a binary code tree. The design of binarization schemes in CABAC is based on a few elementary prototypes whose structure enables simple online calculation and which are adapted to some suitable model-probability distributions.

Each bin can be processed in one of two basic ways according to the setting of a switch 1702. When the switch is in the "regular" setting, the bin is supplied to a context modeler 1703 and a regular coding engine 1704. When the switch is in the "bypass" setting, the context modeler is bypassed and the bin is supplied to a bypass coding engine 1705. Another switch 1706 has "regular" and "bypass" settings similar to the switch 1702 so that the bins coded by the applicable one of the coding engines 1704 and 1705 can form a bitstream as the output of the CABAC encoder.

It is understood that the other switch 1706 may be used with a storage to group some of the bins (e.g. the bins for encoding a block or a coding unit) coded by the coding engine 1705 to provide a block of bypass coded data in the bitstream, and to group some of the bins (e.g. the bins for encoding a block or a coding unit) coded by the coding engine 1704 to provide another block of "regular" (or arithmetically) coded data in the bitstream. This separate grouping of bypass coded and regular coded data can lead to improved throughput during the decoding process.

By decomposing each syntax element value into a sequence of bins, further processing of each bin value in CABAC depends on the associated coding-mode decision, which can be either chosen as the regular or the bypass mode. The latter is chosen for bins related to the sign information or for lower significant bins, which are assumed to be uniformly distributed and for which, consequently, the whole regular binary arithmetic encoding process is simply bypassed. In the regular coding mode, each bin value is encoded by using the regular binary arithmetic-coding engine, where the associated probability model is either determined by a fixed choice, without any context modeling, or adaptively chosen depending on the related context model. As an important design decision, the latter case is generally applied to the most frequently observed bins only, whereas the other, usually less frequently observed bins, will be treated using a joint, typically zero-order probability model. In this way, CABAC enables selective context modeling on a sub-symbol level, and hence, provides an efficient instrument for exploiting inter-symbol redundancies at significantly reduced overall modeling or learning costs. For the specific choice of context models, four basic design types are employed in CABAC, where two of them are applied to coding of transform-coefficient levels only. The design of these four prototypes is based on a priori knowledge about the typical characteristics of the source data to be modeled and it reflects the aim to find a good compromise between the conflicting objectives of avoiding unnecessary modeling-cost overhead and exploiting the statistical dependencies to a large extent.

On the lowest level of processing in CABAC, each bin value enters the binary arithmetic encoder, either in regular or bypass coding mode. For the latter, a fast branch of the coding engine with a considerably reduced complexity is used while for the former coding mode, encoding of the given bin value depends on the actual state of the associated adaptive probability model that is passed along with the bin value to the M coder—a term that has been chosen for the table-based adaptive binary arithmetic coding engine in CABAC.

Inter Coding

HEVC uses 3 different INTER modes: the Inter mode (Advanced Motion Vector Prediction (AMVP)), the "classical" Merge mode (i.e. the "non-Affine Merge mode" or also known as "regular" Merge mode) and the "classical" Merge Skip mode (i.e. the "non-Affine Merge Skip" mode or also known as "regular" Merge Skip mode). The main difference between these modes is the data signalling in the bitstream. For the Motion vector coding, the current HEVC standard includes a competition based scheme for Motion vector prediction which was not present in earlier versions of the standard. It means that several candidates are competing with the rate distortion criterion at encoder side in order to find the best motion vector predictor or the best motion information for respectively the Inter or the Merge modes (i.e. the "classical/regular" Merge mode or the "classical/regular" Merge Skip mode). An index corresponding to the best predictors or the best candidate of the motion information is then inserted in the bitstream. The decoder can derive the same set of predictors or candidates and uses the best one according to the decoded index. In the Screen Content Extension of HEVC, the new coding tool called Intra Block Copy (IBC) is signalled as any of those three INTER modes, the difference between IBC and the equivalent INTER mode being made by checking whether the reference frame is the current one. This can be implemented e.g. by checking the reference index of the list L0, and deducing this is Intra Block Copy if this is the last frame in that list. Another way to do is comparing the Picture Order Count of current and reference frames: if equal, this is Intra Block Copy.

The design of the derivation of predictors and candidates is important in achieving the best coding efficiency without a disproportionate impact on complexity. In HEVC two motion vector derivations are used: one for Inter mode (Advanced Motion Vector Prediction (AMVP)) and one for Merge modes (Merge derivation process—for the classical Merge mode and the classical Merge Skip mode). The following describes these processes.

Figure 6A:
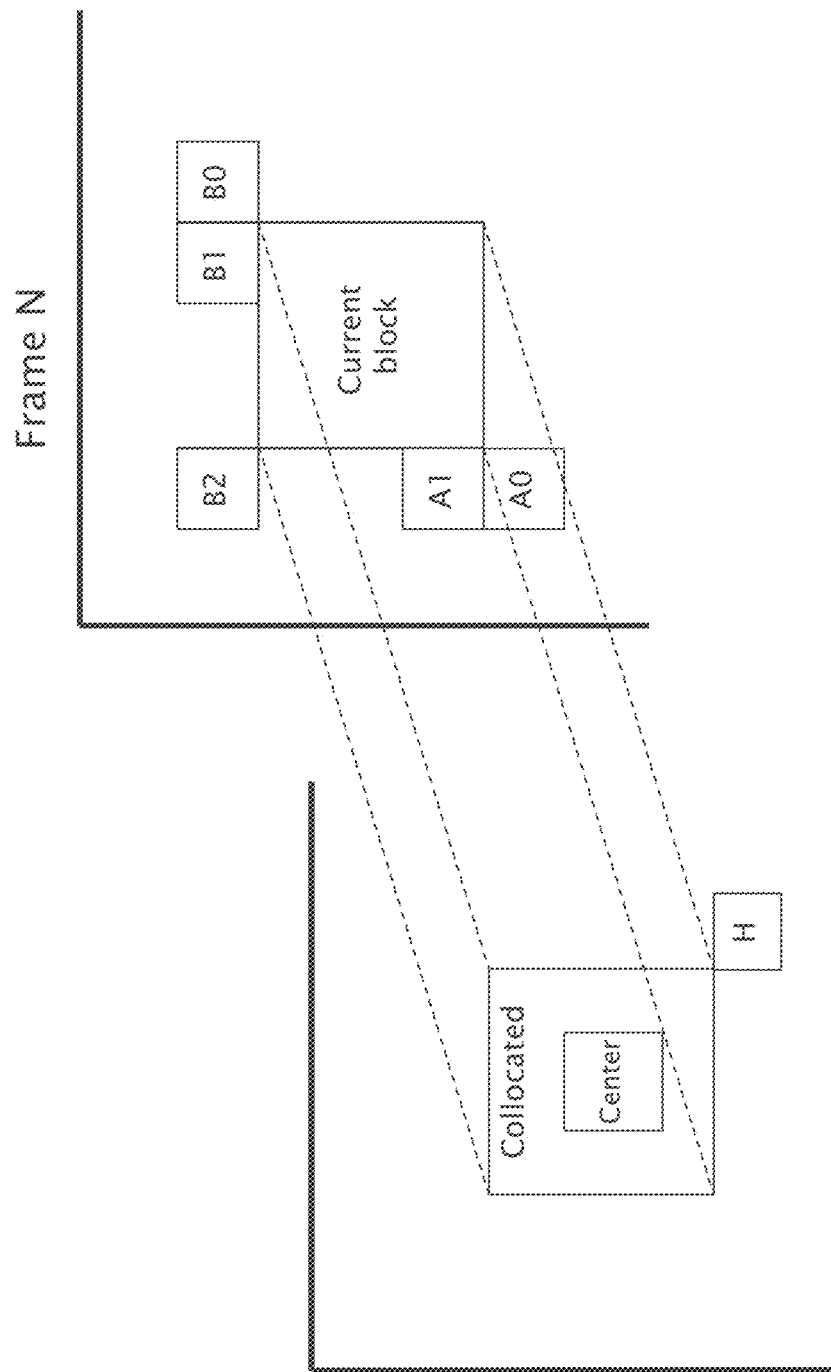
FIGS. 6A and 6B illustrate spatial and temporal blocks that can be used to generate motion vector predictors.
Figure 6B:
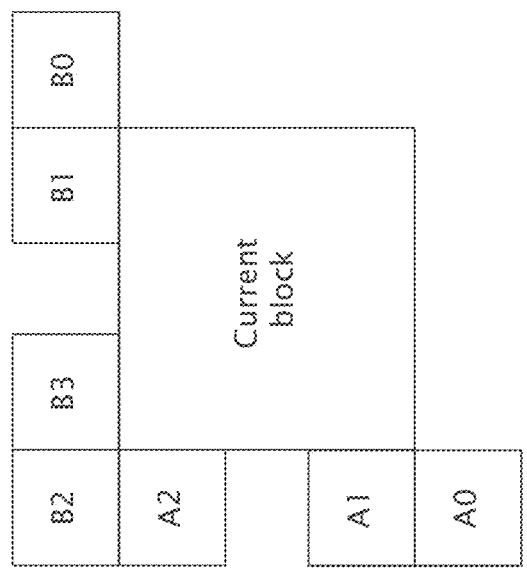
Figure 7:
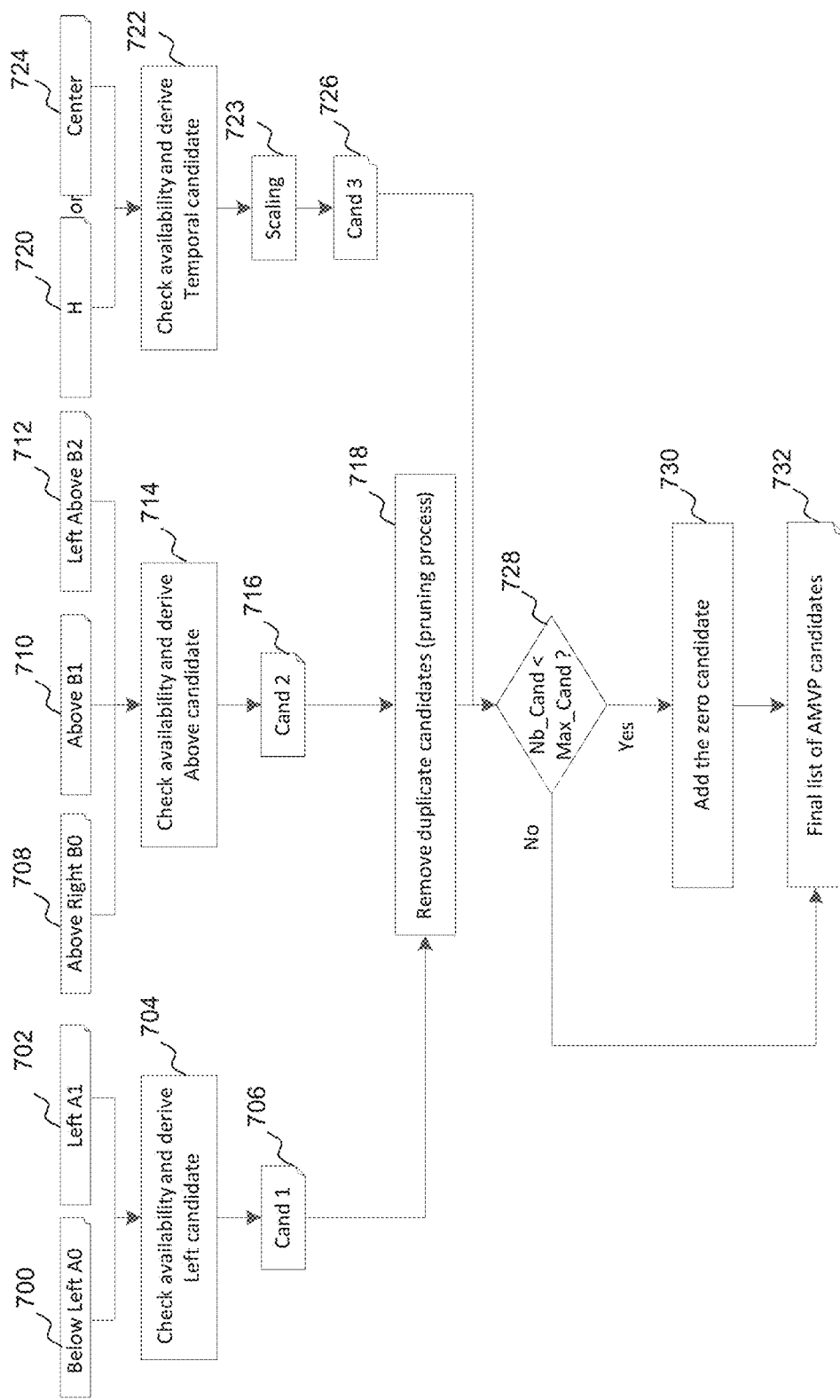
FIG. 7 shows simplified steps of the process of an AMVP predictor set derivation.

FIGS. 6A and 6B illustrates spatial and temporal blocks that can be used to generate motion vector predictors in Advanced Motion Vector Prediction (AMVP) and Merge modes of HEVC coding and decoding systems and FIG. 7 shows simplified steps of the process of the AMVP predictor set derivation.

Two spatial predictors, i.e. the two spatial motion vectors for the AMVP mode, are chosen among motion vectors of the top blocks (indicated by letter 'B') and the left blocks (indicated by letter 'A') including the top corner blocks (block B2) and left corner block (block A0), and one temporal predictor is chosen among motion vectors of the bottom right block (H) and centre block (Center) of the collocated block as represented in FIG. 6A.

Table 1 below outlines the nomenclature used when referring to blocks in relative terms to the current block as shown in FIGS. 6A and 6B. This nomenclature is used as shorthand but it should be appreciated other systems of labelling may be used, in particular in future versions of a standard.

TABLE 1

| Block label | Relative positional description of neighbouring block |
|---|---|
| A0 | 'Below left' or 'Left corner' - diagonally down and to the left of the current block |
| A1 | 'Left' or 'Bottom left' - left of the bottom of the current block |
| A2 | 'Top left' - left of the top of the current block |
| B0 | 'Above right' - diagonally up and to the right of the current block |
| B1 | 'Above' - above the top right of the current block |
| B2 | 'Above left' or 'Top corner' - diagonally up and to the left of the current block |
| B3 | 'Up' - above the top left of the current block |
| H | Bottom right of a collocated block in a reference frame |
| Center | A block within a collocated block in a reference frame |

It should be noted that the 'current block' may be variable in size, for example 4×4, 16×16, 32×32, 64×64, 128×128 or any size in between. The dimensions of a block are preferably factors of 2 (i.e. $2^n \times 2^m$ where n and m are positive integers) as this results in a more efficient use of bits when using binary encoding. The current block need not be square, although this is often a preferable embodiment for coding complexity.

Turning to FIG. 7, a first step aims at selecting a first spatial predictor (Cand 1, 706) among the bottom left blocks A0 and A1, that spatial positions are illustrated in FIG. 6A. To that end, these blocks are selected (700, 702) one after another, in the given order, and, for each selected block, following conditions are evaluated (704) in the given order, the first block for which conditions are fulfilled being set as a predictor:

the motion vector from the same reference list and the same reference image;
the motion vector from the other reference list and the same reference image;
the scaled motion vector from the same reference list and a different reference image;

or the scaled motion vector from the other reference list and a different reference image.

If no value is found, the left predictor is considered as being unavailable. In this case, it indicates that the related blocks were INTRA coded or those blocks do not exist.

A following step aims at selecting a second spatial predictor (Cand 2, 716) among the above right block B0, above block B1, and above left block B2, that spatial positions are illustrated in FIG. 6A. To that end, these blocks are selected (708, 710, 712) one after another, in the given order, and, for each selected block, the above mentioned conditions are evaluated (714) in the given order, the first block for which the above mentioned conditions are fulfilled being set as a predictor.

Again, if no value is found, the top predictor is considered as being unavailable. In this case, it indicates that the related blocks were INTRA coded or those blocks do not exist.

In a next step (718), the two predictors, if both are available, are compared one to the other to remove one of them if they are equal (i.e. same motion vector values, same reference list, same reference index and the same direction type). If only one spatial predictor is available, the algorithm is looking for a temporal predictor in a following step.

The temporal motion predictor (Cand 3, 726) is derived as follows: the bottom right (H, 720) position of the collocated block in a previous/reference frame is first considered in the availability check module 722. If it does not exist or if the motion vector predictor is not available, the centre of the collocated block (Centre, 724) is selected to be checked. These temporal positions (Centre and H) are depicted in FIG. 6A. In any case, scaling 723 is applied on those candidates to match the temporal distance between current frame and the first frame in the reference list.

The motion predictor value is then added to the set of predictors. Next, the number of predictors (Nb_Cand) is compared (728) to the maximum number of predictors (Max_Cand). As mentioned above, the maximum number of predictors (Max_Cand) of motion vector predictors that the derivation process of AMVP needs to generate is two in the current version of HEVC standard.

If this maximum number is reached, the final list or set of AMVP predictors (732) is built. Otherwise, a zero predictor is added (730) to the list. The zero predictor is a motion vector equal to (0, 0).

As illustrated in FIG. 7, the final list or set of AMVP predictors (732) is built from a subset of spatial motion predictor candidates (700 to 712) and from a subset of temporal motion predictor candidates (720, 724).

As mentioned above, a motion predictor candidate of the classical Merge mode or of the classical Merge Skip mode represents all the required motion information: direction, list, reference frame index, and motion vectors. An indexed list of several candidates is generated by the Merge derivation process. In the current HEVC design the maximum number of candidates for both Merge modes (i.e. the classical Merge mode and the classical Merge Skip mode) is equal to five (4 spatial candidates and 1 temporal candidate).

Figure 8:
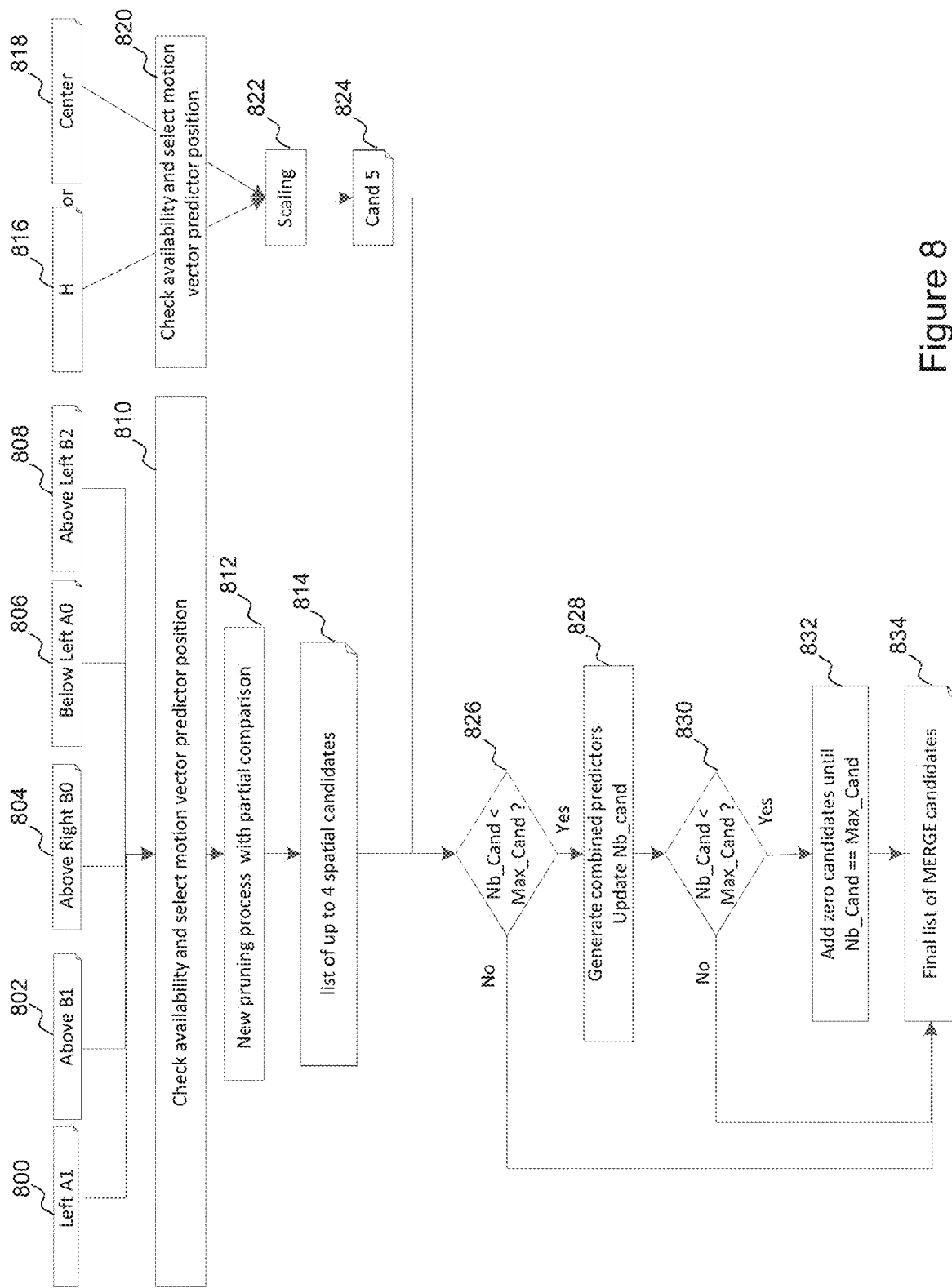
FIG. 8 is a schematic of a motion vector derivation process of the Merge modes.

FIG. 8 is a schematic of a motion vector derivation process of the Merge modes (the classical Merge mode and the classical Merge Skip mode). In a first step of the derivation process, five block positions are considered (800 to 808). These positions are the spatial positions depicted in FIG. 6A with references A1, B1, B0, A0, and B2. In a following step, the availability of the spatial motion vectors is checked and at most five motion vectors are selected/obtained for consideration (810). A predictor is considered as available if it exists and if the block is not INTRA coded. Therefore, selecting the motion vectors corresponding to the five blocks as candidates is done according to the following conditions:

- if the "left" A1 motion vector (800) is available (810), i.e. if it exists and if this block is not INTRA coded, the motion vector of the "left" block is selected and used as a first candidate in list of candidate (814);
- if the "above" B1 motion vector (802) is available (810), the candidate "above" block motion vector is compared to "left" A1 motion vector (812), if it exists. If B1 motion vector is equal to A1 motion vector, B1 is not added to the list of spatial candidates (814). On the contrary, if B1 motion vector is not equal to A1 motion vector, B1 is added to the list of spatial candidates (814);
- if the "above right" B0 motion vector (804) is available (810), the motion vector of the "above right" is compared to B1 motion vector (812). If B0 motion vector is equal to B1 motion vector, B0 motion vector is not added to the list of spatial candidates (814). On the contrary, if B0 motion vector is not equal to B1 motion vector, B0 motion vector is added to the list of spatial candidates (814);
- if the "below left" A0 motion vector (806) is available (810), the motion vector of the "below left" is compared to A1 motion vector (812). If A0 motion vector is equal to A1 motion vector, A0 motion vector is not added to the list of spatial candidates (814). On the contrary, if A0 motion vector is not equal to A1 motion vector, A0 motion vector is added to the list of spatial candidates (814); and
- if the list of spatial candidates doesn't contain four candidates, the availability of "above left" B2 motion vector (808) is checked (810). If it is available, it is compared to A1 motion vector and to B1 motion vector. If B2 motion vector is equal to A1 motion vector or to B1 motion vector, B2 motion vector is not added to the list of spatial candidates (814). On the contrary, if B2 motion vector is not equal to A1 motion vector or to B1 motion vector, B2 motion vector is added to the list of spatial candidates (814).

At the end of this stage, the list of spatial candidates comprises up to four candidates. For the temporal candidate, two positions can be used: the bottom right position of the collocated block (816, denoted H in FIG. 6A) and the centre of the collocated block (818). These positions are depicted in FIG. 6A.

As described in relation to FIG. 7 for the temporal motion predictor of the AMVP motion vector derivation process, a first step aims at checking (820) the availability of the block at the H position. Next, if it is not available, the availability of the block at the centre position is checked (820). If at least one motion vector of these positions is available, the temporal motion vector can be scaled (822), if needed, to the reference frame having index 0, for both list L0 and L1, in order to create a temporal candidate (824) which is added to the list of Merge motion vector predictor candidates. It is positioned after the spatial candidates in the list. The lists L0 and L1 are 2 reference frame lists containing zero, one or more reference frames.

If the number (Nb_Cand) of candidates is strictly less (826) than the maximum number of candidates (Max_Cand that value is signalled in the bit-stream slice header and is equal to five in the current HEVC design) and if the current frame is of the B type, combined candidates are generated (828). Combined candidates are generated based on available candidates of the list of Merge motion vector predictor candidates. It mainly consists in combining (pairing) the motion information of one candidate of the list L0 with the motion information of one candidate of list L1.

If the number (Nb_Cand) of candidates remains strictly less (830) than the maximum number of candidates (Max_Cand), zero motion candidates are generated (832) until the number of candidates of the list of Merge motion vector predictor candidates reaches the maximum number of candidates.

At the end of this process, the list or set of Merge motion vector predictor candidates (i.e. a list or set of candidates for the Merge modes, which are the classical Merge mode and the classical Merge Skip mode) is built (834). As illustrated in FIG. 8, the list or set of Merge motion vector predictor candidates is built (834) from a subset of spatial candidates (800 to 808) and from a subset of temporal candidates (816, 818).

Alternative Temporal Motion Vector Prediction (ATMVP)

Figure 9:
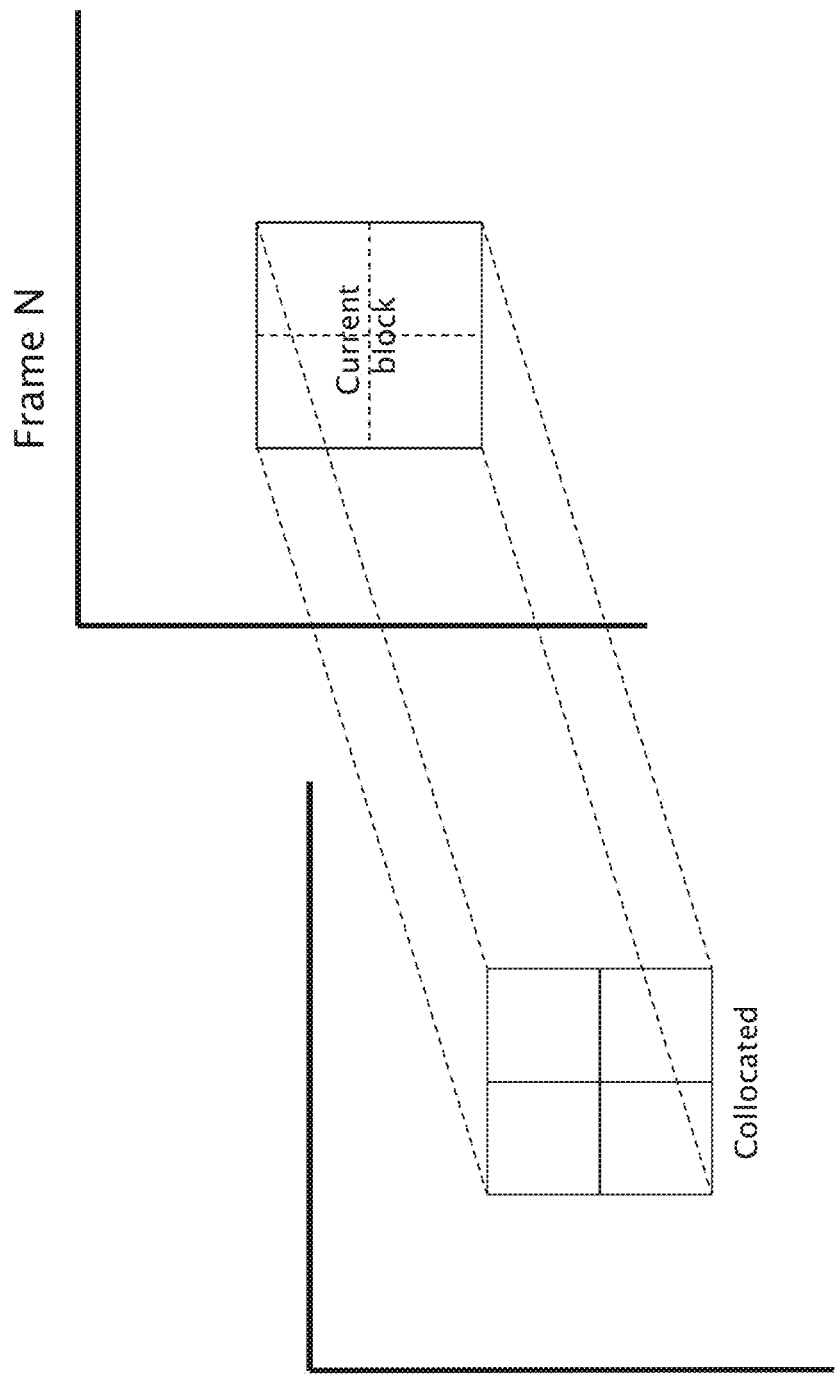
FIG. 9 illustrates segmentation of a current block and temporal motion vector prediction.

The alternative temporal motion vector prediction (ATMVP) is a special type of motion compensation. Instead of considering only one motion information for the current block from a temporal reference frame, each motion information of each collocated block is considered. So this temporal motion vector prediction gives a segmentation of the current block with the related motion information of each sub-block as depicted in FIG. 9.

In the current VTM reference software, ATMVP is signalled as a Merge candidate inserted in the list of Merge candidates (i.e. a list or set of candidates for the Merge modes, which are the classical Merge mode and the classical Merge Skip mode). When ATMVP is enabled at SPS level, the maximum number of Merge candidates is increased by one. So 6 candidates are considered instead of 5, which would have been the case if this ATMVP mode is disabled.

In addition when this prediction is enabled at SPS level, all bins of Merge index (i.e. an identifier or an index for identifying a candidate from the list of Merge candidates) are context coded by CABAC. While in HEVC, or when ATMVP is not enabled at SPS level in JEM, only the first bin is context coded and the remaining bins are context by-pass coded (i.e. bypass CABAC coded). FIG. 10A illustrates the coding of the Merge index for HEVC, or when ATMVP is not enabled at SPS level in JEM. This corresponds to a unary max coding. In addition the first bit is CABAC coded and the other bits are bypass CABAC coded.

FIG. 10B illustrates the coding of the Merge index when ATMVP is enabled at SPS level. In addition all bits are CABAC coded (from the $1^{st}$ to the $5^{th}$ bit). It should be noted that each bit for coding the index has its own context—in other words their probabilities are separated.

Affine Mode

In HEVC, only translation motion model is applied for motion compensation prediction (MCP). While in the real world, there are many kinds of motion, e.g. zoom in/out, rotation, perspective motions and other irregular motions.

In the JEM, a simplified affine transform motion compensation prediction is applied and the general principle of Affine mode is described below based on an extract of document JVET-G1001 presented at a JVET meeting in Torino at 13-21 Jul. 2017. This entire document is hereby incorporated by reference insofar as it describes other algorithms used in JEM.

Figure 11B:
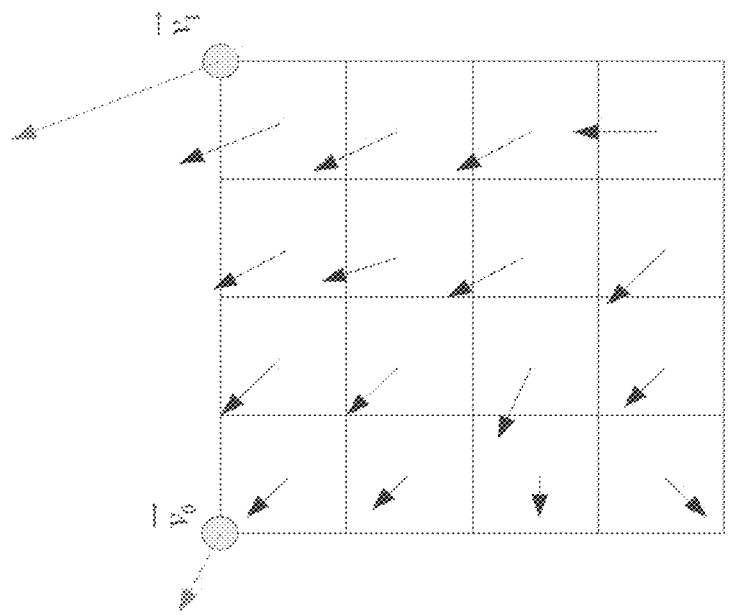
FIG. 11B illustrates a more complex affine motion field.
Figure 11A:
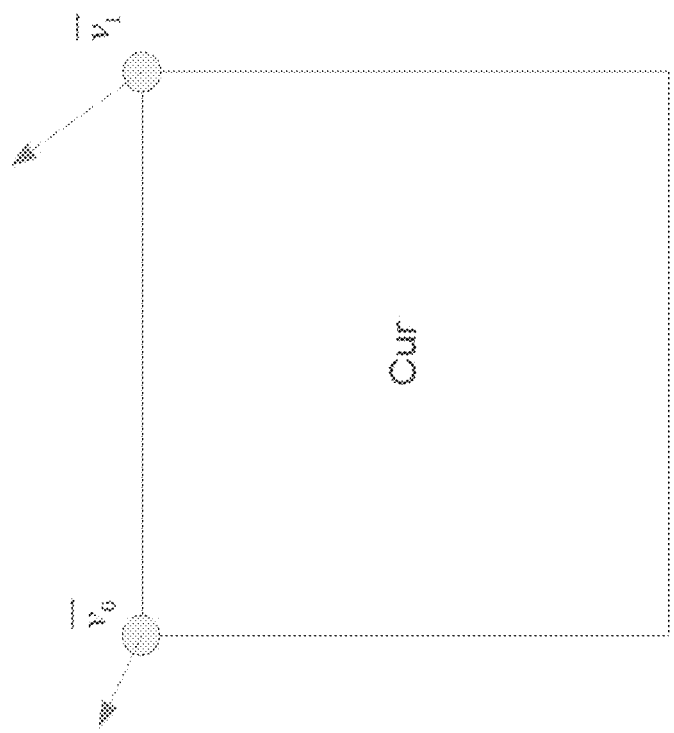
FIG. 11A illustrates a simple affine motion field.

As shown in FIG. 11A, the affine motion field of the block is described by two control point motion vectors.

The motion vector field (MVF) of a block is described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point. And w is the width of the block Cur (current block).

In order to further simplify the motion compensation prediction, sub-block based affine transform prediction is applied. The sub-block size M×N is derived as in Equation 2, where MvPre is the motion vector fraction accuracy ($\frac{1}{16}$ in JEM), $(v_{2x}, v_{2y})$ is motion vector of the top-left control point, calculated according to Equation 1.

$$\begin{cases} M = clip3\left(4, w, \dfrac{w \times MvPre}{\max(\text{abs}(v_{1x} - v_{0x}), \text{abs}(v_{1y} - v_{0y}))}\right) \\ N = clip3\left(4, h, \dfrac{h \times MvPre}{\max(\text{abs}(v_{2x} - v_{0x}), \text{abs}(v_{2y} - v_{0y}))}\right) \end{cases} \quad (2)$$

After derived by Equation 2, M and N may be adjusted downward if necessary to make it a divisor of w and h, respectively. h is the height of the current block Cur (current block).

To derive motion vector of each M×N sub-block, the motion vector of the center sample of each sub-block, as shown in FIG. 6A, is calculated according to Equation 1, and rounded to $\frac{1}{16}$ fraction accuracy. Then motion compensation interpolation filters are applied to generate the prediction of each sub-block with derived motion vector.

The affine mode is a motion compensation mode like the Inter modes (AMVP, "classical" Merge, or "classical" Merge Skip). Its principle is to generate one motion information per pixel according to 2 or 3 neighbouring motion information. In the JEM, the affine mode derives one motion information for each 4×4 block as depicted in FIG. 11A/11B (each square is a 4×4 block, and the whole block in FIG. 11A/11B is a 16×16 block which is divided into 16 blocks of such square of 4×4 size—each 4×4 square block having a motion vector associated therewith). It is understood that in embodiments of the present invention, the affine mode may drive one motion information for a block of a different size or shape as long as the one motion information can be derived. This mode is available for the AMVP mode and the Merge modes (i.e. the classical Merge mode which is also referred to as "non-Affine Merge mode" and the classical Merge Skip mode which is also referred to as "non-Affine Merge Skip mode"), by enabling the affine mode with a flag. This flag is CABAC coded. In an embodiment, the context depends on the sum of affine flags of the left block (position A2 of FIG. 6B) and the above left block (position B3 of FIG. 6B).

So three context variables (0, 1 or 2) are possible in the JEM for the affine flag given by the following formula:

Ctx=IsAffine(A2)+IsAffine(B3)

Where IsAffine(block) is a function which returns 0 if the block is not an affine block and 1 if the block is affine.

Affine Merge Candidate Derivation

In the JEM, the Affine Merge mode (or the Affine Merge Skip mode) derives motion information for the current block from the first neighbouring block which is affine (i.e. the first neighbouring block that is coded using the affine mode) among blocks at positions A1, B1, B0, A0, B2. These positions are depicted in FIGS. 6A and 6B. However, how the affine parameter is derived is not completely defined, and the present invention aims to improve at least this aspect, for example by defining affine parameters of the Affine Merge mode so that it enables a wider selection choice for the Affine Merge candidates (i.e. not just the first neighbouring block which is affine but at least one other candidate is available for the selection with an identifier such as an index).

For example, according to some embodiments of the present invention, an Affine Merge mode with its own list of Affine Merge candidates (candidates for deriving/obtaining motion information for the Affine mode) and an Affine Merge index (for identifying one Affine Merge candidate from the list of Affine Merge candidates) is used to encode or decode a block.

Affine Merge Signalling

Figure 12:
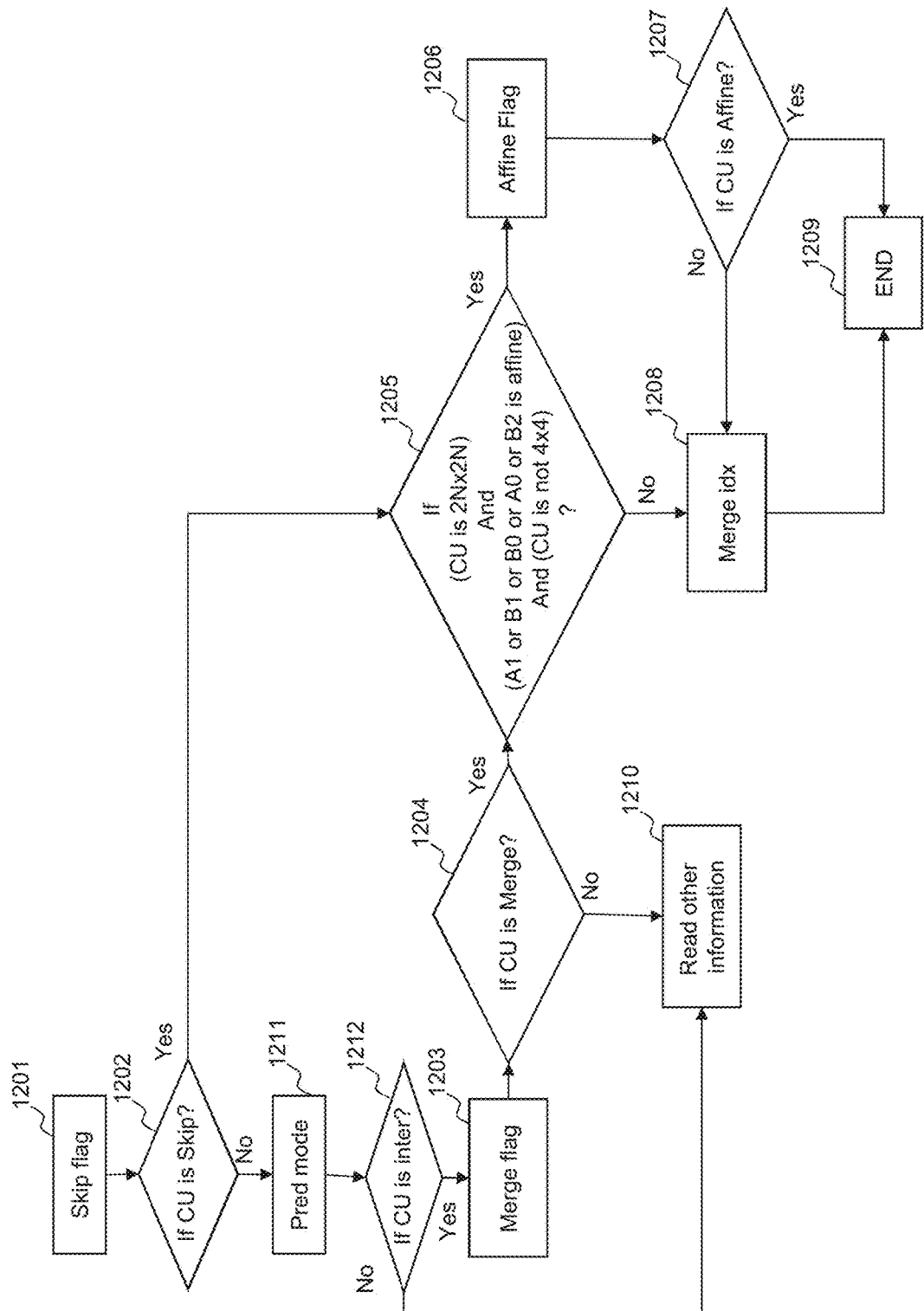
FIG. 12 is a flow chart of the partial decoding process of some syntax elements related to the coding mode.

FIG. 12 is a flow chart of the partial decoding process of some syntax elements related to the coding mode for signalling use of the Affine Merge mode. In this figure the Skip flag (1201), the prediction mode (1211), the Merge flag (1203) the Merge Index (1208) and the affine flag (1206) can be decoded.

For all CU in an Inter slice, the Skip flag is decoded (1201). If the CU is not Skip (1202), the pred mode (Prediction mode) is decoded (1211). This syntax element indicates if the current CU is encoded in (is to be decoded in) an Inter or an Intra mode. Please note that if the CU is Skip (1202), its current mode is the Inter mode. If the CU is not skip (1202:No), the CU is coded in AMVP or in Merge mode. If the CU is Inter (1212), the Merge flag is decoded (1203). If the CU is Merge (1204) or if the CU is Skip (1202:Yes), it is verified/checked (1205) if the affine flag (1206) needs to be decoded, i.e. at (1205) a determination of whether the current CU could have been encoded in the affine mode is made. This flag is decoded if the current CU is a 2N×2N CU, which means in the current VVC that the height and the width of the CU shall be equal. Moreover, at least one neighbouring CU A1 or B1 or B0 or A0 or B2 must be coded with the affine mode (in either Affine Merge mode or an AMVP mode with the affine mode enabled). Eventually the current CU shall not be a 4×4 CU but by default the CU 4×4 are disabled in the VTM reference software. If this condition (1205) is false, it is sure that the current CU is coded with the classical Merge mode (or classical Merge Skip mode) as specified in HEVC, and a Merge Index is decoded (1208). If the Affine Flag (1206) is set equal to 1 (1207), the CU is a Merge affine CU (i.e. a CU encoded in the Affine Merge mode) or a Merge Skip Affine CU (i.e. a CU encoded in the Affine Merge Skip mode) and the Merge index (1208) doesn't need to be decoded (because the Affine Merge mode is used, i.e. the CU is to be decoded using the affine mode with the first neighbouring block that is affine). Otherwise, the current CU is a classical (basic) Merge or Merge Skip CU (i.e. a CU encoded in the classical Merge or Merge Skip mode) and the Merge index candidate (1208) is decoded.

In this specification 'signalling' may refer to inserting into (providing/including in), or extracting/obtaining from, the bitstream one or more syntax element representing the enabling or disabling of a mode or other information.

Merge Candidates Derivation

Figure 13:
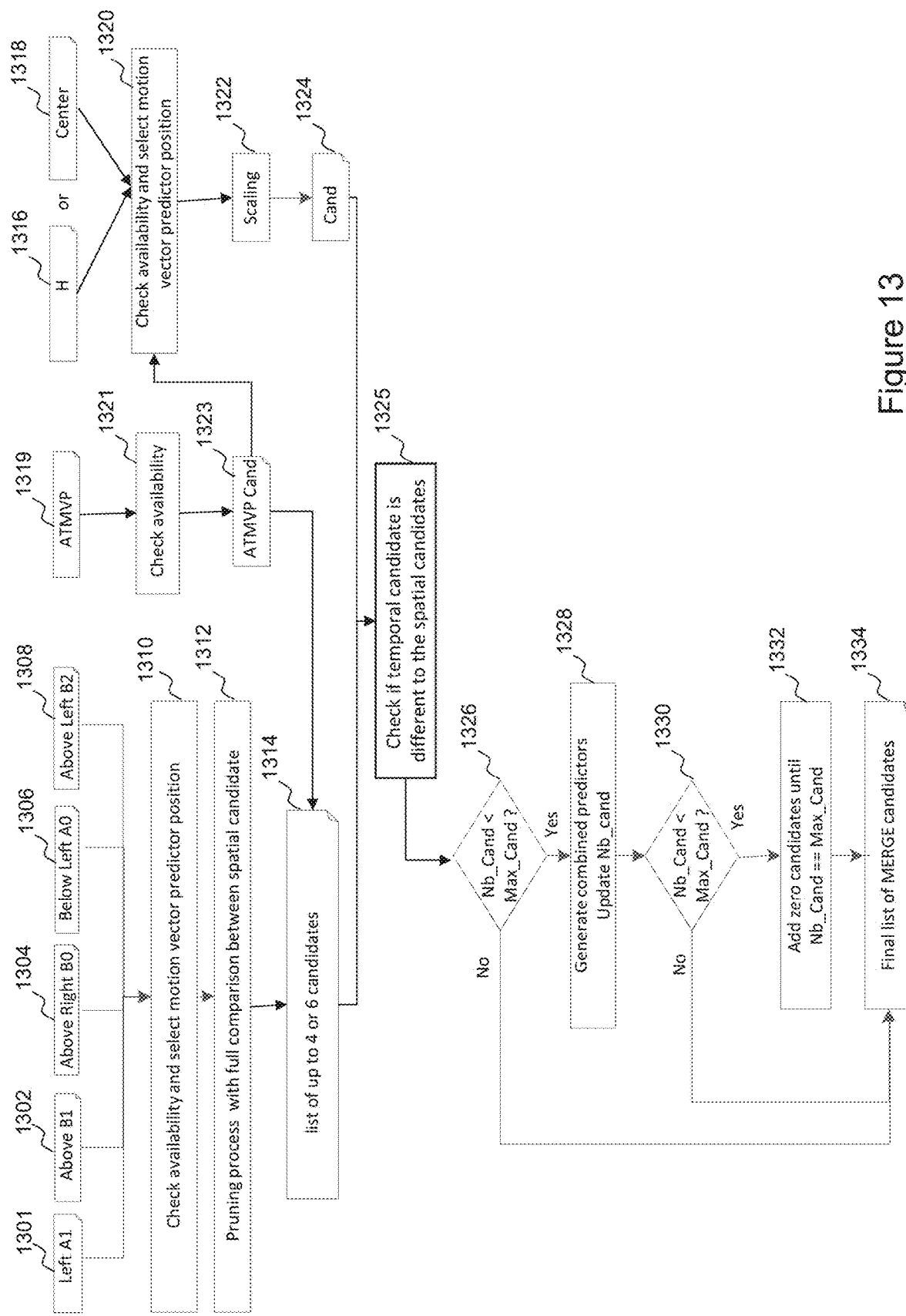
FIG. 13 is a flow chart illustrating Merge candidates derivation.

FIG. 13 is a flow chart illustrating the Merge candidates (i.e. candidates for the classical Merge mode or the classical Merge Skip mode) derivation. This derivation has been built on top of the motion vector derivation process of the Merge modes (i.e. a Merge candidate List derivation of HEVC) represented in FIG. 8. The main changes compared to HEVC are the addition of the ATMVP candidate (1319, 1321, 1323), the full duplicate checks of candidates (1325) and a new order of the candidates. The ATMVP prediction is set as a special candidate as it represents several motion information of the current CU. The value of the first sub-block (top left) is compared to the temporal candidate and the temporal candidate is not added in the list of Merge if they are equal (1320). The ATMVP candidate is not compared to other spatial candidates. In contrast to the temporal candidate which is compared to each spatial candidate already in the list (1325) and not added in the Merge candidate list if it is a duplicate candidate.

When a spatial candidate is added in the list it is compared to the other spatial candidates in the list (1312) which is not the case in the final version of HEVC.

In the current VTM version the list of merge candidates is set in the following order as it has been determined to provide the best results over the coding test conditions:
A1
B1
B0
A0
ATMVP
B2
TEMPORAL
Combined
Zero_MV It is important to note that spatial candidate B2 is set after the ATMVP candidate.

In addition, when ATMVP is enabled at slice level the maximum number in the list of candidates is 6 instead of 5 of HEVC.

Exemplary embodiments of the invention will now be described with reference to FIGS. 12-16 and 22-24. It should be noted that the embodiments may be combined unless explicitly stated otherwise; for example certain combinations of embodiments may improve coding efficiency at increased complexity, but this may be acceptable in certain use cases.

First Embodiment

As noted above, in the current VTM reference software, ATMVP is signalled as a Merge candidate inserted in the list of Merge candidates. ATMVP can be enabled or disabled for a whole sequence (at SPS level). When ATMVP is disabled, the maximum number of Merge candidates is 5. When ATMVP is enabled, the maximum number of Merge candidates is increased by one from 5 to 6.

In the encoder, the list of Merge candidates is generated using the method of FIG. 13. One Merge candidate is selected from the list of Merge candidates, for example based on a rate-distortion criterion. The selected Merge candidate is signalled to the decoder in the bitstream using a syntax element called the Merge index.

In the current VTM reference software, the manner of coding the Merge index is different depending on whether ATMVP is enabled or disabled.

FIG. 10A illustrates the coding of the Merge index when ATMVP is not enabled at SPS level. The 5 Merge candidates Cand0, Cand1, Cand2, Cand3 and Cand4 are coded 0, 10, 110, 1110 and 1111 respectively. This corresponds to a unary max coding. In addition, the first bit is coded by CABAC using a single context and the other bits are bypass coded.

FIG. 10B illustrates the coding of the Merge index when ATMVP is enabled. The 6 Merge candidates Cand0, Cand1, Cand2, Cand3, Cand4 and Cand5 are coded 0, 10, 110, 1110, 11110 and 11111 respectively. In this case, all bits of the merge index (from the $1^{st}$ to the $5^{th}$ bit) are context coded by CABAC. Each bit has its own context and there are separate probability models for the different bits.

Figure 14:
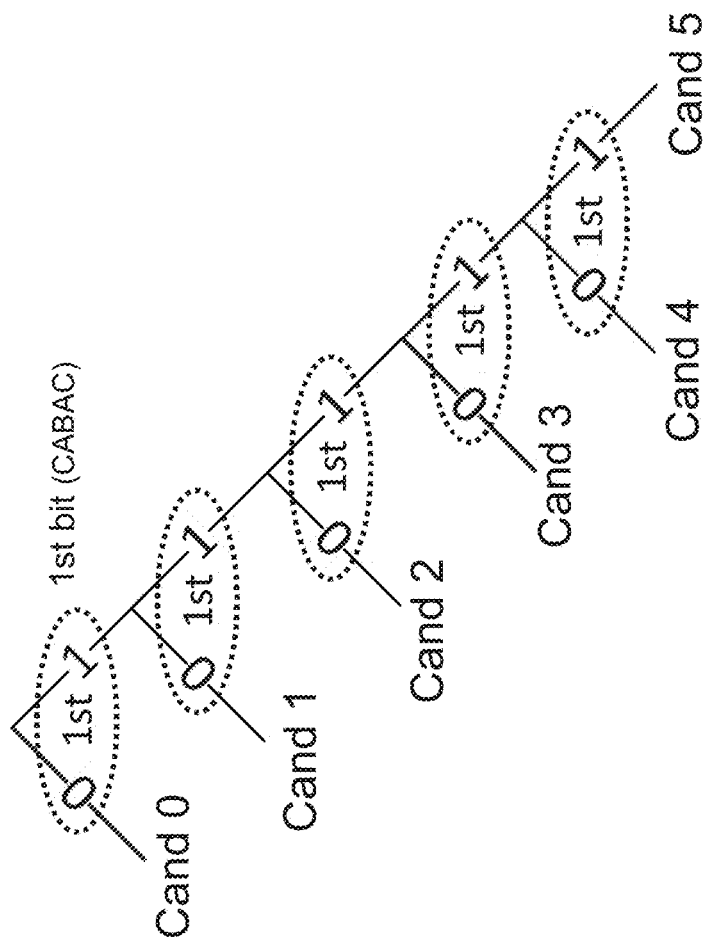
FIG. 14 is a flow chart illustrating a first embodiment of the invention.

In the first embodiment of the present invention, as shown in FIG. 14, when ATMVP is included as a Merge candidate in the list of Merge candidates (for example, when ATMVP is enabled at SPS level) the coding of the Merge index is modified so that only the first bit of the Merge index is coded by CABAC using a single context. The context is set in the same manner as in the current VTM reference software when ATMVP is not enabled at SPS level.

The other bits (from the $2^{nd}$ to the $5^{th}$ bit) are bypass coded. When ATMVP is not included as a Merge candidate in the list of Merge candidates (for example, when ATMVP is disabled at SPS level) there are 5 Merge candidates. Only the first bit of the Merge index is coded by CABAC using a single context. The context is set in the same manner as in the current VTM reference software when ATMVP is not enabled at SPS level. The other bits (from the $2^{nd}$ to the $4^{th}$ bit) are bypass decoded.

The decoder generates the same list of Merge candidates as the encoder. This may be accomplished by using the method of FIG. 13. When ATMVP is not included as a Merge candidate in the list of Merge candidates (for example, when ATMVP is disabled at SPS level) there are 5 Merge candidates. Only the first bit of the Merge index is decoded by CABAC using a single context. The other bits (from the $2^{nd}$ to the $4^{th}$ bit) are bypass decoded. In contrast to the current reference software, when ATMVP is included as a Merge candidate in the list of Merge candidates (for example, when ATMVP is enabled at SPS level), only the first bit of the Merge index is decoded by CABAC using a single context in the decoding of the Merge index. The other bits (from the $2^{nd}$ to the $5^{th}$ bit) are bypass decoded. The decoded merge index is used to identify the Merge candidate selected by the encoder from among the list of Merge candidates.

The advantage of this embodiment compared to the VTM2.0 reference software is a complexity reduction of the merge index decoding and decoder design (and encoder design) without impact on coding efficiency. Indeed, with this embodiment only 1 CABAC state is needed for the Merge index instead of 5 for the current VTM Merge index coding/decoding. Moreover, it reduces the worst-case complexity because the other bits are CABAC bypass coded which reduces the number of operations compared to coding all bits with CABAC.

Second Embodiment

In a second embodiment, all bits of the Merge index are CABAC coded but they all share the same context. There may be a single context as in the first embodiment, which in this case is shared among the bits. As a result, when ATMVP is included as a Merge candidate in the list of Merge candidates (for example, when ATMVP is enabled at SPS level), only one context is used, compared to 5 in the VTM2.0 reference software. The advantage of this embodiment compared to the VTM2.0 reference software is a complexity reduction of the merge index decoding and decoder design (and encoder design) without impact on coding efficiency.

Alternatively, as described below in connection with the third to fifteenth embodiments, a context variable may be shared among the bits so that two or more contexts are available but the current context is shared by the bits.

When ATMVP is disabled the same context is still used for all bits.

This embodiment and all subsequent embodiments can be applied even if ATMVP is not an available mode or is disabled.

In a variant of the second embodiment, any two or more bits of the Merge index are CABAC coded and share the same context. Other bits of the Merge index are bypass coded. For example, the first N bits of the Merge index may be CABAC coded, where N is two or more.

Third Embodiment

In the first embodiment the first bit of the Merge index was CABAC coded using a single context.

In the third embodiment, a context variable for a bit of the Merge index depends on the value of the Merge index of a neighbouring block. This allows more than one context for the target bit, with each context corresponding to a different value of the context variable.

The neighbouring block may be any block already decoded, so that its Merge index is available to the decoder by the time the current block is being decoded. For example, the neighbouring block may be any of the blocks A0, A1, A2, B0, B1, B2 and B3 shown in FIG. 6B.

In a first variant, just the first bit is CABAC coded using this context variable.

In a second variant, the first N bits of the Merge index, where N is two or more, are CABAC coded and the context variable is shared among those N bits.

In a third variant, any N bits of the Merge index, where N is two or more, are CABAC coded and the context variable is shared among those N bits.

In a fourth variant, the first N bits of the Merge index, where N is two or more, are CABAC coded and N context variables are used for those N bits. Assuming the context variables have K values, K×N CABAC states are used. For example, in the present embodiment, with one neighbouring block, the context variable may conveniently have 2 values, e.g. 0 and 1. In other words 2N CABAC states are used.

In a fifth variant, any N bits of the Merge index, where N is two or more, are adaptive-PM coded and N context variables are used for those N bits.

The same variants are applicable to the fourth to sixteenth embodiments described hereinafter.

Fourth Embodiment

In the fourth embodiment, the context variable for a bit of the Merge index depends on the respective values of the Merge index of two or more neighbouring blocks. For example, a first neighbouring block may be a left block A0, A1 or A2 and a second neighbouring block may be an upper block B0, B1, B2 or B3. The manner of combining the two or more Merge index values is not particularly limited. Examples are given below.

The context variable may conveniently have 3 different values, e.g. 0, 1 and 2, in this case as there are two neighbouring blocks. If the fourth variant described in connection with the third embodiment is applied to this embodiment with 3 different values, therefore, K is 3 instead of 2. In other words 3N CABAC states are used.

Fifth Embodiment

In the fifth embodiment, the context variable for a bit of the Merge index depends on the respective values of the Merge index of the neighbouring blocks A2 and B3.

Sixth Embodiment

In the sixth embodiment, the context variable for a bit of the Merge index depends on the respective values of the Merge index of the neighbouring blocks A1 and B1. The advantage of this variant is alignment with the Merge candidates derivation. As a result, in some decoder and encoder implementations, memory access reductions can be achieved.

Seventh Embodiment

In the seventh embodiment, the context variable for a bit having bit position idx_num in the Merge Index of the current block is obtained according to the following formula:

ctxIdx=(Merge_index_left==idx_num)+
  (Merge_index_up==idx_num)

where Merge_index_left is the Merge index for a left block, Merge_index_up is the Merge index for an upper block, and the symbol== is the equality symbol.

When there are 6 Merge candidates, for example, 0<=idx_num<=5.

The left block may be the block A1 and the upper block may be the block B1 (as in the sixth embodiment). Alternatively, the left block may be the block A2 and the upper block may be the block B3 (as in the fifth embodiment).

The formula (Merge_index_left==idx_num) is equal to 1 if the Merge index for the left block is equal to idx_num. The following table gives the results of this formula (Merge_index_left==idx_num):

|  | idx_num | | | | |
| --- | --- | --- | --- | --- | --- |
| Merge_index_left | 0 | 1 | 2 | 3 | 4 |
| 0 | 1 | 0 | 0 | 0 | 0 |
| 1 | 0 | 1 | 0 | 0 | 0 |
| 2 | 0 | 0 | 1 | 0 | 0 |
| 3 | 0 | 0 | 0 | 1 | 0 |
| 4 | 0 | 0 | 0 | 0 | 1 |
| 5 | 0 | 0 | 0 | 0 | 0 |

Of course the table of the formula (Merge_index_up==idx_num) is the same.

The following table gives the unary max code of each Merge index value and the relative bit position for each bit. This table corresponds to FIG. 10B.

|  | Unary max code | | | | |
| --- | --- | --- | --- | --- | --- |
| Merge_index_left | 0 | 1 | 2 | 3 | 4 |
| 0 | 0 | | | | |
| 1 | 1 | 0 | | | |
| 2 | 1 | 1 | 0 | | |
| 3 | 1 | 1 | 1 | 0 | |
| 4 | 1 | 1 | 1 | 1 | 0 |
| 5 | 1 | 1 | 1 | 1 | 1 |

If the left block is not a merge block or an affine merge block (i.e. coded using the Affine Merge mode) it is considered that the left block is not available. The same condition is applied for the upper block.

For example, when only the first bit is CABAC coded, the context variable ctxIdx is set equal to:

0 if no left and up/upper block has a merge index or if the left block Merge index is not the first index (i.e. not 0) and if the upper block Merge index is not the first index (i.e. not 0);

1 if one but not the other of the left and upper blocks has its merge index equal to the first index; and 2 if for each of the left and upper blocks the merge index is equal to the first index.

More generally, for a target bit at position idx_num which is CABAC coded, the context variable ctxIdx is set equal to:

0 if no left and up/upper block has a merge index or if the left block Merge index is not the $i^{th}$ index (where i=idx_num) and if the upper block Merge index is not the $i^{th}$ index;

1 if one but not the other of the left and upper blocks has its merge index equal to the the $i^{th}$ index; and 2 if for each of the left and upper blocks the merge index is equal to the $i^{th}$ index. Here, the $i^{th}$ index means the first index when i=0, the second index when i=1, and so on.

Eighth Embodiment

In the eighth embodiment, the context variable for a bit having bit position idx_num in the Merge Index of the current block is obtained according to the following formula:

Ctx=(Merge_index_left>idx_num)+
  (Merge_index_up>idx_num) where Merge_index_left is the Merge index for a left block, Merge_index_up is the Merge index for an upper block, and the symbol> means "greater than".

When there are 6 Merge candidates, for example, 0<=idx_num<=5.

The left block may be the block A1 and the upper block may be the block B1 (as in the fifth embodiment). Alternatively, the left block may be the block A2 and the upper block may be the block B3 (as in the sixth embodiment).

The formula (Merge_index_left>idx_num) is equal to 1 if the Merge index for the left block is greater than idx_num. If the left block is not a merge block or an affine merge block (i.e. coded using the Affine Merge mode) it is considered that the left block is not available. The same condition is applied for the upper block.

The following table gives the results of this formula (Merge_index_left>idx_num):

|  | idx_num | | | | |
| --- | --- | --- | --- | --- | --- |
| Merge_index_left | 0 | 1 | 2 | 3 | 4 |
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |

For example, when only the first bit is CABAC coded, the context variable ctxIdx is set equal to:

0 if no left and up/upper block has a merge index or if the left block Merge index is less than or equal to the first index (i.e. not 0) and if the upper block Merge index is less than or equal to the first index (i.e. not 0);

1 if one but not the other of the left and upper blocks has its merge index greater than the first index; and 2 if for each of the left and upper blocks the merge index is greater than the first index.

More generally, for a target bit at position idx_num which is CABAC coded, the context variable ctxIdx is set equal to:

0 if no left and up/upper block has a merge index or if the left block Merge index is less than the $i^{th}$ index (where i=idx_num) and if the upper block Merge index is less than or equal to the $i^{th}$ index;

1 if one but not the other of the left and upper blocks has its merge index greater than the the $i^{th}$ index; and 2 if for each of the left and upper blocks the merge index is greater than the $i^{th}$ index.

The eighth embodiment provides a further coding efficiency increase over the seventh embodiment.

Ninth Embodiment

In the fourth to eighth embodiments, the context variable for a bit of the Merge index of the current block depended on the respective values of the Merge index of two or more neighbouring blocks.

In the ninth embodiment, the context variable for a bit of the Merge index of the current block depends on the respective Merge flags of two or more neighbouring blocks. For example, a first neighbouring block may be a left block A0, A1 or A2 and a second neighbouring block may be an upper block B0, B1, B2 or B3.

The Merge flag is set to 1 when a block is encoded using the Merge mode, and is set to 0 when another mode such as Skip mode or Affine Merge mode is used. Note that in VMT2.0 Affine Merge is a distinct mode from the basic or "classical" Merge mode. The Affine Merge mode may be signalled using a dedicated Affine flag. Alternatively, the list of Merge candidates may include an Affine Merge candidate, in which case the Affine Merge mode may be selected and signalled using the Merge index.

The context variable is then set to:
0 if neither the left nor the upper neighbouring block has its Merge flag set to 1;
1 if one but not the other of the left and upper neighbouring blocks has its Merge flag set to 1; and
2 if each of the left and upper neighbouring blocks has its Merge flag set to 1.

This simple measure achieves a coding efficiency improvement over VTM2.0. Another advantage, compared to the seventh and eighth embodiments, is a lower complexity because only the Merge flags and not the Merge indexes of the neighbouring blocks need to be checked.

In a variant, the context variable for a bit of the Merge index of the current block depends on the Merge flag of a single neighbouring block.

Tenth Embodiment

In the third to ninth embodiments, the context variable for a bit of the Merge index of the current block depended on Merge index values or Merge flags of one or more neighbouring blocks.

In the tenth embodiment, the context variable for a bit of the Merge index of the current block depends on the value of the Skip flag for the current block (current Coding Unit, or CU). The Skip flag is equal to 1 when the current block uses the Merge Skip mode, and is equal to 0 otherwise.

The Skip flag is a first example of another variable or syntax element already been decoded or parsed for the current block. This other variable or syntax element preferably is an indicator of a complexity of the motion information in the current block. Since the occurrences of the Merge index values depend on the complexity of the motion information a variable or syntax element such as the Skip flag is generally correlated with the merge index value.

More specifically, the Merge Skip mode is generally selected for static scenes or scenes involving constant motion. Consequently, the merge index value is generally lower for the Merge Skip mode than for the classical merge mode which is used to encode an inter prediction which contains a block residual. This occurs generally for more complex motion. However, the selection between these modes is also often related to the quantization and/or the RD criterion.

This simple measure provides a coding efficiency increase over VTM2.0. It is also very simple to implement as it does not involve neighbouring blocks or checking Merge index values.

In a first variant, the context variable for a bit of the Merge index of the current block is simply set equal to the Skip flag of the current block. The bit may be the first bit only. Other bits are bypass coded as in the first embodiment.

In a second variant, all bits of the Merge index are CABAC coded and each of them has its own context variable depending on the Merge flag. This requires 10 states of probabilities when there are 5 CABAC-coded bits in the Merge index (corresponding to 6 Merge candidates).

In a third variant, to limit the number of states, only N bits of the Merge index are CABAC coded, where N is two or more, for example the first N bits. This requires 2N states. For example, when the first 2 bits are CABAC coded, 4 states are required.

Generally, in place of the Skip flag, it is possible to use any other variable or syntax element that has already been decoded or parsed for the current block and that is an indicator of a complexity of the motion information in the current block.

Eleventh Embodiment

The eleventh embodiment relates to Affine Merge signalling as described previously with reference to FIGS. 11A, 11B and 12.

In the eleventh embodiment, the context variable for a CABAC coded bit of the Merge index of the current block (current CU) depends on the Affine Merge candidates, if any, in the list of Merge candidates. The bit may be the first bit only of the Merge index, or the first N bits, where N is two or more, or any N bits. Other bits are bypass coded.

Affine prediction is designed for compensating complex motion. Accordingly, for complex motion the merge index generally has higher values than for less complex motion. It follows that if the first Affine Merge candidate is far down the list, or if there is no Affine Merge candidate at all, the merge index of the current CU is likely to have a small value.

It is therefore effective for the context variable to depend on the presence and/or position of at least one Affine Merge candidate in the list.

For example, the context variable may be set equal to:
1 if A1 is affine
2 if B1 is affine
3 if B0 is affine
4 if A0 is affine
5 if B2 is affine
0 if no neighbouring block is affine.

When the Merge index of the current block is decoded or parsed the affine flags of the Merge candidates at these positions have already been checked. Consequently, no further memory accesses are needed to derive the context for the Merge index of the current block.

This embodiment provides a coding efficiency increase over VTM2.0. No additional memory accesses are required since step 1205 already involves checking the neighbouring CU affine modes.

In a first variant, to limit the number of states, the context variable may be set equal to:
0 if no neighbouring block is affine, or if A1 or B1 is affine
1 if B0, A0 or B2 is affine In a second variant, to limit the number of states, the context variable may be set equal to:
0 if no neighbouring block is affine
1 if A1 or B1 is affine
2 if B0, A0 or B2 is affine In a third variant, the context variable may be set equal to:
1 if A1 is affine
2 if B1 is affine
3 if B0 is affine
4 if A0 or B2 is affine
0 if no neighbouring block is affine.

Please note that these positions are already checked when the merge index is decoded or parsed because the affine flag decoding depends on these positions. Consequently, there is no need for additional memory access to derive the Merge index context which is coded after the affine flag.

Twelfth Embodiment

In the twelfth embodiment, signalling the affine mode comprises inserting affine mode as a candidate motion predictor.

In one example of the twelfth embodiment, the Affine Merge (and Affine Merge Skip) is signalled as a Merge candidate (i.e. as one of the Merge candidates for use with the classical Merge mode or the classical Merge Skip mode). In that case the modules 1205, 1206 and 1207 of FIG. 12 are removed. In addition, not to affect the coding efficiency of the Merge mode, the maximum possible number of Merge candidates is incremented. For example, in the current VTM version this value is set equal to 6, so with if applying this embodiment to the current version of VTM, the value would be 7.

The advantage is a design simplification of the syntax element of the Merge modes because fewer syntax elements need to be decoded. In some circumstances, a coding efficiency improvement/change can be observed.

Two possibilities to implement this example will now be described:

The Merge index for the Affine Merge candidate always has the same position inside the list whatever the value of the other Merge MV. The position of a candidate motion predictor indicates its likelihood of being selected and as such if it is placed higher up the list (a lower index value), that motion vector predictor is more likely to be selected.

In the first example, the Merge index for the Affine Merge candidate always has the same position inside the list of Merge candidates. This means that it has a fixed "Merge idx" value. For example, this value can be set equal to 5, as the Affine Merge mode should represent a complex motion which is not the most probable content. The additional advantage of this embodiment is that when the current block is parsed (decoding/reading of the syntax element only but not decoding the data itself), the current block can be set as affine block. Consequently the value can be used to determine the CABAC context for the affine flag which is used for AMVP. So the conditional probabilities should be improved for this affine flag and the coding efficiency should be better.

Figure 16:
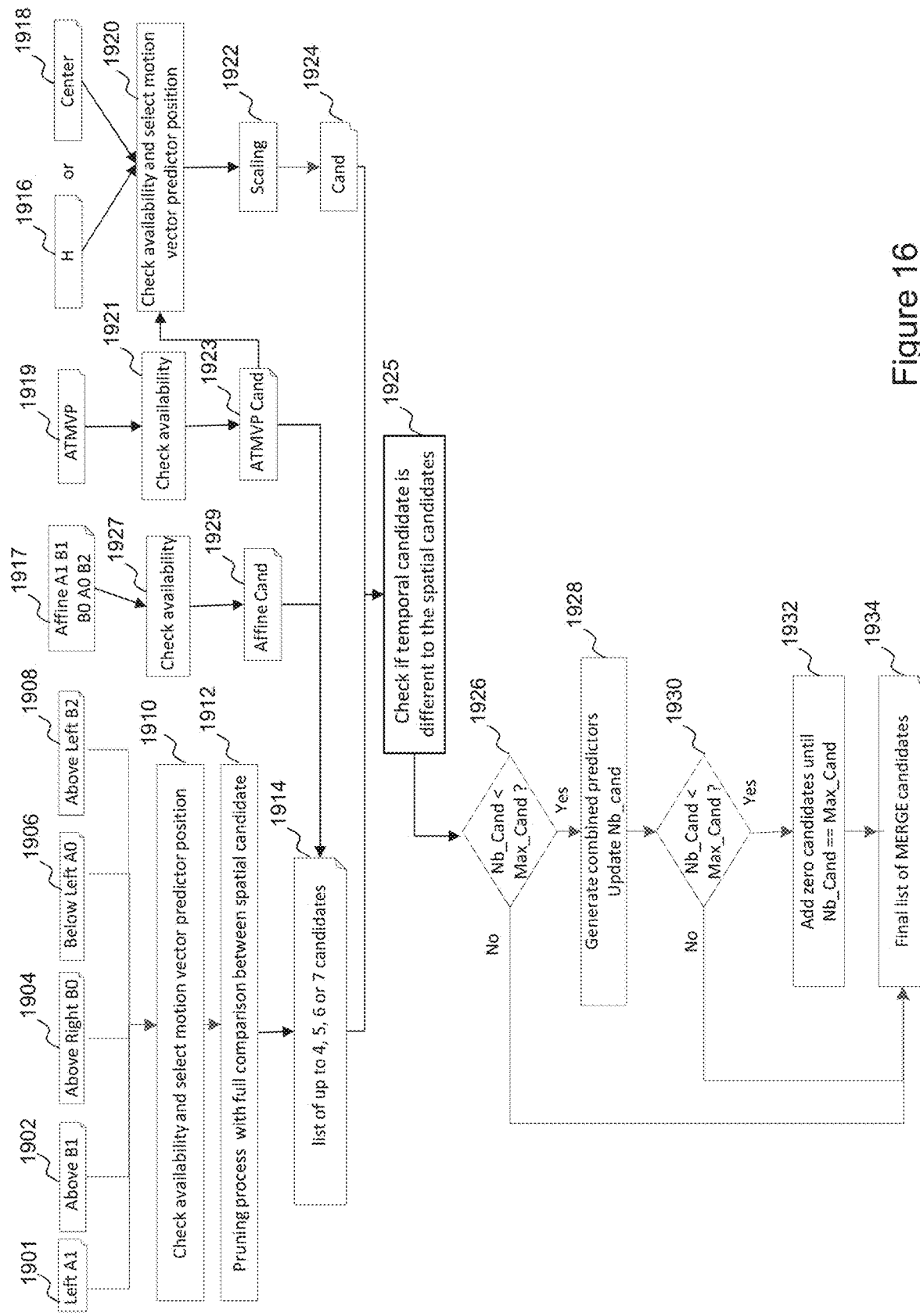
FIG. 16 is a flow chart illustrating generating a list of merge candidates in the twelfth embodiment of the invention.

In a second example, the Affine Merge candidate is derived with other Merge candidates. In this example, a new Affine Merge candidate is added into the list of Merge candidates (for the classical Merge mode or the classical Merge Skip mode). FIG. 16 illustrates this example. Compared to FIG. 13, the Affine Merge candidate is the first affine neighbouring block from A1, B1, B0, A0, and B2 (1917). If the same condition as 1205 of FIG. 12 is valid (1927), the motion vector field produced with the affine parameters is generated to obtain the Affine Merge candidate (1929). The list of initial Merge candidates can have 4, 5, 6 or 7 candidates according to the usage of ATMVP, Temporal and Affine Merge candidates.

The order between all these candidate is important as more likely candidates should be processed first to ensure they are more likely to make the cut of motion vector candidates—a preferred ordering is the following:
A1
B1
B0
A0
AFFINE MERGE
ATMVP
B2
TEMPORAL
Combined
Zero_MV It is important to note that the Affine Merge candidate is positioned before the ATMVP candidate but after the four main neighbouring blocks. An advantage to setting the Affine Merge candidate before the ATMVP candidate is a coding efficiency increase, as compared to setting it after the ATMVP and the temporal predictor candidate. This coding efficiency increase depends on the GOP (group of pictures) structure and Quantization Parameter (QP) setting of each picture in the GOP. But for the most use GOP and QP setting this order give a coding efficiency increase.

A further advantage of this solution is a clean design of the classical Merge and classical Merge Skip modes (i.e. the Merge modes with additional candidates such as ATMVP or Affine Merge candidate) for both syntax and derivation process. Moreover, the Merge index for the Affine Merge candidate can change according to the availability or value (duplicate check) of previous candidates in the list of Merge candidates. Consequently an efficient signalization can be obtained.

In a further example, the Merge index for the Affine Merge candidate is variable according to one or several conditions.

For example, the Merge index or the position inside the list associated with the Affine Merge candidate changes according to a criterion. The principle is to set a low value for the Merge index corresponding to the Affine Merge candidate when the Affine Merge candidate has a high probability of being selected (and a higher value when there is low probability to be selected).

In the twelfth embodiment, the Affine Merge candidate has a Merge index value. To improve the coding efficiency of the Merge index, it is effective to make the context variable for a bit of the Merge index dependent on the affine flags for neighbouring blocks and/or for the current block.

For example, the context variable may be determined using the following formula:

ctxIdx=IsAffine(A1)+IsAffine(B1)+IsAffine(B0)+IsAffine(A0)+IsAffine(B2)

The resulting context value may have the value 0, 1, 2, 3, 4 or 5.

The affine flags increase the coding efficiency.

In a first variant, to involve fewer neighbouring blocks, ctxIdx=IsAffine(A1)+IsAffine(B1). The resulting context value may have the value 0, 1, or 2.

In a second variant, also involving fewer neighbouring blocks, ctxIdx=IsAffine(A2)+IsAffine(B3). Again, the resulting context value may have the value 0, 1, or 2.

In a third variant, involving no neighbouring blocks, ctxIdx=IsAffine(current block). The resulting context value may have the value 0 or 1.

Figure 15:
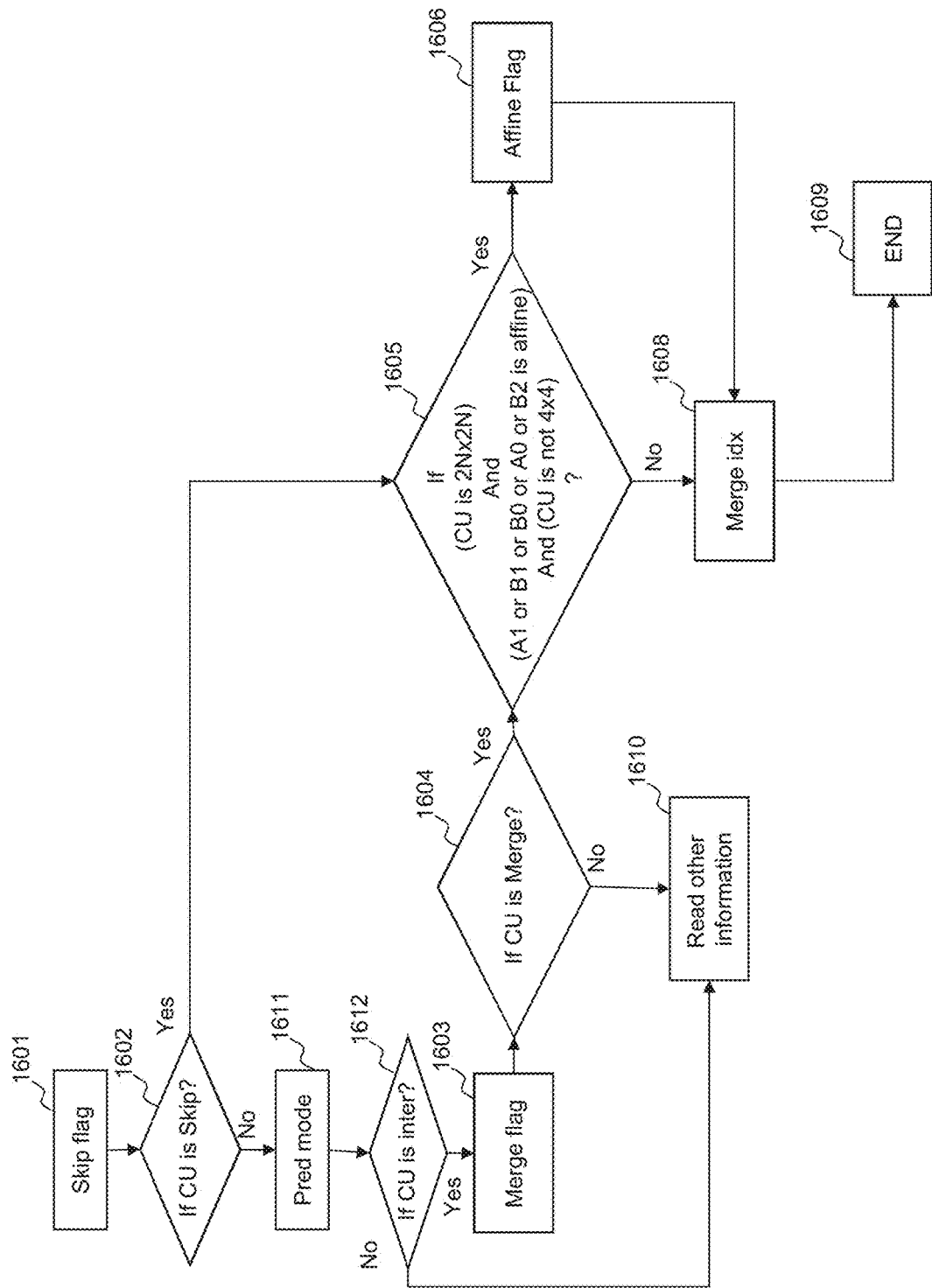
FIG. 15 is a flow chart of the partial decoding process of some syntax elements related to the coding mode in a twelfth embodiment of the invention.

FIG. 15 is a flow chart of the partial decoding process of some syntax elements related to the coding mode with the third variant. In this figure, the Skip flag (1601), the prediction mode (1611), the Merge flag (1603), the Merge Index (1608) and the affine flag (1606) can be decoded. This flow chart is similar to that of FIG. 12, described hereinbefore, and a detailed description is therefore omitted. The difference is that the Merge index decoding process takes into account of the affine flag so that it is possible to use the affine flag, which is decoded before the Merge index, when obtaining a context variable for the Merge index, which is not the case in VTM 2.0. In VTM2.0 the affine flag of the current block cannot be used to obtain the context variable for the Merge index because it always has the same value '0'.

Thirteenth Embodiment

In the tenth embodiment, the context variable for a bit of the Merge index of the current block depends on the value of the Skip flag for the current block (current Coding Unit, or CU).

In the thirteenth embodiment, instead of using the Skip flag value directly to derive the context variable for the target bit of the Merge index, the context value for the target bit is derived from the context variable used for coding the Skip flag of the current CU. This is possible because the Skip flag is itself CABAC coded and therefore has a context variable.

Preferably, the context variable for the target bit of the Merge index of the current CU is set equal to (copied from) the context variable used for coding the Skip flag of the current CU.

The target bit may be the first bit only. Other bits may be bypass coded as in the first embodiment.

The context variable for the Skip flag of the current CU is derived in the manner prescribed in VTM2.0. The advantage of this embodiment compared to the VTM2.0 reference software is a complexity reduction of the Merge index decoding and decoder design (and encoder design) without impact on the coding efficiency. Indeed, with this embodiment, at the minimum only 1 CABAC state is needed for coding the Merge index instead of 5 for the current VTM Merge index coding (encoding/decoding). Moreover, it reduces the worst-case complexity because the other bits are CABAC bypass coded which reduces the number of operations compared to coding all bits with CABAC.

Fourteenth Embodiment

In the thirteenth embodiment, the context value for the target bit was derived from the context variable for the Skip flag of the current CU.

In the fourteenth embodiment, the context value for the target bit is derived from the context variable for the affine flag of the current CU.

This is possible because the affine flag is itself CABAC coded and therefore has a context variable.

Preferably, the context variable for the target bit of the Merge index of the current CU is set equal to (copied from) the context variable for the affine flag of the current CU.

The target bit may be the first bit only. Other bits are bypass coded as in the first embodiment.

The context variable for the affine flag of the current CU is derived in the manner prescribed in VTM2.0.

The advantage of this embodiment compared to the VTM2.0 reference software is a complexity reduction in the Merge index decoding and decoder design (and encoder design) without impact on coding efficiency. Indeed, with this embodiment, at the minimum only 1 CABAC state is needed for the Merge index instead of 5 for the current VTM Merge index coding (encoding/decoding). Moreover, it reduces the worst-case complexity because the other bits are CABAC bypass coded which reduces the number of operations compared to coding all bits with CABAC.

Fifteenth Embodiment

In several of the foregoing embodiments, the context variable had more than 2 values, for example the three values 0, 1 and 2. However, to reduce the complexity, and reduce the number of states to be handled, it is possible to cap the number of permitted context-variable values at 2, e.g. 0 and 1. This can be accomplished, for example, by changing any initial context variable having the value 2 to 1. In practice, this simplification has no or only a limited impact on the coding efficiency.

Combinations of Embodiments and other Embodiments

Any two or more of the foregoing embodiments may be combined.

The preceding description has focussed on the encoding and decoding of the Merge index. For example, the first embodiment involves generating a list of Merge candidates including an ATMVP candidate (for the classical Merge mode or the classical Merge Skip mode, i.e. the non-Affine Merge mode or the non-Affine Merge Skip mode); selecting one of the Merge candidates in the list; and generating a Merge index for the selected Merge candidate using CABAC coding, one or more bits of the Merge index being bypass CABAC coded. In principle, the present invention can be applied to modes other than the Merge modes (e.g. an Affine Merge mode) that involve generating a list of motion information predictor candidates (e.g. a list of Affine Merge candidates or motion vector predictor (MVP) candidates); selecting one of the motion information predictor candidates (e.g. MVP candidates) in the list; and generating an identifier or an index for the selected motion information predictor candidate in the list (e.g. the selected Affine Merge candidate or the selected MVP candidate for predicting the motion vector of the current block). Thus, the present invention is not limited to the Merge modes (i.e. the classical Merge mode and the classical Merge Skip mode) and the index to be encoded or decoded is not limited to the Merge index. For example, in the development of VVC, it is conceivable that the techniques of the foregoing embodiments could be applied to (or extended to) a mode other than the Merge modes, such as the AMVP mode of HEVC or its equivalent mode in VVC or the Affine Merge mode. The appended claims are to be interpreted accordingly.

As discussed, in the foregoing embodiments, one or more motion information candidate (e.g. motion vector) for the Affine Merge modes (Affine Merge or Affine Merge Skip mode) and/or one or more affine parameter are obtained from the first neighbouring block which is affine coded among spatially neighbouring blocks (e.g. at positions A1, B1, B0, A0, B2) or temporally associated blocks (e.g. a "Center" block with a collocated block or a spatial neighbour thereof such as "H"). These positions are depicted in FIGS. 6A and 6B. To enable this obtaining (e.g. deriving or sharing or "merging") of the one or more motion information and/or affine parameter between a current block (or a group of sample/pixel values that are currently being encoded/decoded, e.g. a current CU) and a neighbouring block (either spatially neighbouring or temporally associated to the current block), one or more Affine Merge candidate are added to the list of Merge candidates (i.e. classical Merge mode candidates) so that when the selected Merge candidate (which is then signalled using a Merge index, for example using a syntax element such as "merge_idx" in HEVC or a functionally equivalent syntax element thereof) is the Affine Merge candidate, the current CU/block is encoded/decoded using the Affine Merge mode with the Affine Merge candidate.

As mentioned above, such one or more Affine Merge candidates for obtaining (e.g. deriving or sharing) of the one or more motion information for the Affine Merge mode and/or affine parameter can also be signalled using a separate list (or a set) of Affine Merge candidates (which can be the same or different from the list of Merge candidates used for the classical Merge mode).

According to an embodiment of the present invention, when the techniques of the foregoing embodiments are applied to the Affine Merge mode, the list of Affine Merge candidates may be generated using the same technique as the motion vector derivation process for the classical Merge mode as shown in, and described in relation to, FIG. 8, or as the Merge candidates derivation process shown in, and described in relation to, FIG. 13. Advantage of sharing the same technique to generate/compile this list of Affine Merge candidates (for the Affine Merge mode or the Affine Merge Skip mode) and the list of Merge candidates (for the classical Merge mode or the classical Merge Skip mode) is reduction in complexity in the encoding/decoding process when compared with having separate techniques.

According to another embodiment, a separate technique shown below in relation to FIG. 24 may be used to generate/compile the list of Affine Merge candidates.

Figure 24:
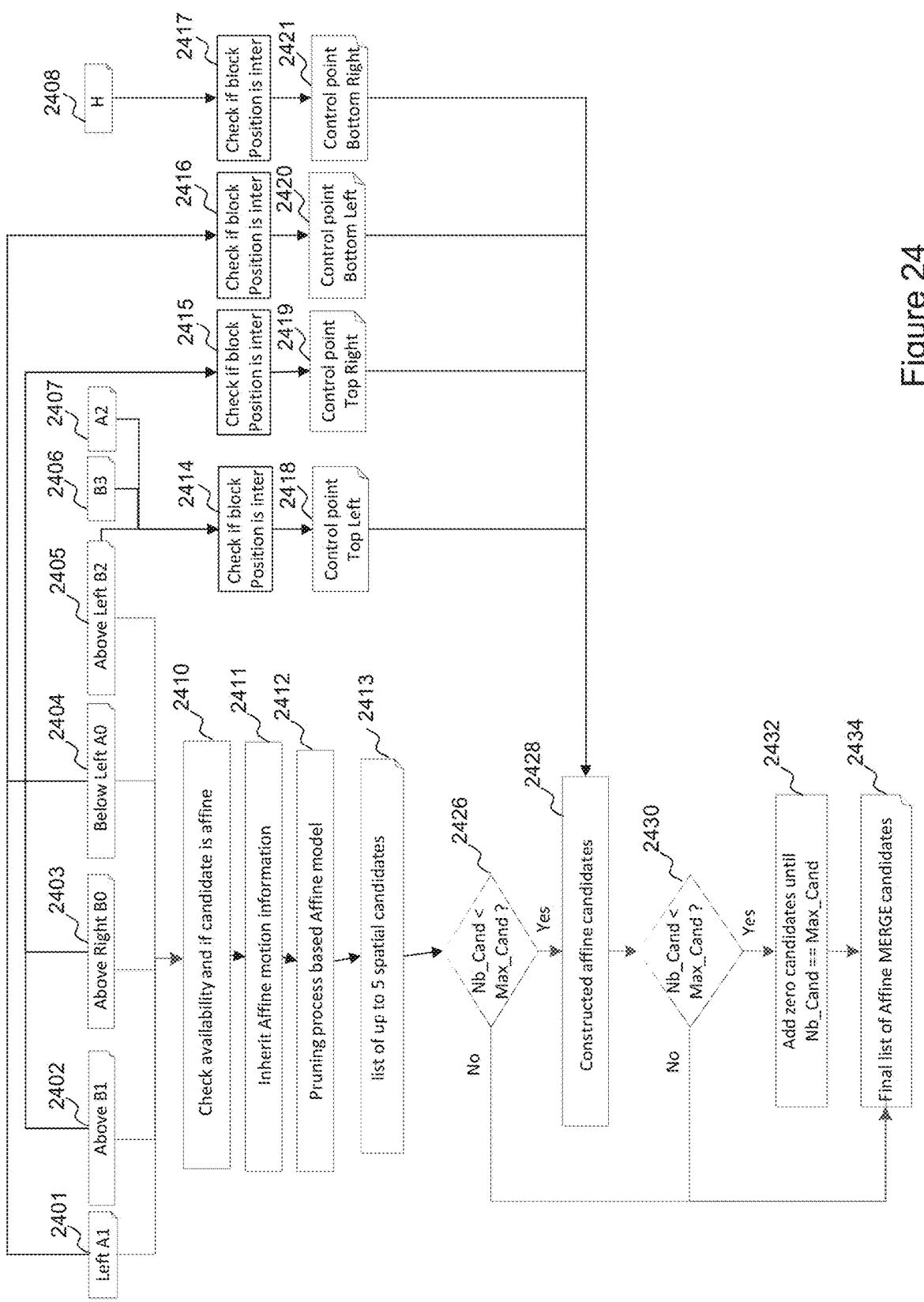
FIG. 24 is a flow chart illustrating Affine Merge candidate derivation process for the Affine Merge mode.

FIG. 24 is a flow chart illustrating an Affine Merge candidate derivation process for the Affine Merge mode (the Affine Merge mode and the Affine Merge Skip mode). In a first step of the derivation process, five block positions are considered (2401 to 2405) for obtaining/deriving spatial Affine Merge candidates 2413. These positions are the spatial positions depicted in FIG. 6A (and FIG. 6B) with references A1, B1, B0, A0, and B2. In a following step, the availability of the spatial motion vectors is checked and it is determined whether each of Inter mode coded blocks associated with each position A1, B1, B0, A0, and B2 are coded with the affine mode (e.g. using any one of Affine Merge, Affine Merge Skip or Affine AMVP mode) (2410). At most five motion vectors (i.e. spatial Affine Merge candidates) are selected/obtained/derived. A predictor is considered as available if it exists (e.g. there is information for obtaining/deriving a motion vector associated with that position) and if the block is not INTRA coded and if the block is affine (i.e. coded using the Affine mode).

Then Affine motion information is derived/obtained (2411) for each available block position (2410). This derivation is performed for the current block based on the affine model (and its affine model parameters discussed in relation to FIGS. 11A and 11B, for example) of the block position. Then a pruning process (2412) is applied to remove candidates which give the same affine motion compensation (or which have the same affine model parameters) as another one previously added to the list.

At the end of this stage, the list of spatial Affine Merge candidates comprises up to five candidates.

If the number (Nb_Cand) of candidates is strictly less (2426) than the maximum number of candidates (here, Max_Cand is a value which is signalled in the bitstream slice header and is equal to five for Affine Merge mode but can be different/variable depending on the implementation).

Then the constructed Affine Merge candidates (i.e. additional Affine Merge candidates which are generated to provide some diversity as well as approach the target number, playing a similar role as the combined bi-predictive Merge candidates in HEVC for example) are generated (2428). These constructed Affine Merge candidates are based on the motion vectors associated with neighbouring spatial and temporal positions of the current block. First, the control points are defined (2418, 2419, 2420, 2421) in order to generate the motion information for generating an affine model. Two of these control points correspond to $v_0$ and $v_1$ of FIGS. 11A and 11B, for example. These four control points correspond to the four corners of the current block.

The control point top left (2418)'s motion information is obtained from (e.g. by equating it to) the motion information of the block position at the position B2 (2405) if it exists and if this block is coded with an INTER mode (2414). Otherwise, the control point top left (2418)'s motion information is obtained from (e.g. by equating it to) the motion information of the block position at the position B3 (2406) (as depicted in FIG. 6B) if it exists and if this block is coded with an INTER mode (2414) and if it is not the case, the control point top left (2418)'s motion information is obtained from (e.g. equated to) the motion information of the block position at the position A2 (2407) (as depicted in FIG. 6B) if it exists and if this block is coded with an INTER mode (2414). When no block is available for this control point it is considered as being unavailable (non-available).

The control point top right (2419)'s motion information is obtained from (e.g. equated to) the motion information of the block position at the position B1 (2402) if it exists and if this block is coded with an INTER mode (2415). Otherwise, the control point top right (2419)'s motion information is obtained from (e.g. equated to) the motion information of the block position at the position B0 (2403) if it exists and if this block is coded with an INTER mode (2415). When no block is available for this control point it is considered as being unavailable (non-available).

The control point bottom left (2420)'s motion information is obtained from (e.g. equated to) the motion information of the block position at the position A1 (2401) if it exists and if this block is coded with an INTER mode (2416). Otherwise, the control point bottom left (2420) s motion information is obtained from (e.g. equated to) the motion information of the block position at the position A0 (2404) if it exists and if this block is coded with an INTER mode (2416). When no block is available for this control point it is considered as being unavailable (non-available).

The control point bottom right (2421)'s motion information is obtained from (e.g. equated to) the motion information of the temporal candidate, e.g. the collocated block position at the position H (2408) (as depicted in FIG. 6A) if it exists and if this block is coded with an INTER mode (2417). When no block is available for this control point it is considered as being unavailable (non-available).

Based on these control points, up to 10 constructed Affine Merge candidates can be generated (2428). These candidates are generated based on an affine model with 4, 3 or 2 control points. For example, the first constructed Affine Merge candidate may be generated using the 4 control points. Then the 4 following constructed Affine Merge candidates are the 4 possibilities which can be generated using 4 different sets of 3 control points (i.e. 4 different possible combinations of a set containing 3 out of the 4 available control points). Then the other constructed Affine Merge candidates are those generated using different sets of 2 control points (i.e. different possible combinations of a set containing 2 of the 4 control points).

If the number (Nb_Cand) of candidates remains strictly less (2430) than the maximum number of candidates (Max_Cand) after adding these additional (constructed) Affine Merge candidates, other additional virtual motion information candidates such as zero motion vector candidates (or even combined bi-predictive merge candidates where applicable) are added/generated (2432) until the number of candidates in the list of Affine Merge candidates reaches the target number (e.g. maximum number of candidates).

At the end of this process, the list or set of Affine Merge mode candidates (i.e. a list or set of candidates for the Affine Merge modes, which are the Affine Merge mode and the Affine Merge Skip mode) is generated/built (2434). As illustrated in FIG. 24, the list or set of Affine Merge (motion vector predictor) candidates is built/generated (2434) from a subset of spatial candidates (2401 to 2407) and a temporal candidate (2408). It is understood that according to embodiments of the invention, other Affine Merge candidate derivation processes with different order for checking availability, pruning process, or number/type of potential candidates (e.g. ATMVP candidate may be also added in a similar manner to the Merge candidate list derivation process in FIG. 13 or FIG. 16) may also be used to generate the list/set of Affine Merge candidates.

Following embodiment illustrates how a list (or a set) of Affine Merge candidates can be used to signal (e.g. encode or decode) a selected Affine Merge candidate (which can be signalled using a Merge index used for the Merge mode or a separate Affine Merge index specifically for use with the Affine Merge mode).

In the following embodiment: a MERGE mode (i.e. a merge mode other than an AFFINE MERGE mode defined later, in other words classical non-Affine Merge mode or classical non-Affine Merge Skip mode) is a type of merge mode where motion information of either spatially neighbouring or temporally associated block is obtained for (or derived for or shared with) the current block, a MERGE mode predictor candidate (i.e. a Merge candidate) is information regarding one or more spatially neighbouring or temporally associated block from which the current block can obtain/derive the motion information in the MERGE mode, a MERGE mode predictor is a selected MERGE mode predictor candidate whose information is used when predicting the motion information of the current block and during the signalling in the MERGE mode (e.g. encoding or decoding) process an index (e.g. a MERGE index) identifying the MERGE mode predictor from a list (or set) of MERGE mode predictor candidates is signalled, an AFFINE MERGE mode is a type of merge mode where motion information of either spatially neighbouring or temporally associated block is obtained for (derived for or shared with) the current block so that motion information and/or affine parameter for Affine mode processing (or Affine motion model processing) of the current block can make use of this obtained/derived/shared motion information, an AFFINE MERGE mode predictor candidate (i.e. an Affine Merge candidate) is information regarding one or more spatially neighbouring or temporally associated block from which the current block can obtain/derive the motion information in the AFFINE MERGE mode, and an AFFINE MERGE mode predictor is a selected AFFINE MERGE mode predictor candidate whose information is usable in the Affine motion model when predicting the motion information of the current block and during the signalling in the AFFINE MERGE mode (e.g encoding or decoding) process an index (e.g. an AFFINE MERGE index) identifying the AFFINE MERGE mode predictor from a list (or set) of AFFINE MERGE mode predictor candidates is signalled. It is understood that in the following embodiment, the AFFINE MERGE mode is a merge mode which has its own AFFINE MERGE index (an identifier which is a variable) for identifying one AFFINE MERGE mode predictor candidate from a list/set of candidates (also known as an "Affine Merge list" or a "subblock Merge list"), as opposed to having a single index value associated with it, wherein the AFFINE MERGE index is signalled to identify that particular AFFNE MERGE mode predictor candidate.

It is understood that in the following embodiment, the "MERGE mode" refers to either one of the classical Merge mode or the classical Merge Skip mode in HEVC/JEM/VTM or any functionally equivalent mode, provided that such obtaining (e.g. deriving or sharing) of the motion information and signalling of the Merge index as described above is used in said mode. The "AFFINE MERGE mode" also refers to either one of the Affine Merge mode or the Affine Merge Skip mode (if present and uses such obtaining/deriving) or any other functionally equivalent mode, provided the same features are used in said mode.

Sixteenth Embodiment

In the sixteenth embodiment, a motion information predictor index for identifying an AFFINE MERGE mode predictor (candidate) from the list of AFFINE MERGE candidates is signalled using CABAC coding, wherein one or more bits of the motion information prediction index is bypass CABAC coded.

According to a first variant of the embodiment, at an encoder, a motion information predictor index for an AFFINE MERGE mode is encoded by: generating a list of motion information predictor candidates; selecting one of the motion information predictor candidates in the list as an AFFINE MERGE mode predictor; and generating a motion information predictor index for the selected motion information predictor candidate using CABAC coding, one or more bits of the motion information predictor index being bypass CABAC coded. Data indicating an index for this selected motion information predictor candidate is then included in a bitstream. A decoder then, from the bitstream including this data, decodes the motion information predictor index for the AFFINE MERGE mode by: generating a list of motion information predictor candidates; decoding the motion information predictor index using CABAC decoding, one or more bits of the motion information predictor index being bypass CABAC decoded; when the AFFINE MERGE mode is used, using the decoded motion information predictor index to identify one of the motion information predictor candidates in the list as an AFFINE MERGE mode predictor.

According to a further variant of the first variant, one of the motion information predictor candidates in the list is also selectable as a MERGE mode predictor when a MERGE mode is used so that when the MERGE mode is used, the decoder can use the decoded motion information predictor index (e.g. MERGE index) to identify one of the motion information predictor candidates in the list as a MERGE mode predictor. In this further variant, an AFFINE MERGE index is used to signal an AFFINE MERGE mode predictor (candidate), and the AFFINE MERGE index signalling is implemented using an index signalling that is analogous to the MERGE index signalling according to any one of the first to fifteenth embodiments or the MERGE index signalling used in the current VTM or HEVC.

In this variant, when the MERGE mode is used the MERGE index signalling can be implemented using the MERGE index signalling according to any one of the first to fifteenth embodiment or the MERGE index signalling used in the current VTM or HEVC. In this variant, the AFFINE MERGE index signalling and the MERGE index signalling can use different index signalling schemes. The advantage of this variant is that it achieves a better coding efficiency by using an efficient index coding/signalling for both the AFFINE MERGE mode and MERGE mode. Further, in this variant separate syntax elements can be used for the MERGE index (such as "Merge idx[ ][ ]" in HEVC or functional equivalent thereof) and the AFFINE MERGE index (such as "A_Merge_idx[ ][ ]"). This enables the MERGE index and the AFFINE MERGE index to be signalled (encoded/decoded) independently.

According to yet another further variant, when the MERGE mode is used and one of the motion information predictor candidates in the list is also selectable as the MERGE mode predictor, the CABAC coding uses the same context variable for at least one bit of the motion information predictor index (e.g. the MERGE index or the AFFINE MERGE index) of the current block for both modes, i.e. when the AFFINE MERGE mode is used and when the MERGE mode is used, so that the at least one bit of the AFFINE MERGE index and the MERGE index share the same context variable. A decoder then, when the MERGE mode is used, uses the decoded motion information predictor index to identify one of the motion information predictor candidates in the list as the MERGE mode predictor, wherein the CABAC decoding uses the same context variable for the at least one bit of the motion information predictor index of the current block for both modes, i.e. when the AFFINE MERGE mode is used and when the MERGE mode is used.

According to a second variant of the embodiment, at an encoder, a motion information predictor index is encoded by: generating a list of motion information predictor candidates; when an AFFINE MERGE mode is used, selecting one of the motion information predictor candidates in the list as an AFFINE MERGE mode predictor; when a MERGE mode is used, selecting one of the motion information predictor candidates in the list as a MERGE mode predictor; and generating a motion information predictor index for the selected motion information predictor candidate using CABAC coding, one or more bits of the motion information predictor index being bypass CABAC coded. Data indicating an index for this selected motion information predictor candidate is then included in a bitstream. A decoder then, from the bitstream, decodes the motion information predictor index by: generating a list of motion information predictor candidates; decoding the motion information predictor index using CABAC decoding, one or more bits of the motion information predictor index being bypass CABAC decoded; when the AFFINE MERGE mode is used, using the decoded motion information predictor index to identify one of the motion information predictor candidates in the list as the AFFINE MERGE mode predictor; and when the MERGE mode is used, using the decoded motion information predictor index to identify one of the motion information predictor candidates in the list as the MERGE mode predictor.

According to a further variant of the second variant, the AFFINE MERGE index signalling and the MERGE index signalling use the same index signalling scheme according to any one of the first to fifteenth embodiment or the MERGE index signalling used in the current VTM or HEVC. An advantage of this further variant is a simple design during implementation, which also can lead to less complexity. In this variant, when the AFFINE MERGE mode is used, the encoder's the CABAC coding comprises using a context variable for at least one bit of the motion information predictor index (AFFINE MERGE index) of a current block, the context variable being separable from another context variable for the at least one bit of the motion information predictor index (MERGE index) when the MERGE mode is used; and data for indicating use of the AFFINE MERGE mode is included in a bitstream so that the context variables for the AFFINE MERGE mode and the MERGE mode can be distinguished (distinctly identified) for the CABAC decoding process. The decoder then obtains, from the bitstream, data for indicating use of the AFFINE MERGE mode in a bitstream; and when the AFFINE MERGE mode is used, the CABAC decoding uses this data to distinguish between the context variables for the AFFINE MERGE index and the MERGE index. Further, at the decoder, the data for indicating use of the AFFINE MERGE mode can also be used to generate a list (or set) of AFFINE MERGE mode predictor candidates when the obtained data indicates use of the AFFINE MERGE mode, or to generate a list (or set) of MERGE mode predictor candidates when the obtained data indicates use of the MERGE mode.

This variant enables both the MERGE index and the AFFINE MERGE index to be signalled using the same index signalling scheme whilst the MERGE index and the AFFINE MERGE index are still encoded/decoded independently from each other (e.g. by using separate context variables).

One way of using the same index signalling scheme is to use the same syntax element for both the AFFINE MERGE index and the MERGE index, that is the motion information predictor index for the selected motion information predictor candidate is encoded using the same syntax element for both cases, when the AFFINE MERGE mode is used and when the MERGE mode is used. Then at the decoder, the motion information predictor index is decoded by parsing, from the bitstream, the same syntax element regardless of whether the current block was encoded (and is being decoded) using the AFFINE MERGE mode or the MERGE mode.

Figure 22:
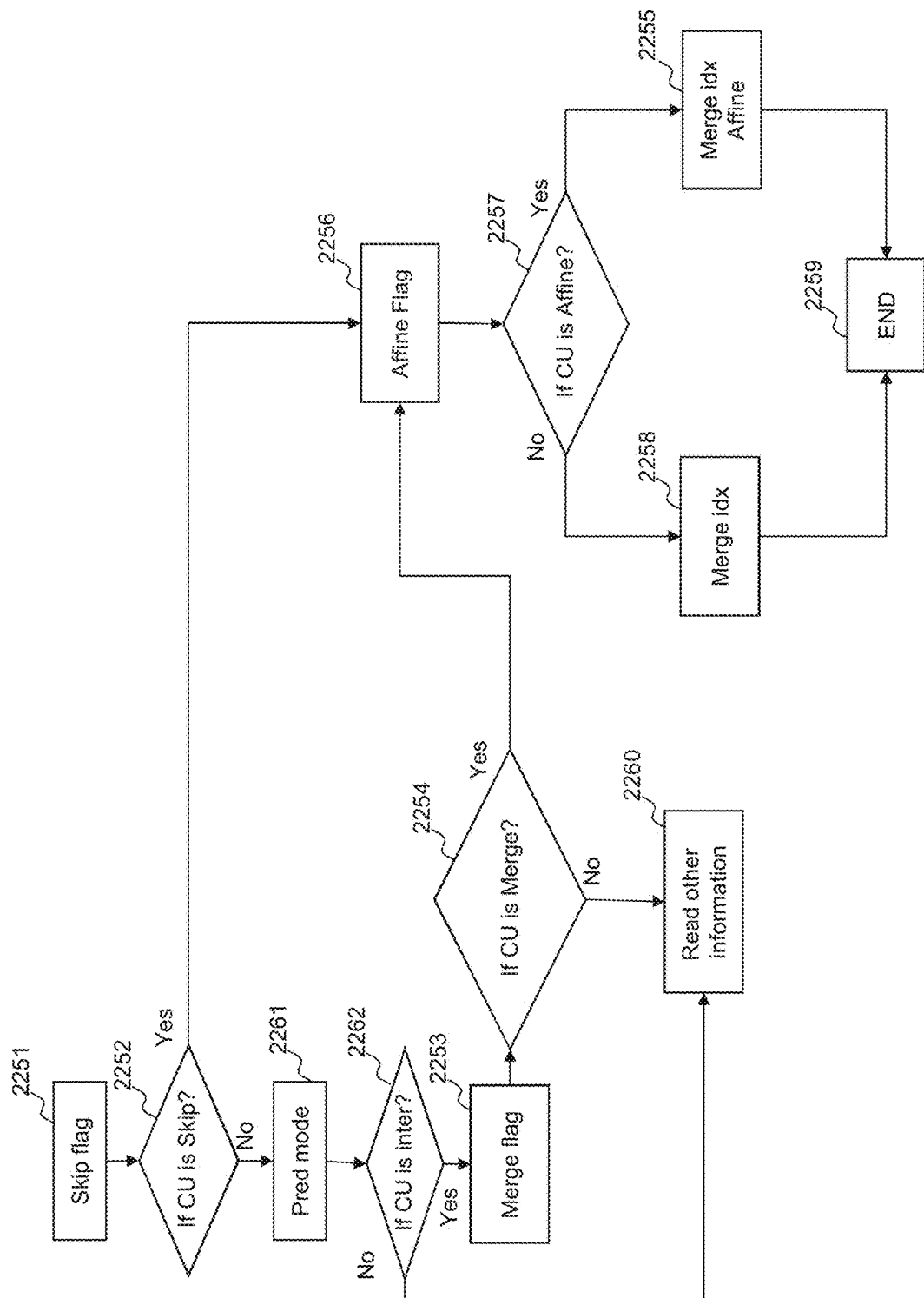
FIG. 22 is a flow chart of the partial decoding process of some syntax elements related to the coding mode according to a sixteenth embodiment.

FIG. 22 illustrates a partial decoding process of some syntax elements related to a coding mode (i.e. the same index signalling scheme) according to this variant of the sixteenth embodiment. This figure illustrates the signalling of the AFFINE MERGE index (2255—"Merge idx Affine") for the AFFINE MERGE mode (2257:Yes) and of the MERGE index (2258—"Merge idx") for the MERGE mode (2257:No) with the same index signalling scheme. It is understood that in some variants, the AFFINE MERGE candidate list can include an ATMVP candidate as in the Merge candidate list of the current VTM. The coding of the AFFINE MERGE index is similar to the coding of the MERGE index for the MERGE mode as depicted in FIG. 10A and FIG. 10B. In some variants, even if the AFFINE MERGE candidates derivation does not define an ATMVP merge candidate, the AFFINE MERGE index is coded as described in FIG. 10B when ATMVP is enabled for the MERGE mode with maximum of 5 other candidates (i.e. in total, 6 candidates) so that the maximum number of candidates in the AFFINE MERGE candidate list matches the maximum number of candidates in the MERGE candidate list. So, each bit of the AFFINE MERGE index has its own context. All context variables used for the bits of the Merge index signalling are independent of the context variables used for the bits of the AFFINE MERGE Index signalling.

According to a further variant, this same index signalling scheme shared by the MERGE index and the AFFINE MERGE index signalling uses CABAC coding on the first bin only as in the first embodiment. That is all bits except for a first bit of the motion information predictor index are bypass CABAC coded. In this further variant of the sixteenth embodiment, when ATMVP is included as a candidate in one of the list of MERGE candidates or the list of AFFINE MERGE candidates (for example, when ATMVP is enabled at SPS level) the coding of each index (i.e. the MERGE index or the AFFINE MERGE index) is modified so that only the first bit of the index is coded by CABAC using a single context variable as shown in FIG. 14. This single context is set in the same manner as in the current VTM reference software when ATMVP is not enabled at SPS level. The other bits (from the $2^{nd}$ to the $5^{th}$ bit or $4^{th}$ bit if there are only 5 candidates in the list) are bypass coded. When ATMVP is not included as a candidate in the list of MERGE candidates (for example, when ATMVP is disabled at SPS level), there are 5 MERGE candidates and 5 AFFINE MERGE candidates available for use. Only the first bit of the MERGE index for the MERGE mode is coded by CABAC using a first single context variable. And only the first bit of the AFFINE MERGE index for the AFFINE MERGE mode is coded by CABAC using a second single context variable. These first and second context variables are set in the same manner as in the current VTM reference software when ATMVP is not enabled at SPS level for both the MERGE index and the AFFINE MERGE index. The other bits (from the $2^{nd}$ to the $4^{th}$ bit) are bypass decoded.

The decoder generates the same list of MERGE candidates and the same list of AFFINE MERGE candidates as the encoder. This is accomplished by using the method of FIG. 22. Although the same index signalling scheme is used for both the MERGE mode and the AFFINE MERGE mode, the affine flag (2256) is used to determine whether data currently being decoded is for the MERGE index or the AFFINE MERGE index so that the first and second context variables are separable (or distinguishable) from each other for the CABAC decoding process. That is, the affine flag (2256) is used during the index decoding process (i.e. used at step 2257) to determine whether to decode "merge idx 2258" or "merge idx Affine 2255". When ATMVP is not included as a candidate in the list of MERGE candidates (for example, when ATMVP is disabled at SPS level) there are 5 MERGE candidates for both the lists of candidates (for the MERGE mode and the AFFINE MERGE mode). Only the first bit of the MERGE index is decoded by CABAC using the first single context variable. And only the first bit of the AFFINE MERGE index is decoded by CABAC using the second single context variable. All other bits (from the $2^{nd}$ to the $4^{th}$ bit) are bypass decoded. In contrast to the current reference software, when ATMVP is included as a candidate in the list of MERGE candidates (for example, when ATMVP is enabled at SPS level), only the first bit of the MERGE index is decoded by CABAC using the first single context variable in the decoding of the MERGE index and using the second single context variable in the decoding of the AFFINE MERGE index. The other bits (from the $2^{nd}$ to the 5th bit or $4^{th}$ bit) are bypass decoded. The decoded index is then used to identify the candidate selected by the encoder from the corresponding list of candidates (i.e. the MERGE candidates or the AFFINE MERGE candidates).

The advantage of this variant is that use of the same index signalling scheme for both the MERGE index and the AFFINE MERGE index leads to a complexity reduction in the index decoding and the decoder design (and the encoder design) for implementing these two different modes, without significant impact on the coding efficiency. Indeed, with this variable only 2 CABAC states (one for each of the first and second single context variable) are needed for the index signalling, instead of 9 or 10 which would have been the case if all bits of the MERGE index and all bits of the AFFINE MERGE index are CABAC encoded/decoded. Moreover, it reduces the worst-case complexity because all other bits (apart from the first bit) are CABAC bypass coded, which reduces the number of operations needed during the CABAC encoding/decoding process compared to coding all bits with CABAC.

Figure 23:
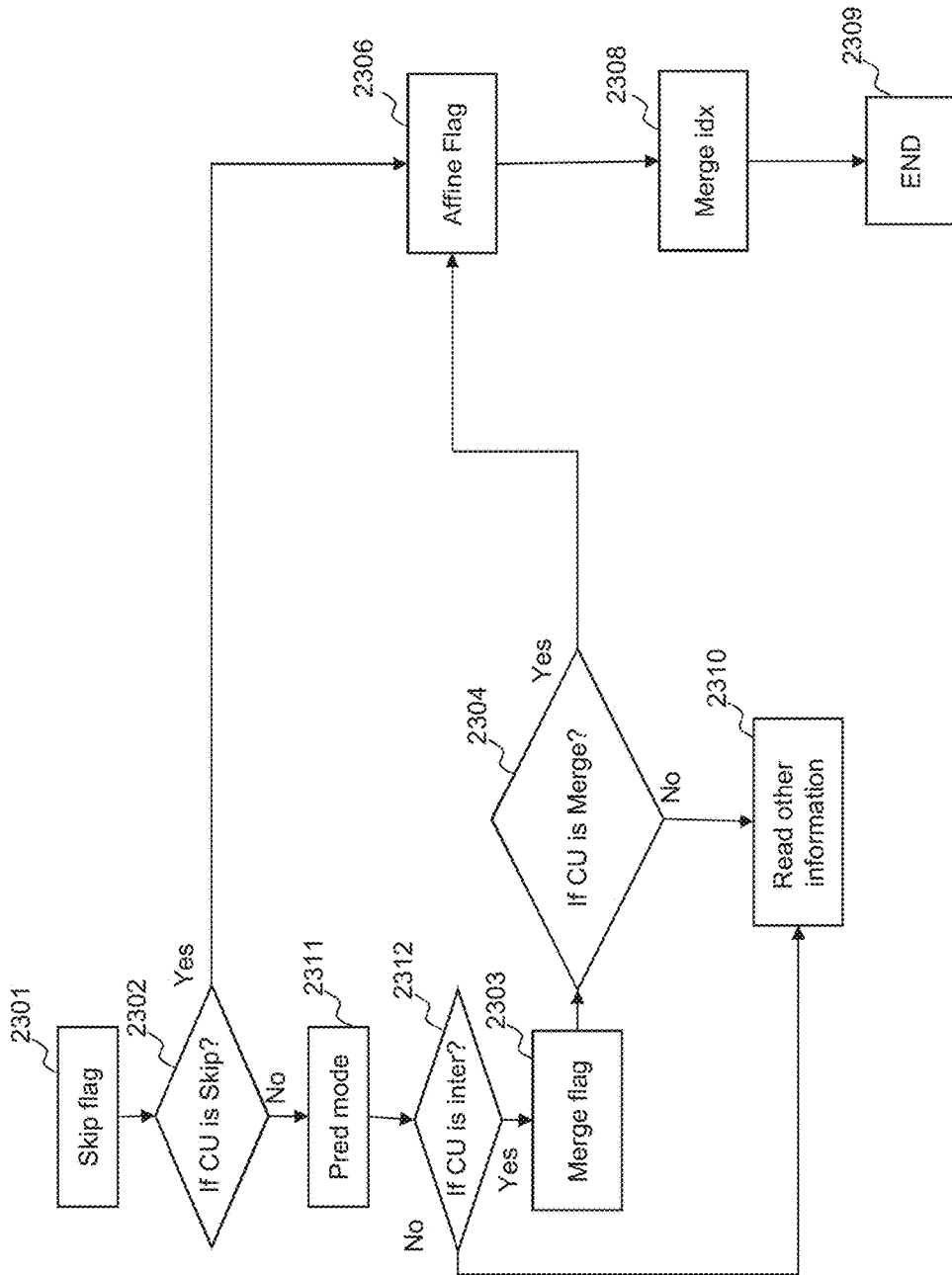
FIG. 23 is a flow chart illustrating use of a single index signalling scheme for both a merge mode and an Affine Merge mode.

According to yet another further variant, the CABAC coding or decoding use the same context variable for at least one bit of the motion information predictor index of a current block for both when the AFFINE MERGE mode is used and when the MERGE mode is used. In this further variant, the context variable used for the first bit of the MERGE index and the first bit of the AFFINE MERGE index is independent of which index is being encoded or decoded, that is the first and second single context variables (from the previous variant) are not distinguishable/separable and are the one and the same single context variable. So contrary to the previous variant, the MERGE index and the AFFINE MERGE index share one context variable during the CABAC process. As shown in FIG. 23, the index signalling scheme is the same for both the MERGE index and the AFFINE MERGE index, i.e. only one type of index "Merge idx (2308)" is encoded or decoded for both modes. As far as the CABAC decoder is concerned, the same syntax element is used for both the MERGE index and the AFFINE MERGE index, and there is no need to distinguish them when considering context variables. So there is no need to use the Affine flag (2306) to determine whether the current block is encoded (to be decoded) in AFFINE MERGE mode or not as in step (2257) of FIG. 22, and there is no branching after step 2306 in FIG. 23 as only one index ("merge idx") needs decoding. The affine flag is used to perform the motion information prediction with the AFFINE MERGE mode, i.e. during prediction process after the CABAC decoder has decoded the index ("merge idx"). Moreover, only the first bit of this index (i.e. the MERGE index and the AFFINE MERGE index) is coded by CABAC using one single context and the other bits are bypass coded as described for the first embodiment. So in this further variant, one context variable for the first bits of the MERGE index and the AFFINE MERGE index is shared by both the MERGE index and AFFINE MERGE index signalling. If the size of the lists of candidates are different for the MERGE index and the AFFINE MERGE index, then the maximum number of bits for signalling the relevant index for each case can also be different, i.e. they are independent from one another. So, the number of bypass coded bits can be adapted accordingly, if needed, according to the value of affine flag (2306), for example to enable parsing of data for the relevant index from the bitstream.

The advantage of this variant is a complexity reduction in the MERGE index and the AFFINE MERGE index decoding process and decoder design (and encoder design) without having a significant impact on the coding efficiency. Indeed, with this further variant, only 1 CABAC state is needed when signalling both the MERGE index and the AFFINE MERGE index, instead of CABAC states of the previous variant or 9 or 10. Moreover, it reduces the worst-case complexity because all other bits (apart from the first bit) are CABAC bypass coded, which reduces the number of operations needed during the CABAC encoding/decoding process compared to coding all bits with CABAC.

In the foregoing variants of this embodiment, the AFFINE MERGE index signalling and the MERGE index signalling may share one or more contexts as described in any of the first to fifteenth embodiment. The advantage of this is a complexity reduction from the reduction in the number of contexts needed to encode or decode these indexes.

In the foregoing variants of this embodiment, the motion information predictor candidate comprises information for obtaining (or deriving) one or more of: a direction, an identification for a list, a reference frame index, and a motion vector. Preferably the motion information predictor candidate comprises information for obtaining a motion vector predictor candidate. In a preferred variant, the motion information predictor index (e.g. AFFINE MERGE index) is used to signal an AFFINE MERGE mode predictor candidate, and the AFFINE MERGE index signalling is implemented using an index signalling that is an analogous to the MERGE index signalling according to any one of the first to fifteenth embodiments or the MERGE index signalling used in the current VTM or HEVC (with the motion information predictor candidates for the AFFINE MERGE mode as the MERGE candidates).

In the foregoing variants of this embodiment, the generated list of motion information predictor candidates includes an ATMVP candidate as in the first embodiment or as in a variant of some of the other foregoing second to fifteenth embodiments. Alternatively, the generated list of motion information predictor candidates does not include the ATMVP candidate.

In the foregoing variants of this embodiment, the maximum number of candidates includable in the lists of candidates for the MERGE index and the AFFINE MERGE index is fixed. The maximum number of candidates includable in the lists of candidates for the MERGE index and the AFFINE MERGE index may be the same. Then data for determining (or indicating) the maximum number (or the target number) of motion information predictor candidates includable in the generated list of motion information predictor candidates is included, by the encoder, in the bitstream, and the decoder obtains, from the bitstream, the data for determining a maximum number (or a target number) of motion information predictor candidates includable in the generated list of motion information predictor candidates. This enables parsing, from the bitstream, of data for decoding the MERGE index or the AFFINE MERGE index. This data for determining (or indicating) the maximum number (or the target number) may be the maximum number (or the target number) itself when decoded, or it may enable the decoder to determine this maximum/target number in conjunction with other parameters/syntax elements, for example "five_minus_max_num_merge_cand" or "MaxNumMerge-Cand-1" used in HEVC or functionally equivalent parameters thereof.

Alternatively, if the maximum number (or the target number) of candidates in the lists of candidates for the MERGE index and the AFFINE MERGE index can vary or can be different (e.g. because use of the ATMVP candidate or any other optional candidate may be enabled or disabled for one list but not for the other list, or because the lists use different candidate list generation/derivation process), the maximum numbers (or the target numbers) of motion information predictor candidates includable in the generated list of motion information predictor candidates when the AFFINE MERGE mode is used and when the MERGE mode is used are determinable separately, and the encoder includes, in the bitstream, data for determining the maximum number(s)/target number(s). The decoder then obtains, from the bitstream, the data for determining the maximum/target number(s), and parses or decodes the motion information predictor index using the obtained data. The affine flag may then be used to switch between parsing or decoding of the MERGE index and the AFFINE MERGE index, for example.

Implementation of Embodiments of the Invention

One or more of the foregoing embodiments are implemented by the processor 311 of a processing device 300 in FIG. 3, or corresponding functional module(s)/unit(s) of the encoder 400 in FIG. 4, of the decoder 60 in FIG. 5, of the CABAC coder in FIG. 17 or a corresponding CABAC decoder thereof, which perform the method steps of the one or more foregoing embodiments.

Figure 19:
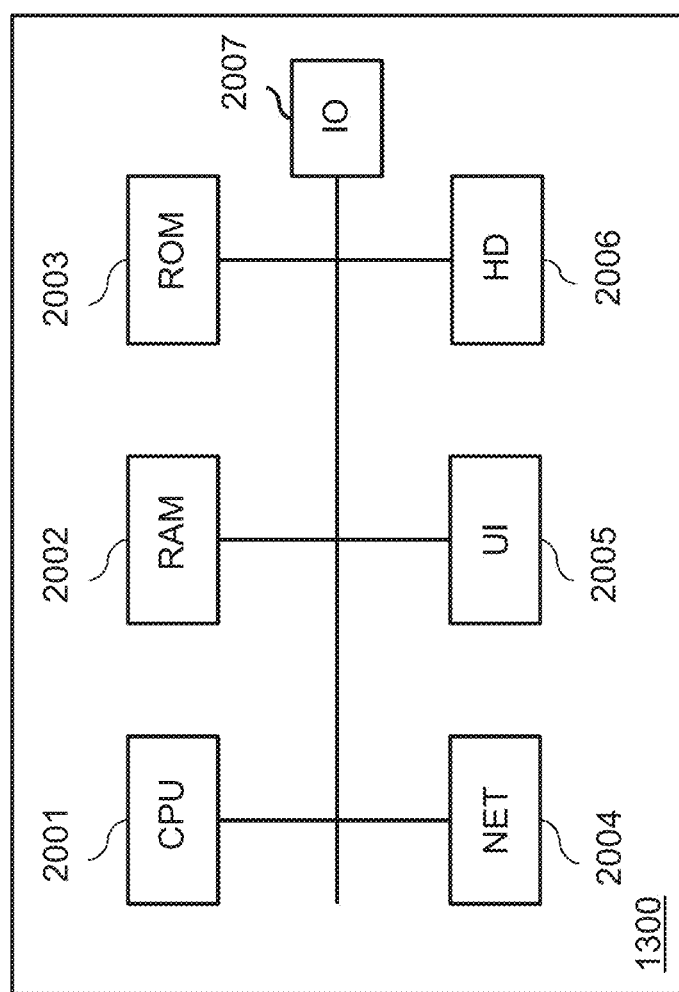
FIG. 19 is a schematic block diagram of a computing device.

FIG. 19 is a schematic block diagram of a computing device 1300 for implementation of one or more embodiments of the invention. The computing device 1300 may be a device such as a micro-computer, a workstation or a light portable device. The computing device 1300 comprises a communication bus connected to: —a central processing unit (CPU) 2001, such as a microprocessor; —a random access memory (RAM) 2002 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example; —a read only memory (ROM) 2003 for storing computer programs for implementing embodiments of the invention; —a network interface (NET) 2004 is typically connected to a communication network over which digital data to be processed are transmitted or received. The network interface (NET) 2004 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 2001; —a user interface (UI) 2005 may be used for receiving inputs from a user or to display information to a user; —a hard disk (HD) 2006 may be provided as a mass storage device; —an Input/Output module (IO) 2007 may be used for receiving/sending data from/to external devices such as a video source or display. The executable code may be stored either in the ROM 2003, on the HD 2006 or on a removable digital medium such as, for example a disk. According to a variant, the executable code of the programs can be received by means of a communication network, via the NET 2004, in order to be stored in one of the storage means of the communication device 1300, such as the HD 2006, before being executed. The CPU 2001 is adapted to control and direct the execution of the instructions or portions of software code of the program or programs according to embodiments of the invention, which instructions are stored in one of the aforementioned storage means. After powering on, the CPU 2001 is capable of executing instructions from main RAM memory 2002 relating to a software application after those instructions have been loaded from the program ROM 2003 or the HD 2006, for example. Such a software application, when executed by the CPU 2001, causes the steps of the method according to the invention to be performed.

It is also understood that according to another embodiment of the present invention, a decoder according to an aforementioned embodiment is provided in a user terminal such as a computer, a mobile phone (a cellular phone), a tablet or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 20 and 21.

Figure 20:
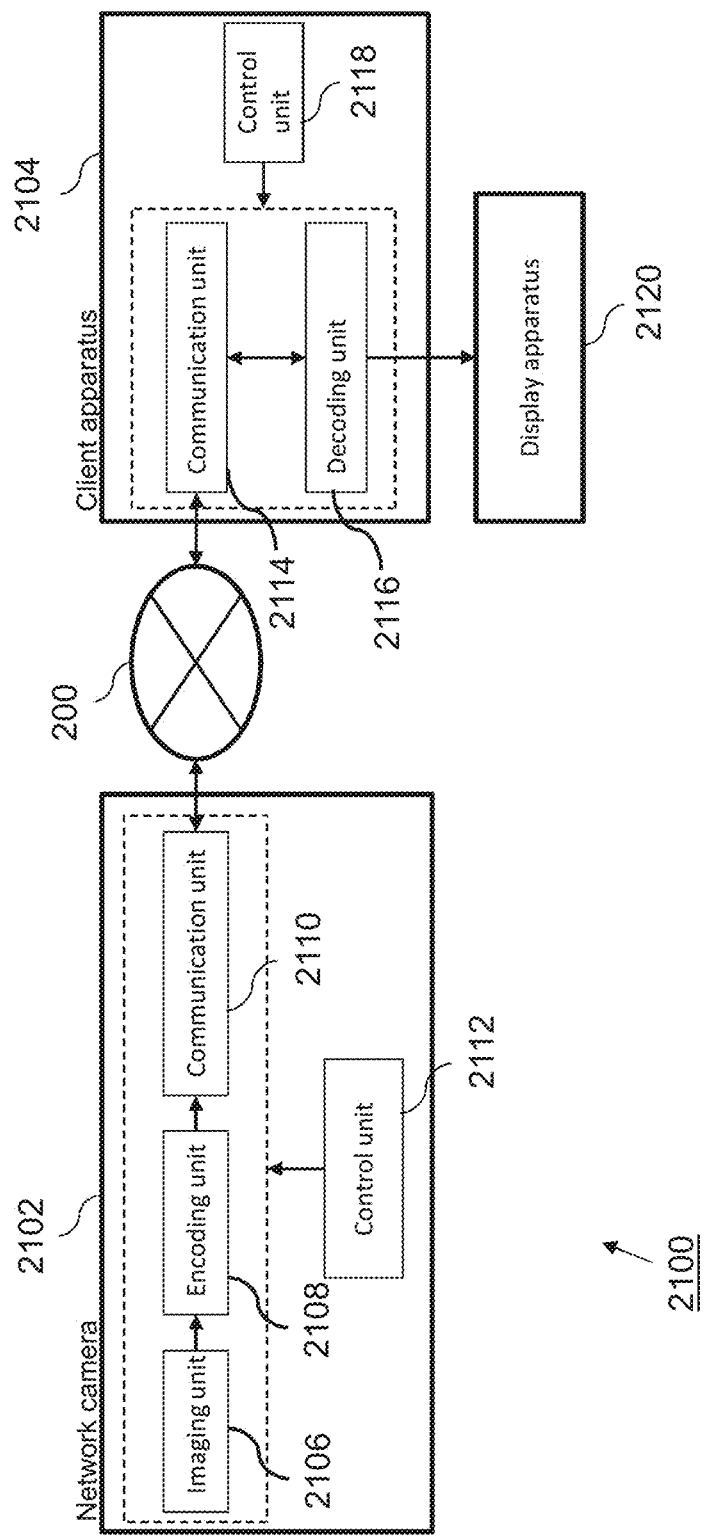
FIG. 20 is a diagram illustrating a network camera system.

FIG. 20 is a diagram illustrating a network camera system 2100 including a network camera 2102 and a client apparatus 2104.

The network camera 2102 includes an imaging unit 2106, an encoding unit 2108, a communication unit 2110, and a control unit 2112.

The network camera 2102 and the client apparatus 2104 are mutually connected to be able to communicate with each other via the network 200.

The imaging unit 2106 includes a lens and an image sensor (e.g., a charge coupled device (CCD) or a complementary metal oxide semiconductor (CMOS)), and captures an image of an object and generates image data based on the image. This image can be a still image or a video image. The imaging unit may also comprise zooming means and/or panning means which are adapted to zoom or pan (either optically or digitally) respectfully.

The encoding unit 2108 encodes the image data by using said encoding methods explained in first to sixteenth embodiments. The encoding unit 2108 uses at least one of encoding methods explained in first to sixteenth embodiments. For another instance, the encoding unit 2108 can use combination of encoding methods explained in first to sixteenth embodiments.

The communication unit 2110 of the network camera 2102 transmits the encoded image data encoded by the encoding unit 2108 to the client apparatus 2104.

Further, the communication unit 2110 receives commands from client apparatus 2104. The commands include commands to set parameters for the encoding of the encoding unit 2108.

The control unit 2112 controls other units in the network camera 2102 in accordance with the commands received by the communication unit 2110.

The client apparatus 2104 includes a communication unit 2114, a decoding unit 2116, and a control unit 2118.

The communication unit 2114 of the client apparatus 2104 transmits the commands to the network camera 2102.

Further, the communication unit 2114 of the client apparatus 2104 receives the encoded image data from the network camera 2102.

The decoding unit 2116 decodes the encoded image data by using said decoding methods explained in any of the first to sixteenth embodiments. For another instance, the decoding unit 2116 can use combination of decoding methods explained in the first to sixteenth embodiments.

The control unit 2118 of the client apparatus 2104 controls other units in the client apparatus 2104 in accordance with the user operation or commands received by the communication unit 2114.

The control unit 2118 of the client apparatus 2104 controls a display apparatus 2120 so as to display an image decoded by the decoding unit 2116.

The control unit 2118 of the client apparatus 2104 also controls a display apparatus 2120 so as to display GUI (Graphical User Interface) to designate values of the parameters for the network camera 2102 including the parameters for the encoding of the encoding unit 2108.

The control unit 2118 of the client apparatus 2104 also controls other units in the client apparatus 2104 in accordance with user operation input to the GUI displayed by the display apparatus 2120.

The control unit 2118 of the client apparatus 2104 controls the communication unit 2114 of the client apparatus 2104 so as to transmit the commands to the network camera 2102 which designate values of the parameters for the network camera 2102, in accordance with the user operation input to the GUI displayed by the display apparatus 2120.

The network camera system 2100 may determine if the camera 2102 utilizes zoom or pan during the recording of video, and such information may be used when encoding a video stream as zooming or panning during filming may benefit from the use of affine mode which is well-suited to coding complex motion such as zooming, rotating and/or stretching (which may be side-effects of panning, in particular if the lens is a 'fish eye' lens).

Figure 21:
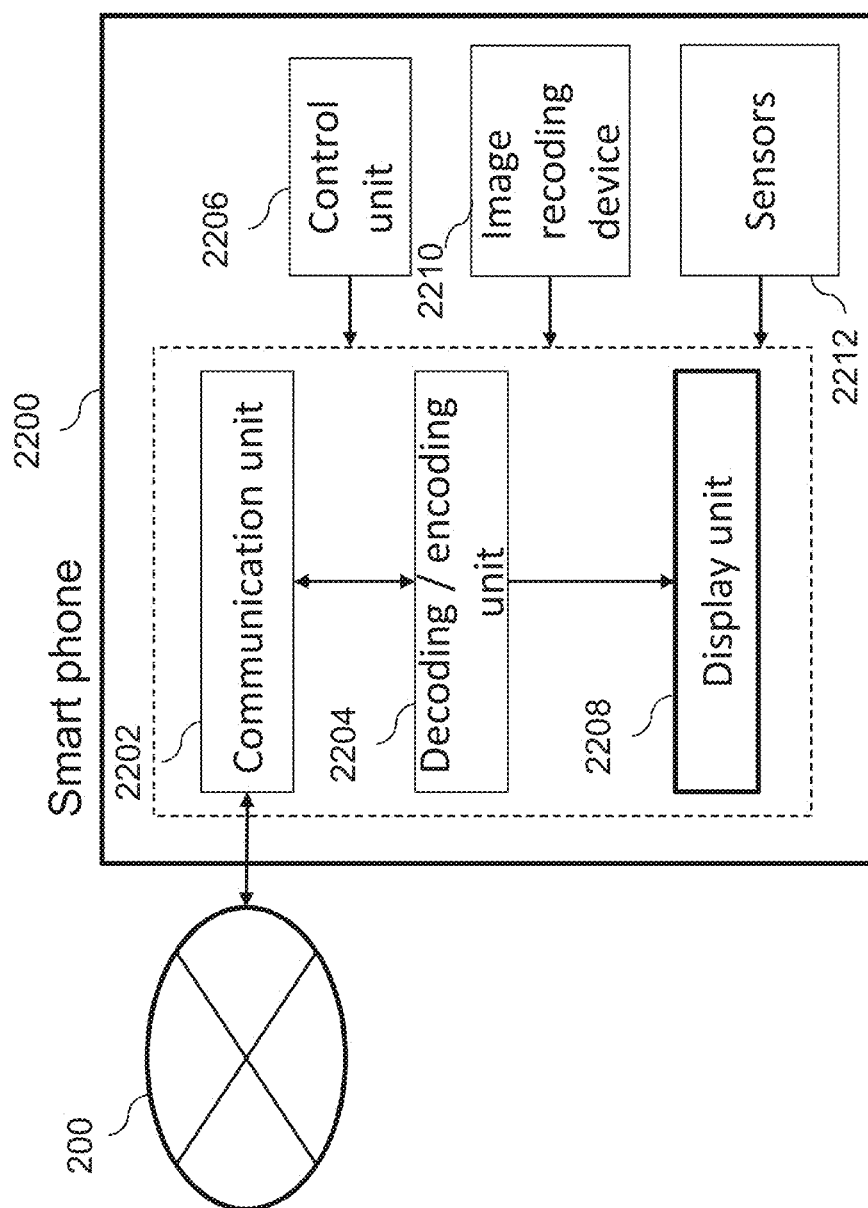
FIG. 21 is a diagram illustrating a smart phone.

FIG. 21 is a diagram illustrating a smart phone 2200.

The smart phone 2200 includes a communication unit 2202, a decoding/encoding unit 2204, a control unit 2206 and a display unit 2208.

The communication unit 2202 receives the encoded image data via network 200.

The decoding unit 2204 decodes the encoded image data received by the communication unit 2202.

The decoding unit 2204 decodes the encoded image data by using said decoding methods explained in first to sixteenth embodiments. The decoding unit 2204 can use at least one of decoding methods explained in first to sixteenth embodiments. For another instance, the decoding/encoding unit 2204 can use combination of decoding methods explained in first to sixteenth embodiments.

The control unit 2206 controls other units in the smart phone 2200 in accordance with a user operation or commands received by the communication unit 2202.

For example, the control unit 2206 controls a display apparatus 2208 so as to display an image decoded by the decoding unit 2204.

The smart phone may further comprise an image recording device 2210 (for example a digital camera and associated circuity) to record images or videos. Such recorded images or videos may be encoded by the decoding/encoding unit 2204 under instruction of the control unit 2206.

The smart phone may further comprise sensors 2212 adapted to sense the orientation of the mobile device. Such sensors could include an accelerometer, gyroscope, compass, global positioning (GPS) unit or similar positional sensors. Such sensors 2212 can determine if the smart phone changes orientation and such information may be used when encoding a video stream as a change in orientation during filming may benefit from the use of affine mode which is well-suited to coding complex motion such as rotations.

Alternatives and Modifications

It will be appreciated that an object of the present invention is to ensure that affine mode is utilised in a most efficient manner, and certain examples discussed above relate to signalling the use of affine mode in dependence on a perceived likelihood of affine mode being useful. A further example of this may apply to encoders when it is known that complex motion (where an affine transform may be particularly efficient) is being encoded. Examples of such cases include:

a) A camera zooming in/out
b) A portable camera (e.g. a mobile phone) changing orientation during filming (i.e. a rotational movement)
c) A 'fisheye' lens camera panning (e.g. a stretching/distortion of a portion of the image As such, an indication of complex motion may be raised during the recording process so that affine mode may be given a higher likelihood of being used for the slice, sequence of frames or indeed the entire video stream.

In a further example, affine mode may be given a higher likelihood of being used depending on a feature or functionality of the device used to record the video. For example, a mobile device may be more likely to change orientation than (say) a fixed security camera so affine mode may be more appropriate for encoding video from the former. Examples of features or functionality include: the presence/use of zooming means, the presence/use of a positional sensor, the presence/use of panning means, whether or not the device is portable, or a user-selection on the device.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

In the preceding embodiments, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate/logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The invention claimed is:

1. A method of encoding a motion information predictor index, comprising:
   determining, from a plurality of modes, one of a first mode and a second mode as a mode for motion information prediction of a block to be encoded, wherein the first mode is a subblock Merge mode with subblock Affine prediction and the second mode is a Merge mode without subblock Affine prediction;

encoding data indicating the determined mode from the plurality of modes for motion information prediction;

when the first mode is used, generating a first list of first mode motion information predictor candidates including, when available, one or more spatial Affine motion information predictor candidates based on Affine motion information associated with one or more neighbouring positions of the block to be encoded and, when available, one or more constructed Affine motion information predictor candidates having motion information based on motion vectors associated with neighbouring spatial positions of the block to be encoded, selecting one of the first mode motion information predictor candidates in the first list, and generating a first motion information predictor index for the selected first mode motion information predictor candidate, when the second mode is used, generating a second list of second mode motion information predictor candidates, selecting one of the second mode motion information predictor candidates in the second list, and generating a second motion information predictor index for the selected second mode motion information predictor candidate; and when the first mode is used, encoding the first motion information predictor index using CABAC coding, all bits except for a first bit of the first motion information predictor index being coded by bypass coding and the first bit of the first motion information predictor index being coded by the CABAC coding using a context, and when the second mode is used encoding the second motion information predictor index using CABAC coding, all bits except for a first bit of the second motion information predictor index being coded by bypass coded and the first bit of the motion information predictor index being coded by the CABAC coding using a context.

2. The method as claimed in claim 1, wherein the CABAC coding comprises using the same context variable for at least one bit of the first motion information predictor index and the second motion information predictor index.

3. The method as claimed in claim 1, wherein:
the method further comprises including data for indicating use of the first mode in a bitstream when the first mode is used.

4. The method as claimed in claim 1, further comprising including data for determining a maximum number of motion information predictor candidates includable in at least one of the generated first list of first mode motion information predictor candidates and second list of second mode motion information predictor candidates in a bitstream.

5. The method as claimed in claim 1, wherein the first motion information predictor index is encoded using the same syntax element as the second motion information predictor index.

6. A method of decoding a motion information predictor index, comprising:
decoding data indicating a mode from a plurality of modes for motion information prediction;
determining, from the data, one of a first mode and a second mode as a mode for motion information prediction of a block to be decoded, wherein the first mode is a subblock Merge mode with subblock Affine prediction and the second mode is a Merge mode without subblock Affine prediction, when the first mode is used, generating a first list of first mode motion information predictor candidates including, when available, spatial Affine motion information predictor candidates based on Affine motion information associated with one or more neighbouring positions of the block to be decoded and, when available, one or more constructed Affine motion information predictor candidates having motion information based on motion vectors associated with neighbouring spatial positions of the block to be decoded;

when the second mode is used, generating a second list of second mode motion information predictor candidates without an Affine motion information predictor candidate;

when the first mode is used, decoding a first motion information predictor index using CABAC decoding, all bits except for a first bit of the first motion information predictor index being decoded by bypass decoding and the first bit of the first motion information predictor index being decoded by the CABAC decoding using a context;

when the second mode is used, decoding a second motion information predictor index using CABAC decoding, all bits except for a first bit of the second motion information predictor index being decoded by bypass decoding and the first bit of the second motion information predictor index being decoded by the CABAC decoding using a context;

when the first mode is used, using the decoded first motion information predictor index to identify one of the first mode motion information predictor candidates in the first list; and when the second mode is used, using the decoded second motion information predictor index to identify one of the second mode motion information predictor candidates in the second list.

7. The method as claimed in claim 6, further comprising obtaining, from a bitstream, data for determining a maximum number of motion information predictor candidates includable in at least one of the generated first list of first mode motion information predictor candidates and the generated second list of second mode motion information predictor candidates.

8. The method as claimed in claim 6, wherein a motion information predictor candidate comprises information for obtaining a motion vector.

9. The method as claimed in claim 6, wherein the first list of first mode motion information predictor candidates includes, when available, a candidate for subblock collocated temporal prediction.

10. The method as claimed in claim 6, wherein the generated first list of first mode motion information predictor candidates has the same maximum number of motion information predictor candidates includable therein as the generated second list of second mode motion information predictor candidates.

11. A device for encoding a motion information predictor index, comprising:
a determiner which determines, from a plurality of modes, one of a first mode and a second mode as a mode for motion information prediction of a block to be encoded, wherein the first mode is a subblock Merge mode with subblock Affine prediction and the second mode is a Merge mode without subblock Affine prediction;

a data encoder which encodes data indicating the determined mode from the plurality of modes for motion information prediction;

a generator which, when the first mode is used, generates a first list of first mode motion information predictor candidates including, when available, one or more spatial Affine motion information predictor candidates based on Affine motion information associated with one or more neighbouring positions of the block to be encoded and, when available, one or more constructed Affine motion information predictor candidates having motion information based on motion vectors associated with neighbouring spatial positions of the block to be encoded, selects one of the first mode motion information predictor candidates in the first list, and generates a first motion information predictor index for the selected first mode motion information predictor candidate, and, when the second mode is used, generates a second list of second mode motion information predictor candidates without an Affine motion information predictor candidate selects one of the second motion information predictor candidates in the second list, and generates a second motion information predictor index for the selected second mode motion information predictor candidate; and an encoder which, when the first mode is used, encodes the first motion information predictor index using CABAC coding, all bits except for a first bit of the first motion information predictor index being coded by bypass coding and the first bit of the first motion information predictor index being coded by the CABAC coding using a context, and when the second mode is used encodes the second motion information predictor index using CABAC coding, all bits except for a first bit of the second motion information predictor index being coded by bypass coded and the first bit of the motion information predictor index being coded by the CABAC coding using a context.

12. A device for decoding a motion information predictor index, comprising:

a data decoder which decodes data indicating a mode from a plurality of modes for motion information prediction;

a determiner which determines, from the data, one of a first mode and a second mode for motion information prediction of a block to be decoded, wherein the first mode is a subblock Merge mode with subblock Affine prediction and the second mode is a Merge mode without subblock Affine prediction;

a generator which, when the first mode is used, generates a first list of first mode motion information predictor candidates including, when available, spatial Affine motion information predictor candidates based on Affine motion information associated with one or more neighbouring positions of the block to be decoded and, when available, one or more constructed Affine motion information predictor candidates having motion information based on motion vectors associated with neighbouring spatial positions of the block to be decoded, and, when the second mode is used, generates a second list of second mode motion information predictor candidates without an Affine motion information predictor candidate;

a decoder which, when the first mode is used, decodes a first motion information predictor index using CABAC decoding, all bits except for a first bit of the first motion information predictor index being decoded by bypass decoding and the first bit of the first motion information predictor index being decoded by the CABAC decoding using a context, and which, when the second mode is used, decodes a second motion information predictor index using CABAC decoding, all bits except for a first bit of the second motion information predictor index being decoded by bypass decoding and the first bit of the second motion information predictor index being decoded by the CABAC decoding using a context;

and an identifier which, when the first mode is used, uses the decoded first motion information predictor index to identify one of the first mode motion information predictor candidates in the first list, and when the second mode is used, uses the decoded second motion information predictor index to identify one of the second mode motion information predictor candidates in the second list.

13. A non-transitory computer-readable carrier medium storing a program which, when executed by one or more processors, causes the one or more processors to perform a method of encoding a motion information predictor index, the method comprising:

determining, from a plurality of modes, one of a first mode and a second mode as a mode for motion information prediction of a block to be encoded, wherein the first mode is a subblock Merge mode with subblock Affine prediction and the second mode is a Merge mode without subblock Affine prediction;

encoding data indicating the determined mode from the plurality of modes for motion information prediction;

when the first mode is used, generating a first list of first mode motion information predictor candidates including, when available, one or more spatial Affine motion information predictor candidates based on Affine motion information associated with one or more neighbouring positions of the block to be encoded and, when available, one or more constructed Affine motion information predictor candidates having motion information based on motion vectors associated with neighbouring spatial positions of the block to be encoded, selecting one of the first mode motion information predictor candidates in the first list, and generating a first motion information predictor index for the selected first mode motion information predictor candidate, when the second mode is used, generating a second list of second mode motion information predictor candidates, selecting one of the second mode motion information predictor candidates in the second list, and generating a second motion information predictor index for the selected second mode motion information predictor candidate; and when the first mode is used, encoding the first motion information predictor index using CABAC coding, all bits except for a first bit of the first motion information predictor index being coded by bypass coding and the first bit of the first motion information predictor index being coded by the CABAC coding using a context, and when the second mode is used encoding the second motion information predictor index using CABAC coding, all bits except for a first bit of the second motion information predictor index being coded by bypass coded and the first bit of the motion information predictor index being coded by the CABAC coding using a context.

14. A non-transitory computer-readable carrier medium storing a program which, when executed by one or more processors, causes the one or more processors to perform method of decoding a motion information predictor index, the method comprising:
- decoding data indicating a mode from a plurality of modes for motion information prediction;
- determining, from the data, one of a first mode and a second mode as a mode for motion information prediction of a block to be decoded, wherein the first mode is a subblock Merge mode with subblock Affine prediction and the second mode is a Merge mode without subblock Affine prediction,
- when the first mode is used, generating a first list of first mode motion information predictor candidates including, when available, spatial Affine motion information predictor candidates based on Affine motion information associated with one or more neighbouring positions of the block to be decoded and, when available, one or more constructed Affine motion information predictor candidates having motion information based on motion vectors associated with neighbouring spatial positions of the block to be decoded;
- when the second mode is used, generating a second list of second mode motion information predictor candidates without an Affine motion information predictor candidate;
- when the first mode is used, decoding a first motion information predictor index using CABAC decoding, all bits except for a first bit of the first motion information predictor index being decoded by bypass decoding and the first bit of the first motion information predictor index being decoded by the CABAC decoding using a context;
- when the second mode is used, decoding a second motion information predictor index using CABAC decoding, all bits except for a first bit of the second motion information predictor index being decoded by bypass decoding and the first bit of the second motion information predictor index being decoded by the CABAC decoding using a context;
- when the first mode is used, using the decoded first motion information predictor index to identify one of the first mode motion information predictor candidates in the first list; and
- when the second mode is used, using the decoded second motion information predictor index to identify one of the second mode motion information predictor candidates in the second list.

* * * * *